(12) United States Patent
Lue et al.

(10) Patent No.: US 12,453,509 B2
(45) Date of Patent: Oct. 28, 2025

(54) OPTICAL COHERENCE TOMOGRAPHY BASED SPERM DETECTION METHOD AND DEVICES AND SYSTEMS FOR PERFORMING THE SAME

(71) Applicants: Lundquist Institute for Biomedical Innovation at Harbor-UCLA Medical Center, Torrance, CA (US); The Regents of the University of California, Oakland, CA (US)

(72) Inventors: Yanhe Lue, Torrance, CA (US); Boris Hyle Park, Torrance, CA (US); Ronald Swerdloff, Torrance, CA (US); Jacob Rajfer, Torrance, CA (US); Christina Wang, Torrance, CA (US); Junze Liu, Torrance, CA (US)

(73) Assignees: Lundquist Institute for Biomedical Innovation at Harbor-UCLA Medical Center, Torrance, CA (US); The Regents of the University of California, Oakland, CA (US)

( * ) Notice: Subject to any disclaimer, the term of this patent is extended or adjusted under 35 U.S.C. 154(b) by 901 days.

(21) Appl. No.: 17/679,516

(22) Filed: Feb. 24, 2022

(65) Prior Publication Data

US 2022/0370004 A1  Nov. 24, 2022

Related U.S. Application Data

(63) Continuation of application No. PCT/US2020/048247, filed on Aug. 27, 2020.
(Continued)

(51) Int. Cl.
A61B 5/00  (2006.01)
A61B 10/00  (2006.01)
A61B 17/43  (2006.01)

(52) U.S. Cl.
CPC .......... *A61B 5/4387* (2013.01); *A61B 5/0066* (2013.01); *A61B 10/0058* (2013.01); *A61B 17/43* (2013.01)

(58) Field of Classification Search
CPC ................ A61B 5/4387; A61B 5/0066; A61B 10/0058; A61B 17/43
See application file for complete search history.

(56) References Cited

U.S. PATENT DOCUMENTS 10,241,028 B2 * 3/2019 Rowe ........................ G01J 9/02
2007/0280907 A1 12/2007 Lue et al.
(Continued)

OTHER PUBLICATIONS

Hirota, Development and Application of Optical Coherence Elastography for Detection of Mechanical Property Changes Occurring in Early Osteoarthritis, UC Riverside, Thesis, Mar. 1, 2017, p. 1-103 (only p. 1-85 provided), Retrieved from the Internet:<http:/escholarship.org/content/qt5cw964kw.pdf> on Nov. 8, 2020.
(Continued)

*Primary Examiner* — Linda C Dvorak
*Assistant Examiner* — Abigail Bock
(74) *Attorney, Agent, or Firm* — Darya C. Cheng; Bret E. Field; Bozicevic, Field & Francis LLP

(57) ABSTRACT

Aspects of the methods include volumetrically imaging testicular tissue by optical coherence tomography to identify a testicular tissue location that is likely to contain sperm; and m-mode scanning using optical coherence tomography the identified testicular location to determine whether sperm are at least likely to be present at the location. Methods may further include harvesting sperm from the location, e.g., for use in in vitro fertilization. Also provided are devices and systems for practicing the methods.

18 Claims, 53 Drawing Sheets

Related U.S. Application Data

(60) Provisional application No. 62/893,174, filed on Aug. 28, 2019.

(56) References Cited

U.S. PATENT DOCUMENTS

2015/0204773 A1     7/2015   Ozcan et al.
2018/0348114 A1*   12/2018   Hsu .................. G01N 33/48728

OTHER PUBLICATIONS

Guan, Micro-motion detection by optical coherence tomography (OCT) and its clinical applications, University of Dundee, Mar. 1, 2015, p. 1-160 (only p. 1-92 provided), Retrieved from the Internet:<https://discovery.dundee.ac.uk/ws/portalfiles/portal/6348910/thesis_full_Guangying_finalV1.pdf> on Nov. 8, 2020.

Brezinski et al., Optical Biopsy with Optical Coherence Tomography, Annals of the New York Academy of Sciences, Feb. 9, 1998, vol. 838, Issue 68, p. 68-74.

Davis et al., Optical Coherence Tomography: A Novel Modality for Scrotal Imaging, CUAJ, Aug. 1, 2009, vol. 3, Issue 4, p. 319-322.

\* cited by examiner

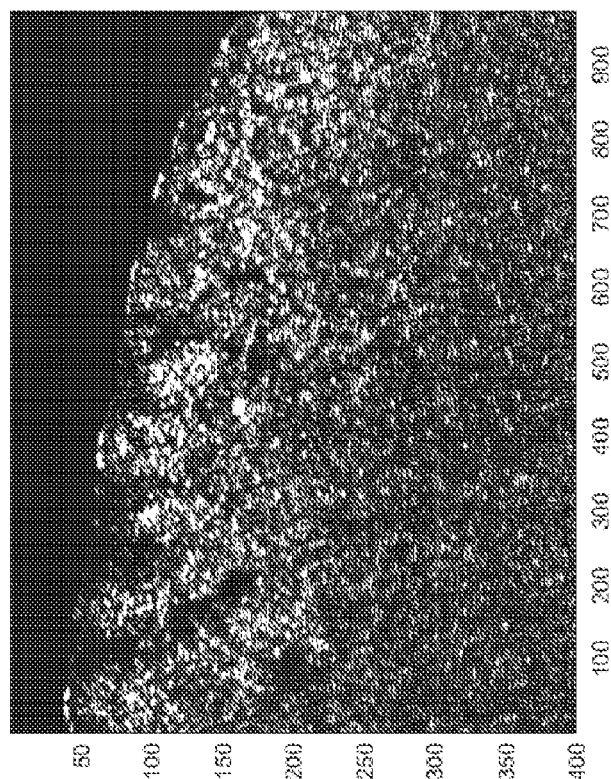
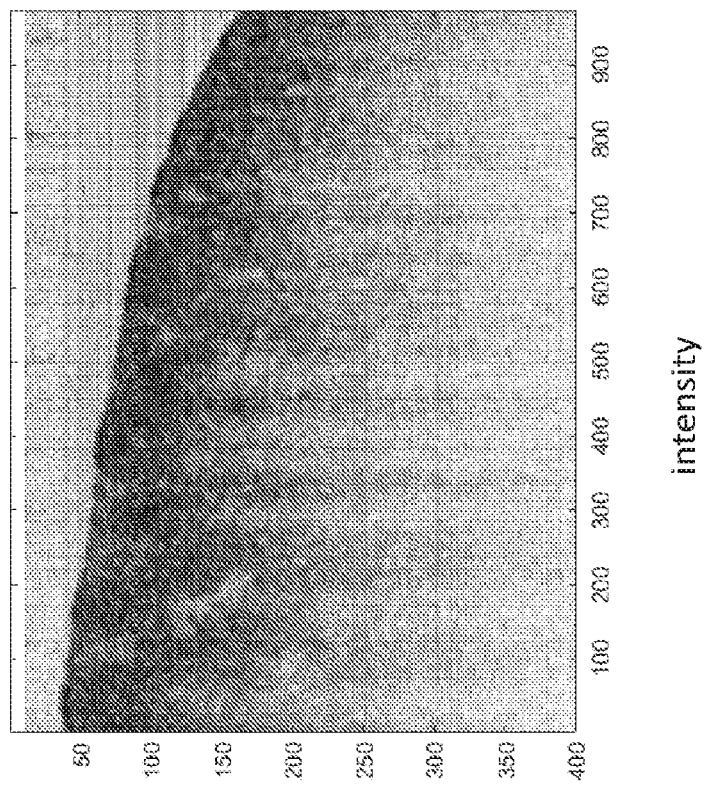
Figure 1

Figure 2A
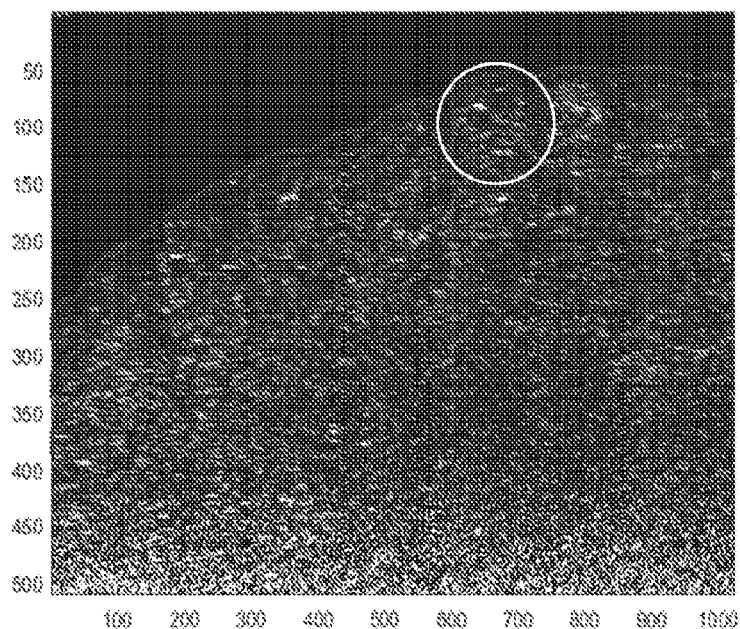
201
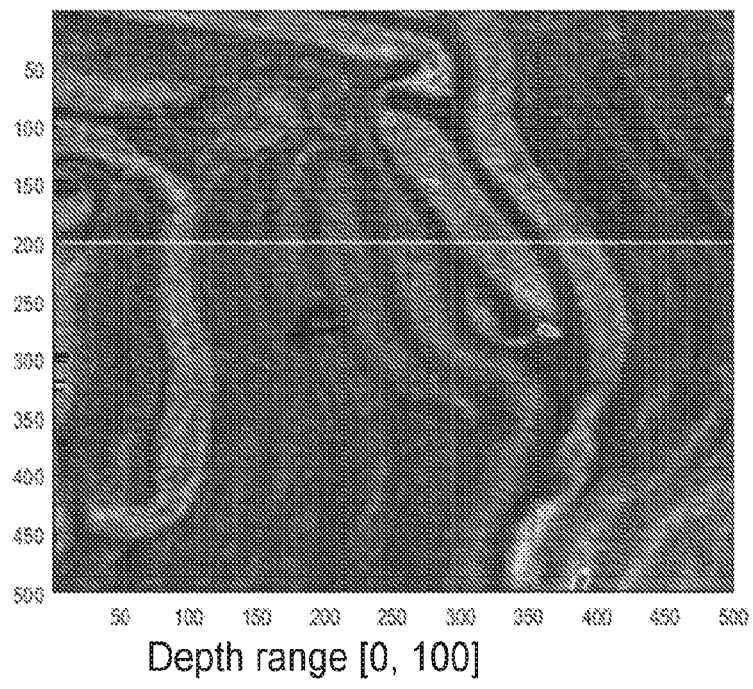
202
Depth range [0, 100]

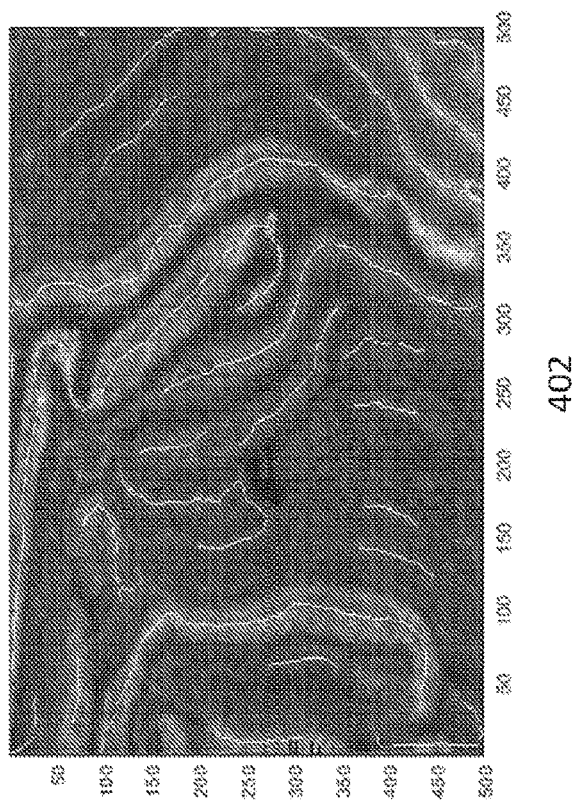
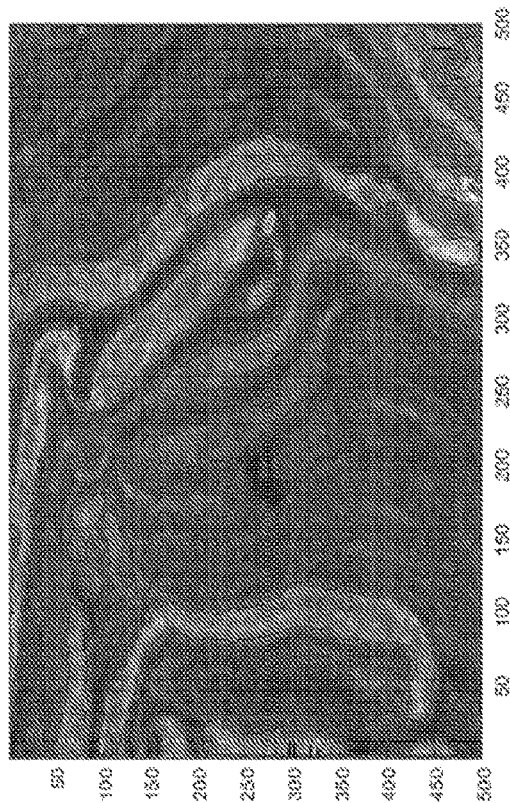
Figure 4 (cont.)

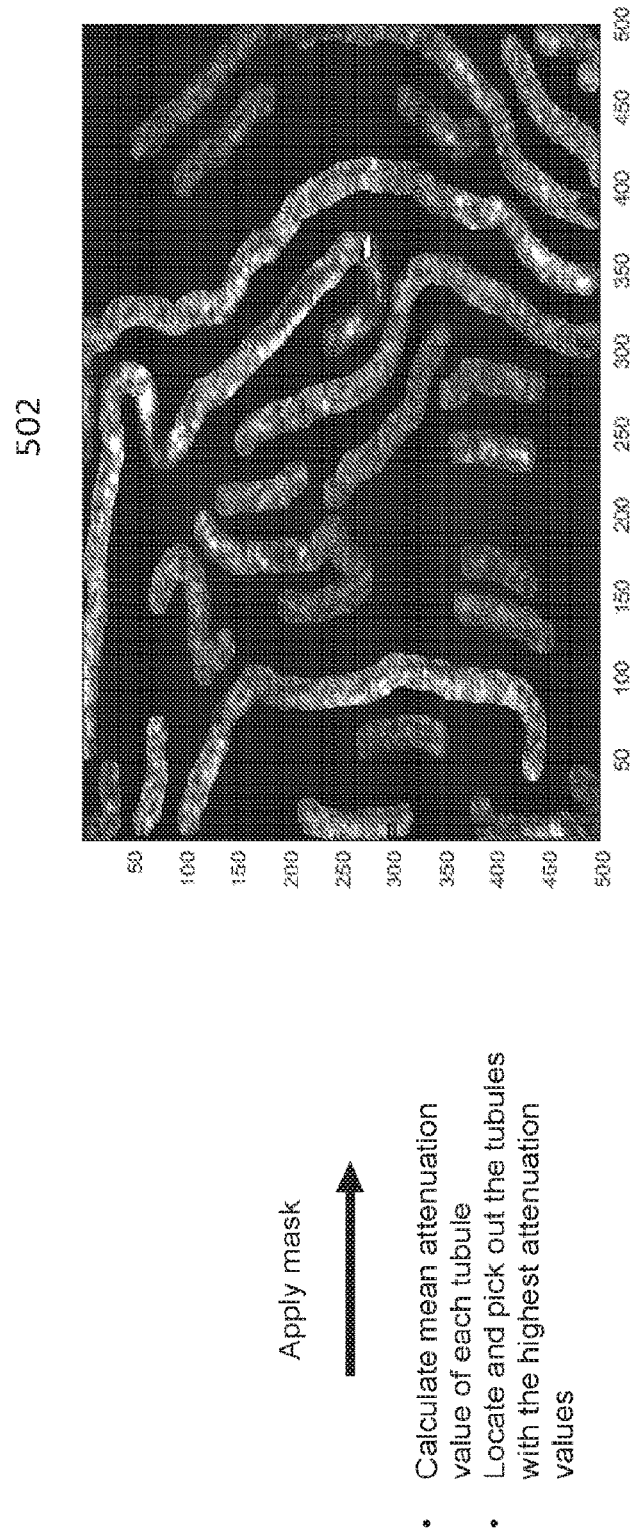

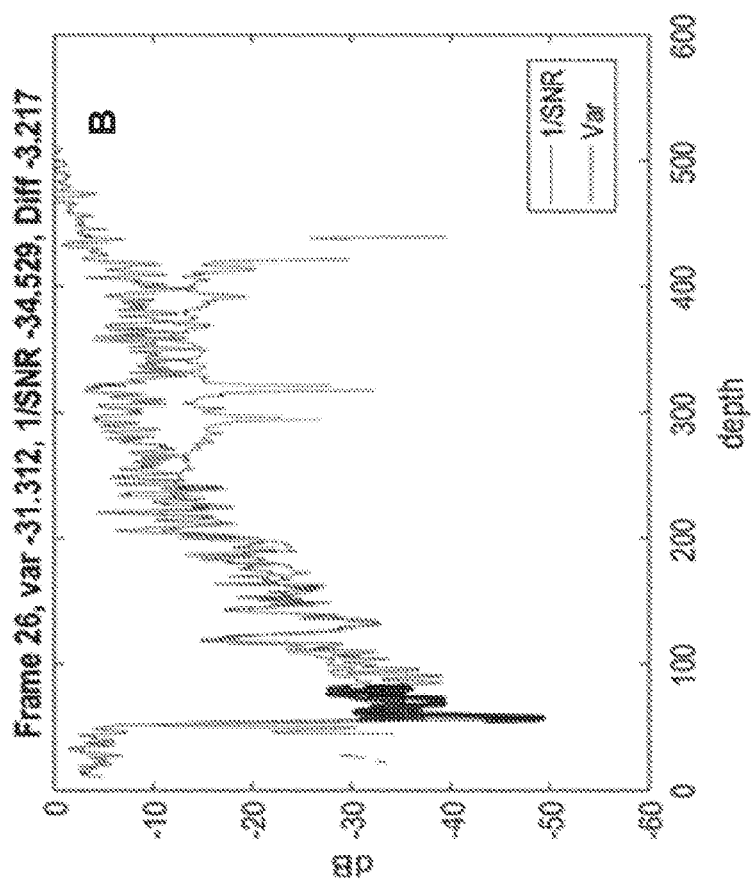
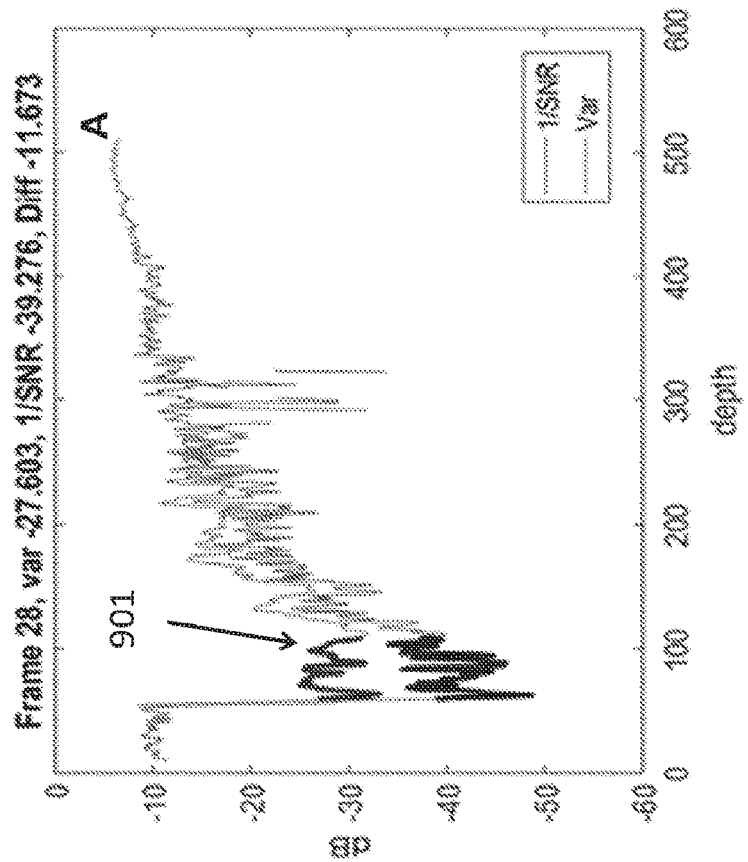
Figure 9

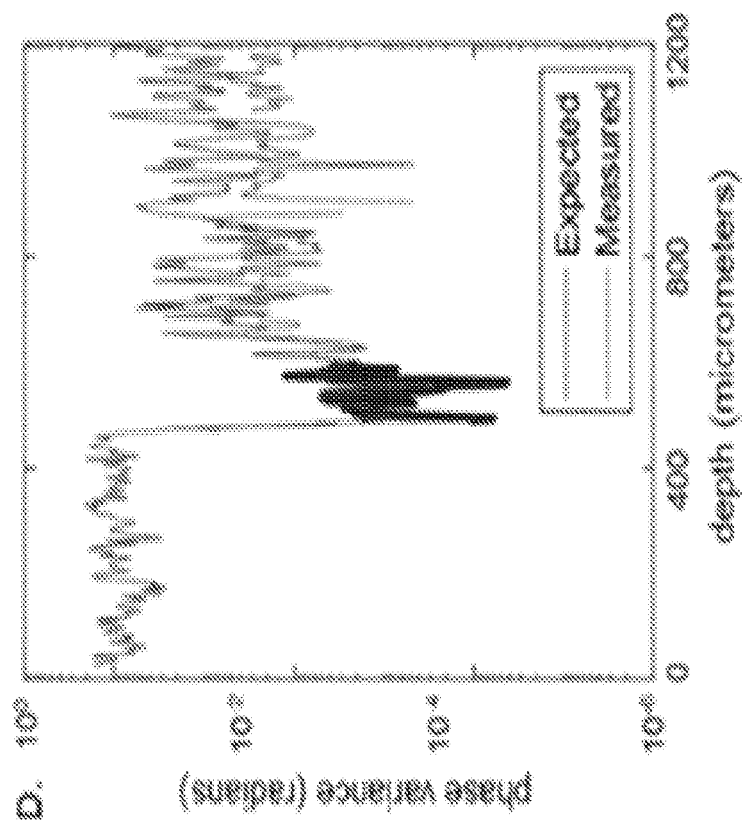
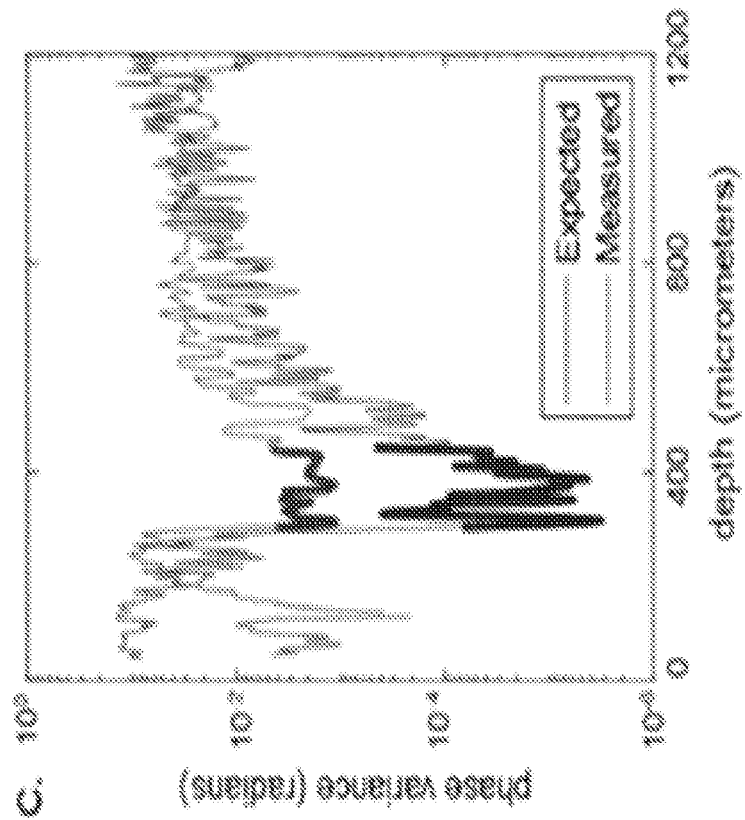
Figure 17 (cont.)

○ Range selection
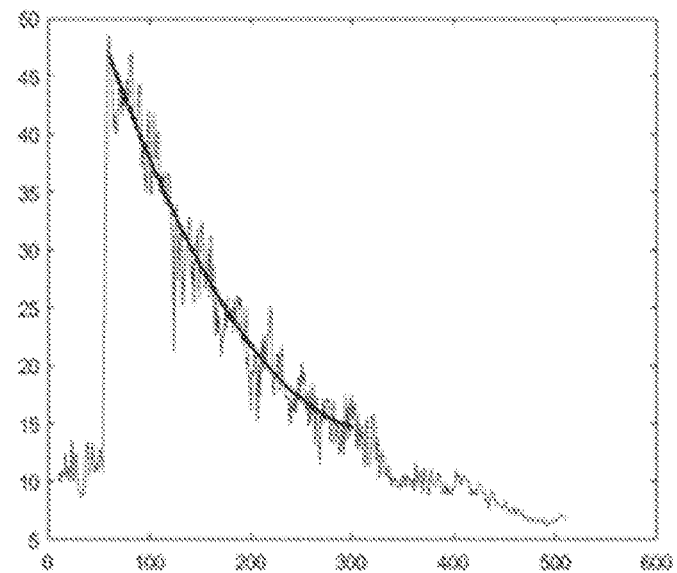
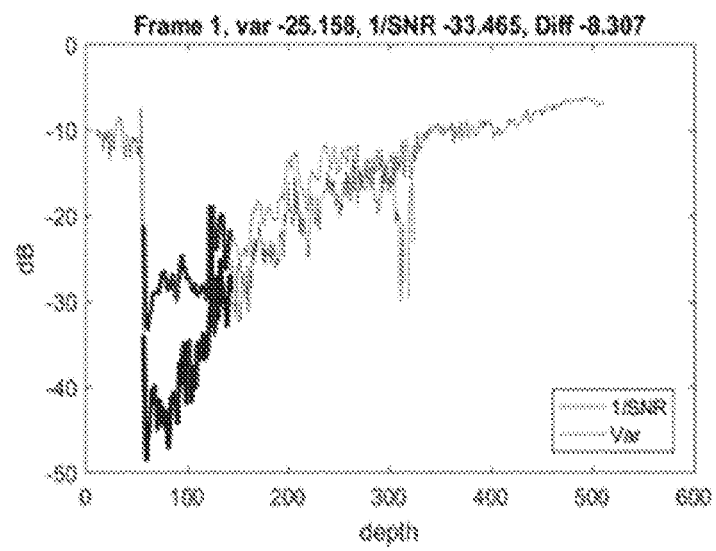
Figure 25

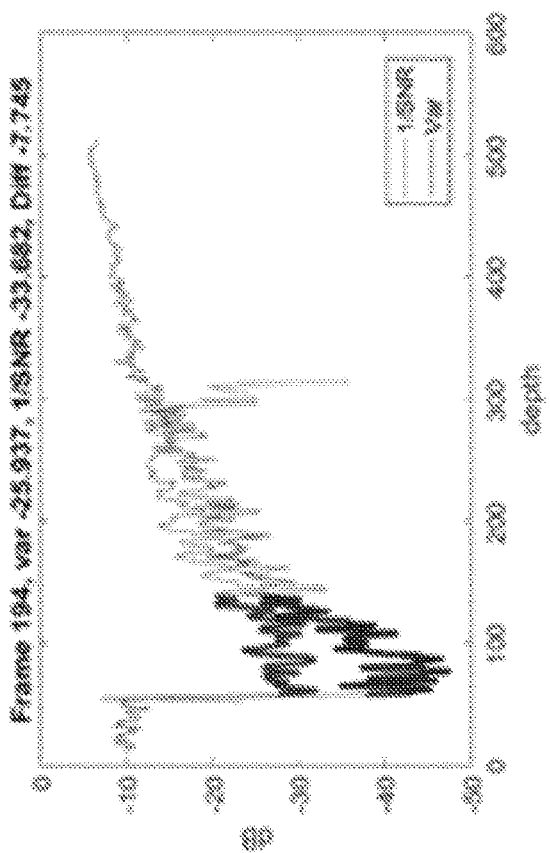
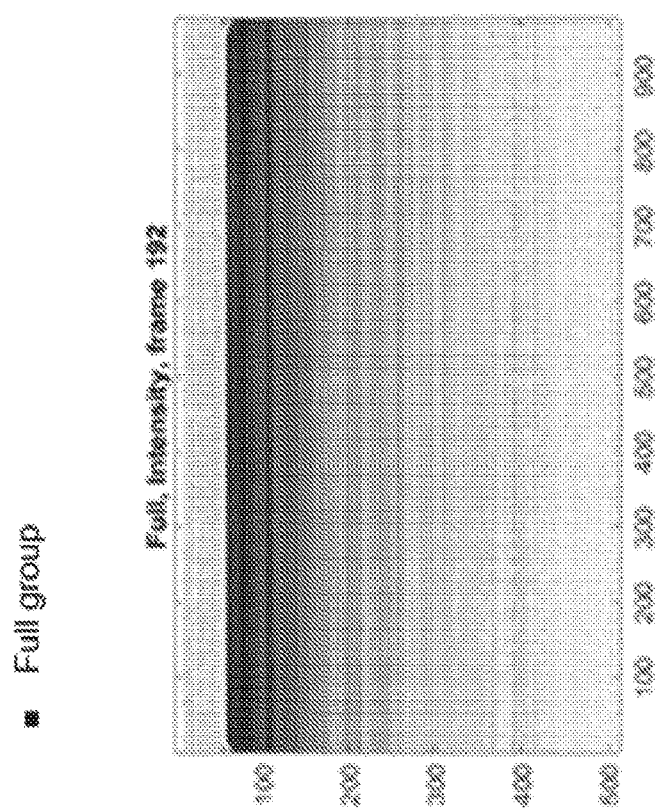
Figure 26

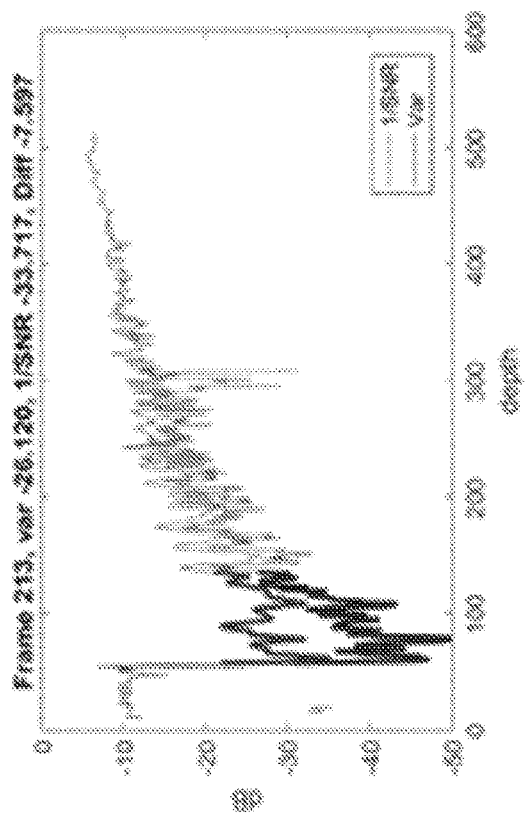
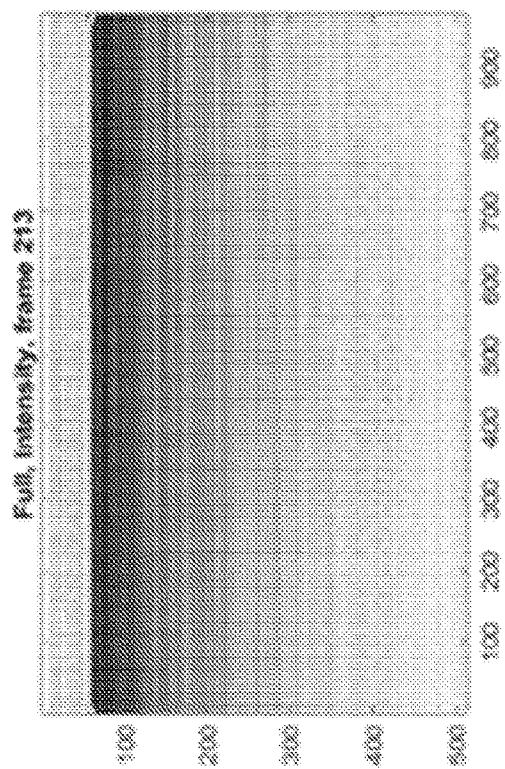
Figure 26 (cont.)

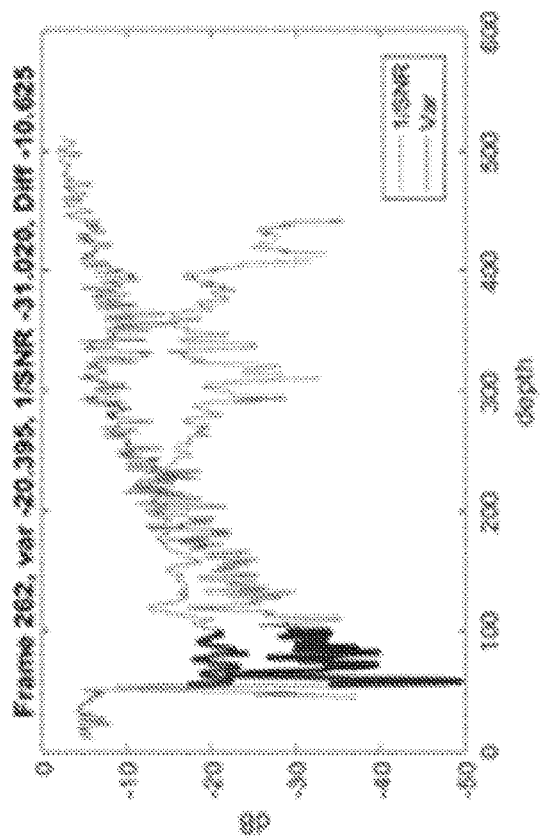
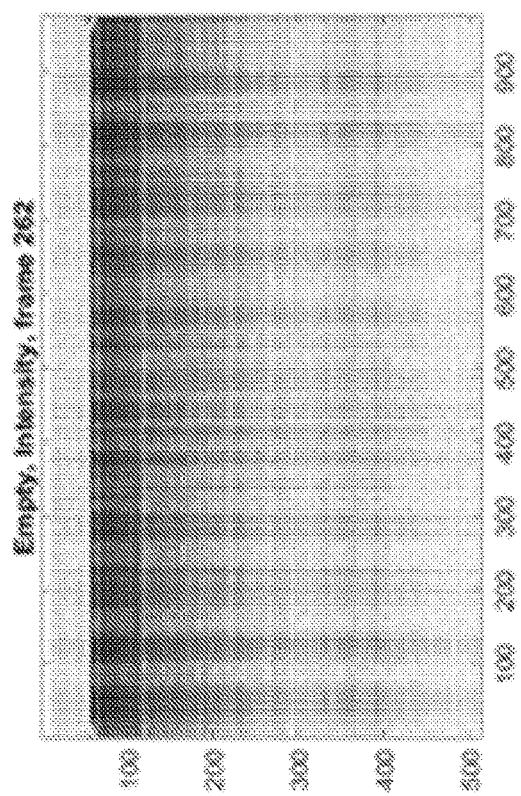
Figure 27 (cont.)

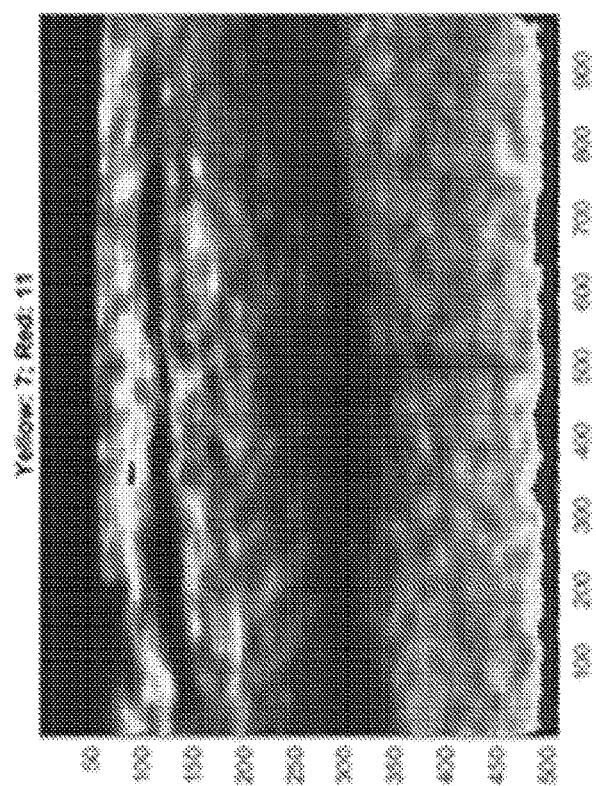
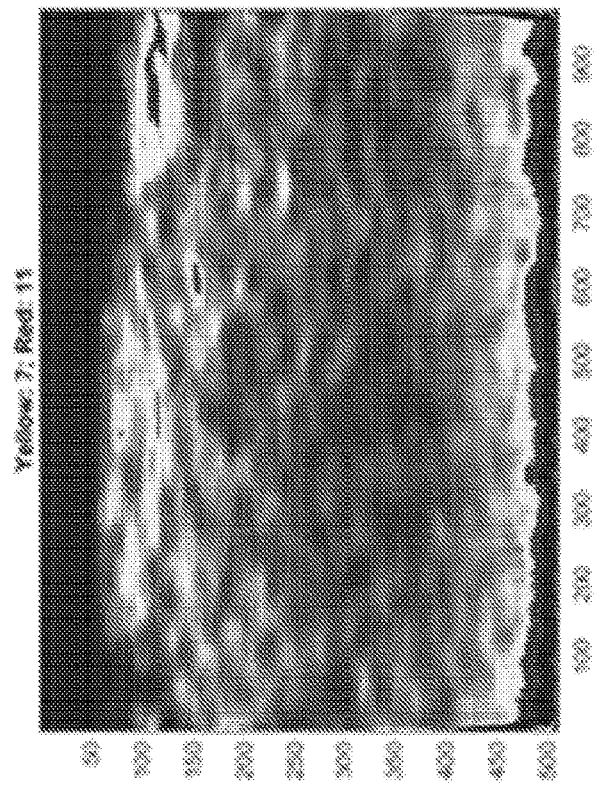
Figure 28

Testicle data reprocessing

A. En face attenuation coefficient image to map sperm distribution

Control (Full)

Testicle data reprocessing

A. En face attenuation coefficient image to map sperm distribution (with tunica)

Control (Full)

OPTICAL COHERENCE TOMOGRAPHY BASED SPERM DETECTION METHOD AND DEVICES AND SYSTEMS FOR PERFORMING THE SAME

CROSS REFERENCE TO RELATED APPLICATIONS

This application is a continuation of PCT Application No. PCT/US2020/048247 filed Aug. 27, 2020, which application, pursuant to 35 U.S.C. § 119 (e), claims priority to the filing date of the U.S. Provisional Patent Application Ser. No. 62/893,174, filed Aug. 28, 2019; the disclosures of which applications are herein incorporated by reference.

ACKNOWLEDGEMENT OF GOVERNMENT RIGHTS

This invention was made with Government support under contract R41 HD1022275 awarded by the National Institutes of Health. The Government has certain rights in the invention.

INTRODUCTION

Fertility issues occur in about 15% of married couples, with 40% of that number attributable to the male partner. Azoospermia, the absence of sperm in the ejaculate, is observed in 1% of the overall male population. The root cause of 40% of these cases is post-testicular obstruction that can be corrected by surgical procedures. However, the remaining 60% are classified as non-obstructive azoospermia (NOA), caused by congenital or acquired spermatogenetic defects, and is the most severe and difficult to treat form of male infertility. Before advances in assisted reproductive technology, the options for treating patients with NOA were limited to donor insemination.

Intracytoplasmic sperm injection (ICSI) provides hope for fathering a child for patients with NOA using surgically retrieved sperm from their testes for in vitro fertilization (IVF). The major remaining obstacle is how to find hidden sperm in NOA testes.

Surgical microdissection testicular sperm extraction, i.e., micro-TESE, in which a surgeon relies of visual cues of the outer surface of tubules in bi-valved testes to search for hidden pockets of sperm, under general anesthesia, has been developed as an advantageous technique for sperm extraction by a careful search for foci of seminiferous tubules harboring residual sperm. However, the success rate of the procedure, which typically takes 2 to 4 hours, is only 50% at best, even when performed by one of a select few surgeons with at least 50 cases of surgical practice in patients with NOA. Sections of tubule are dissected out of the testes based purely on experience-guided identification of subtle cues visible from just the outer surface of tubules. The ability to positively identify the presence or absence of sperm within a tubule before it is dissected out would clearly enhance the speed and effectiveness of the procedure.

To significantly increase the sperm retrieval rate, what is needed is a new technology to successfully find viable sperm.

SUMMARY

The present invention satisfies the above, and other, needs by providing an effective way to identify viable sperm. Aspects of the invention include a combination of phase-resolved OCT hardware and data processing algorithms to more efficiently and rapidly find small pockets of hidden sperm in seminiferous tubules in azoospermic testes. Aspects of the invention include a two-stage process for identification of hidden pockets of sperm that allows for real-time identification of tubules that can then be extracted for harvesting of sperm. The invention maximizes the likelihood of success (using extracted sperm for in vitro fertilization) while minimizing side effects of the procedure caused by excess removal of tissue from the testes. Methods may further include harvesting viable sperm, e.g., motile and viable sperm, from the location, e.g., for use in in vitro fertilization. Also provided are devices and systems for practicing the methods.

The first stage involves volumetric imaging of a field of view using optical coherence tomography, e.g., with cross-sectional images of back-reflected intensity. The surface of the tissue can be determined, and the outlines of the first layer of tubules then identified. The depth-resolved attenuation of the volume may be also computed from the OCT volume, and an en face reconstruction of the attenuation within the interior of the first layer of tubules can be formed. The presence or absence of sperm can be inferred from variations in the calculated attenuation information in the en face reconstruction, and a color overlay can be calculated that points to locations that are likely to contain sperm (as determined from optical attenuation).

The second stage involves M-mode scanning using, e.g., phase-resolved, optical coherence tomography at a particular site of interest (a lateral location previously identified in the first stage). Variations in optical phase from within the depth range determined to be the interior of the tubule can be compared to the phase variance to be expected purely from the signal-to-noise ratio (SNR) in the same region. In regions containing sperm, e.g., motile sperm, the actual phase variance is higher than that expected from the SNR in the region due to slight motions from the sperm, which are not necessarily causing bulk flow within the tubule but exhibit small amounts of motion within a confined space.

These two steps can be achieved with a phase-resolved optical coherence tomography system capable of providing sufficient depth penetration to see the interior of the first layer of tubules. Two additional advantages that can be achieved using an OCT system with a source in the visible wavelength range (or by coupling in a visible aiming beam into a system that uses wavelengths that are not visible to the naked eye) are: 1) the location of a tubule of interest is readily available to a surgeon (i.e., a tubule that has been determined to contain sperm needs to somehow be pointed at to a surgeon for extraction), and 2) exposure to visible and some near-IR wavelengths can temporarily increase sperm motility with no effect on its viability. This means that the second stage of imaging, designed to identify motile sperm, is even more likely to identify motile sperm as the light irradiation will increase the motility of the sperm being examined (and therefore enhance differentiation of motile from non-motile sperm). In some instances, OCT data collection is performed in the visible to infrared range.

In some embodiments, a visible aiming beam is coupled into the sample arm path of an OCT system that uses wavelengths outside of the visible spectrum. These embodiments have another potential advantage of providing a more robust functional assessment. A set of measurements can be taken with only the OCT beam incident on the location of interest, and compared to a set of measurements obtained during and/or after a second optical beam is introduced to the area of interest.

Also provided are OCT systems for performing methods of the invention. In addition to an OCT device configured to obtain OCT data, e.g., as described above, the systems may further include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for modulating (e.g., tilting, rotating, inactivating such as by applying an electric current) one or more micro-mirrors on the active surface of the digital micro-mirror device or for activating or inactivating (partially or fully) one or more photodetectors in the photodetector array.

BRIEF DESCRIPTION OF THE FIGURES

The invention may be best understood from the following detailed description when read in conjunction with the accompanying drawings. Included in the drawings are the following figures:

FIG. 1 depicts intensity and attenuation images according to certain embodiments.

FIG. 2A-B depict thin (FIG. 2A) and thick (FIG. 2B) en face averaging depths.

FIG. 9 demonstrates the detection of phase variance at a testicular location of interest.

FIGS. 19-28 depict experimental data detected by OCT in "full" (i.e., containing sperm) and "empty" (i.e., not containing sperm) seminiferous tubules.

DETAILED DESCRIPTION

Figure 2B:
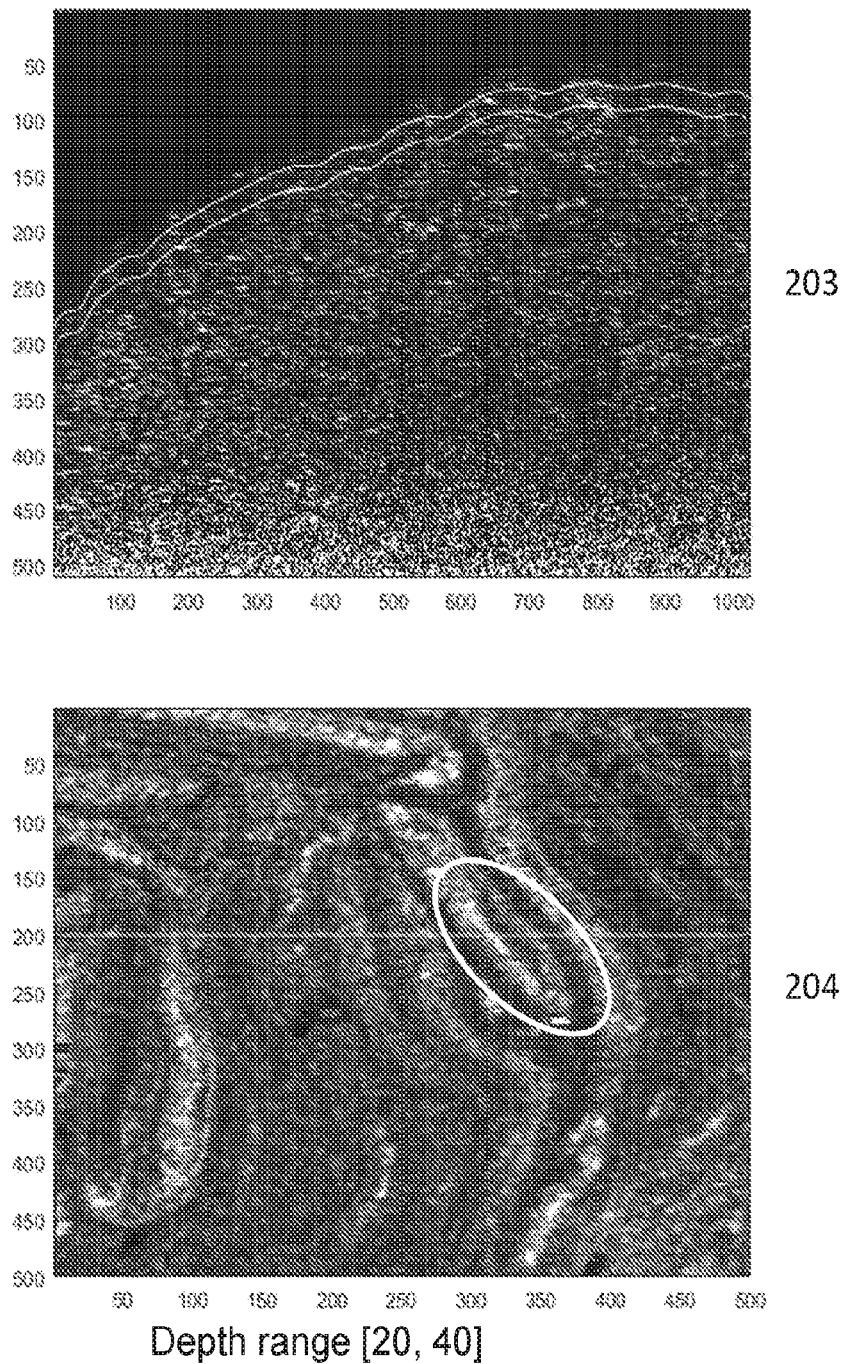

Aspects of the methods include volumetrically imaging testicular tissue by optical coherence tomography to identify a testicular tissue location that is likely to contain sperm; and M-mode scanning using optical coherence tomography the identified testicular location to determine whether sperm are at least likely to be present at the location. Methods may further include harvesting sperm from the location, e.g., for use in in vitro fertilization. Also provided are devices and systems for practicing the methods.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods for Optical Coherence Tomography Based Detection of Sperm

As summarized above, aspects of the invention include optical coherence tomography-based detection of sperm, e.g., motile sperm. The term "motile sperm" is employed to describe the ability of sperm tail wriggling or twisting to generate motion. Because healthy sperm cells are generally motile, locating viable sperm cells in the testicular tissue of a male subject suffering from azoospermia in embodiments of the invention includes identifying regions of the testicular tissue exhibiting volumetric morphology indicative of a reasonably high likelihood that sperm cells may be contained therein, and analyzing the identified region to determine whether sperm, e.g., motile sperm, are indeed present in the identified regions.

As discussed herein, "testicular tissue" may refer to one or more components of a male gonad where motile sperm cells are likely to be identified. In some embodiments, motile sperm cells are identified in one or more tubule locations contained within the testicular tissue. By "tubule location" it is meant a region of a seminiferous tubule, i.e., the finely coiled tubes that facilitate spermatogenesis. Such seminiferous tubules are arranged in lobules that are separated by fibrous septa extending between the mediastinum testis and the tunica albuginea. Each lobule may include one or more (e.g., 1, 2, 3 or more) seminiferous tubules. As such, in some embodiments, the testicular tissue of interest may include one or more lobules containing seminiferous tubules. The seminiferous tubules contain a basement layer that includes, e.g., connective tissue, elastic fibers, and flattened epithelial cells. In additional embodiments, the tubular location of interest within the testicular tissue may include the tubules of the rete testis. In additional embodiments, the tubular location of interest may include the tubules of the epididymis. Supporting cells are also be associated with the testicular tissue. For example, Sertoli cells that support germ cell development are found in the seminiferous epithelium, contractile peritubular myoid cells surround the tubules, and Leydig cells that produce and secrete testosterone are located between seminiferous tubules. Blood supply and lymphatic structures may also be found within the testicular tissue. In embodiments, testicular tissue analyzed in the instant method may or may not include the fibrous covering of the testicles, i.e., the tunica albuginea.

Subjects on which the methods may be performed may vary. The term "subject" is used interchangeably in this disclosure with the term "patient". In certain embodiments, a subject is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some embodiments, subjects are humans. In certain embodiments the human subject is a male, where the male may be identified as one suffering from non-obstructive azoospermia. In some embodiments, the identification of motile sperm is performed in vivo. In such embodiments, the subject may be anesthetized (e.g., administered local or general anesthesia), and testicular tissue may be exposed for analysis via scrotal incision. The identification of motile sperm may therefore be carried out concurrently with the surgery, i.e., in "real-time". In other embodiments, the identification of motile sperm may be performed ex vivo. In such embodiments, the identification of motile sperm may be carried out after a testicular tissue sample is excised from the subject Embodiments of the instant method consequently include volumetrically imaging the testicular tissue to identify one or more tubule locations that are likely to contain sperm. In embodiments, identifying one or more tubule locations includes distinguishing tubules (e.g., seminiferous tubules) from surrounding structures such as, e.g., supporting cells, blood supply structures and lymphatic structures that do not contain sperm. Of the one or more tubule locations within the testicular tissue, certain tubule locations that are more likely to contain sperm may be identified. In embodiments, tubule locations that are likely to contain sperm may be identified via volumetric imaging. In such embodiments, volumetric imaging includes the production of data that reflects the magnitude of the volume contained within a region under analysis (i.e., the one or more tubule locations).

In some embodiments, the testicular tissue is volumetrically imaged via optical coherence tomography (OCT). OCT has been described in, for example, Huang et al, (1991). Optical coherence tomography. *Science*, 254(5035), 1178-1181; herein incorporated by reference. OCT provides non-invasive cross-sectional imaging of biological tissues by measuring optical reflections and is based on low-coherence interferometry (i.e., extracting information from interfering light waves). OCT is generally employed via an optical system that includes a light source, a beam coupler, a reference arm, a sample arm and a detector. In some instances, the light source is a supercontinuum light source. In other embodiments, the optical system is configured to irradiate the sample with a near-infrared light beam. Light emitted by the light source is split by the beam coupler and passed to the reference arm and sample arm. The reference arm generally includes a mirror that reflects the emitted light, thereby producing reference light that may be used to generate an interference pattern when it is compared to light being reflected by the sample within the sample arm. Some regions of the sample reflect more light than others, giving rise to information regarding spatial (e.g., volumetric) dimensions of the sample. OCT may be employed to obtain depth-resolved cross-sectional images of tissue microstructure at any convenient sub-surface depth. In some embodiments, OCT produces cross-sectional images from 0-2 mm of sub-surface depth. In other embodiments, OCT methods as described herein may produce cross-sectional images above 2 mm of sub-surface depth. In embodiments, the produced cross-sectional images may display tissue microstructure at a resolution ranging from 1-10 μm.

The cross-sectional images discussed above may be intensity images or attenuation images. While an intensity image depicts the intensity of light collected from the testicular tissue during OCT, an attenuation image depicts the reduction of the intensity of the light as the light traverses the testicular tissue. The attenuation image can be described in terms of the attenuation coefficient (p). The attenuation coefficient may, in some embodiments, be calculated using Equation 1:

$$\mu = \ln\left(\frac{I_0}{I_x}\right)/x$$

As shown in Equation 1, μ is the attenuation coefficient, $I_0$ is the original light intensity, and $I_x$ is the light intensity at depth x. For example, FIG. 1 depicts an intensity image 101 and a corresponding attenuation image 102. It yet other embodiments, the attenuation may calculated in a depth-resolved manner with improved axial resolution using the method described by K. A. Vermeer, J. Mo, J. J. A. Weda, H. G. Lemij, and J. F. de Boer, "Depth-resolved model-based reconstruction of attenuation coefficients in optical coherence tomography," Biomed. Opt. Express 5, 322-337 (2014).

In certain embodiments, volumetrically imaging testicular tissue by OCT includes outlining a first layer of tubules in the testicular tissue. In such embodiments, the first layer may include tubules closest to the surface of the testicular tissue under analysis. In some embodiments, the first layer ranges from 0-2 mm of sub-surface depth. In further embodiments, the first layer is approximately 200 μm in depth. In other words, after OCT data containing information regarding spatial (e.g., volumetric) dimensions of testicular tissue is produced, embodiments of the instant method include detecting and recording contours of testicular tissue structures that are indicative of a tubular location of interest. In this process, an en face view reconstruction of attenuation is created so that the hollow interior can be exposed. As discussed herein, an "en face" view is a forward-facing view of the testicular tissue sample, i.e., where imaging is performed orthogonally relative to the surface of the sample. In embodiments, outlining a first layer of tubules includes performing an image gradient analysis that identifies tubule contours by characterizing directional change in the intensity of the image produced (e.g., via OCT) for the first layer of the testicular tissue sample. In some embodiments, the image gradient analysis is performed by fibermetric software, i.e., a program configured to enhance tubular structures in 2-D grayscale images using Hessian-based multiscale filtering. The fibermetric program is described at, for example, https://www(dot)mathworks(dot)com/help/images/ref/fibermetric(dot)html.

After the image gradient analysis is performed, embodiments of the method further include binarizing the image. In such embodiments, binarizing the image produced by image gradient analysis involves creating a raw mask, i.e., an image that primarily contains data regarding what is and is not considered a tubule and in which unrelated information is filtered out. In some instances, different regions of the en face reconstruction may be assigned one of two different categories. In such embodiments, a region of the en face reconstruction may be assigned one category if it corresponds to a tubule, and a second category if it corresponds to non-tubule tissue. In some embodiments, regions of the en face reconstruction that correspond to a tubule may be represented in a binarized image (i.e., a raw mask) by a white color, while regions en face reconstruction that correspond to non-tubule tissue may be represented hi the binarized image by a black color.

Embodiments of the invention further include producing a tubule skeleton and tubule contours based on the image gradient analysis and binarized image (i.e., raw mask). In embodiments, a tubule skeleton is represented by a line that runs along the middle of the tubule in the en face view reconstruction and denotes the general shape and positioning of the tubules. Tubule contours, on the other hand, define the boundaries of the tubules. In embodiments, en face tubular structure may be detected at a thick depth range. A depth range may be thin or thick depending on the range of attenuation data included in the tubular structure analysis. For example, in embodiments, a "thick" depth range may average OCT attenuation data from within a depth range of 0 μm to 100 μm.

Figure 3:
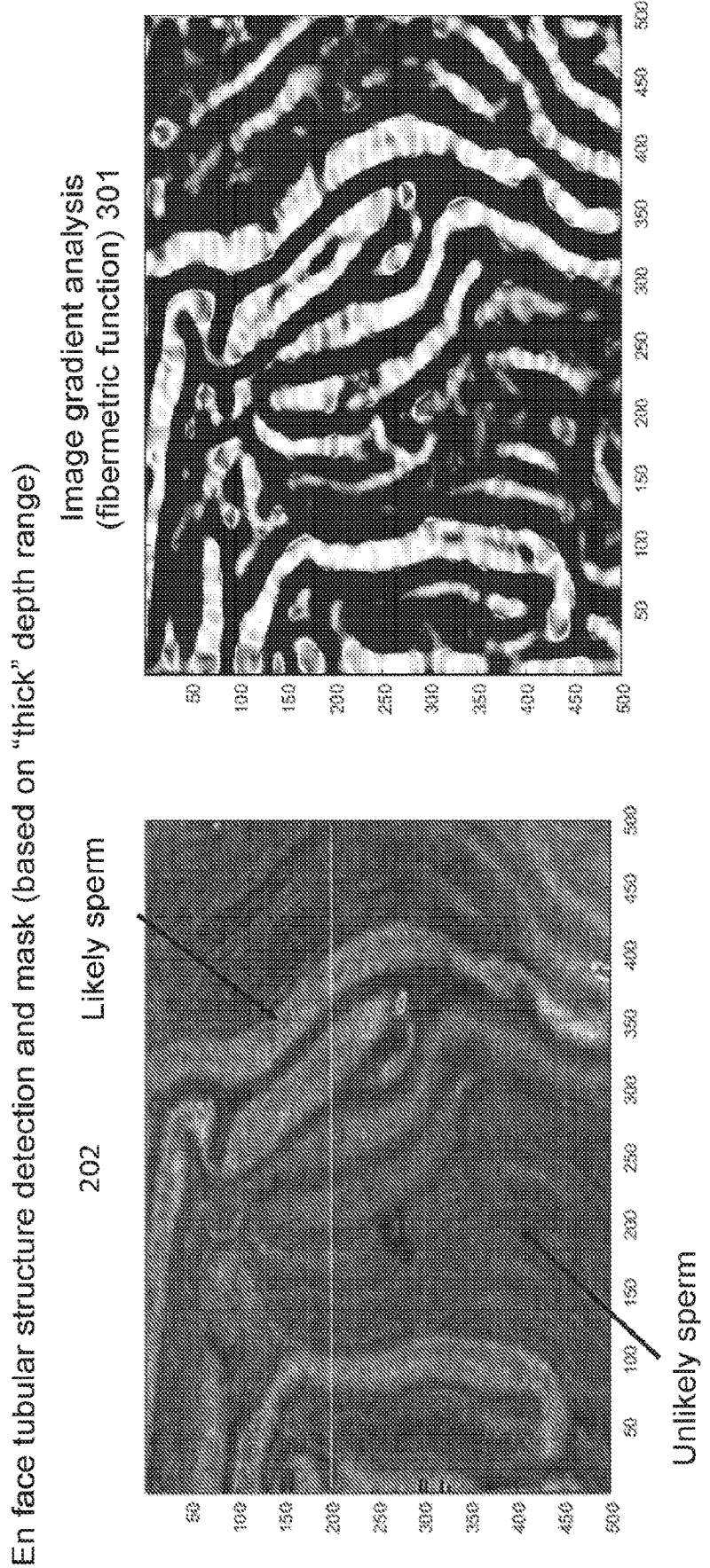
FIG. 3 depicts image gradient analysis, image binarization and raw mask formation according to certain embodiments.
Figure 3:
Figure 4:
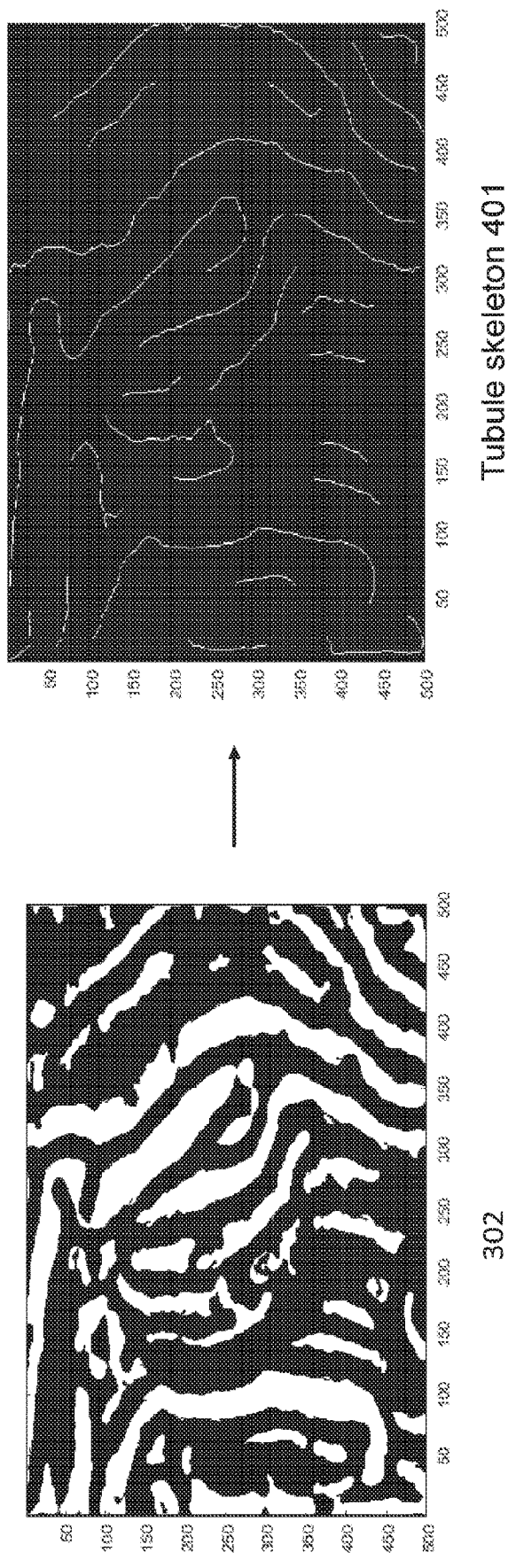
FIG. 4 depicts en face tubular structure detection.

For example, FIG. 2A depicts an image 201 demonstrating the layer of the testicular tissue used for the thick en face view, and a resulting en face view 202 based on that thick averaging depth. FIG. 3 presents an image 301 generated following image gradient analysis of image 202. A binarized image (i.e., raw mask) 302 is then created based on image 301 generated following image gradient analysis. For reference, FIG. 3 also presents an annotated version of image 202 that denotes regions in which sperm are likely to be found. FIG. 4 presents en face tubular structure detection based on the raw mask 302 shown in FIG. 3. Both the tubule skeleton 401 and tubule contour 403 images are produced as discussed above from the raw mask 302. Image 402 further depicts the tubule skeleton shown in image 401 imposed onto the en face view 202.

After determining en face tubular structure and producing an en face reconstruction of the attenuation within the interior of the first layer of tubules, embodiments of the invention further include inferring the presence or absence of sperm from variations in the calculated attenuation information in the en face reconstruction. In some embodiments, inferring the presence or absence of sperm from variations in the calculated attenuation information involves excluding from further analysis tubules that likely do not contain sperm. In such embodiments, tubules in which the middle line (i.e., skeleton; generated as discussed above) does not cross an area of high attenuation exhibit a low likelihood of containing motile sperm and may subsequently be discarded. In certain instances, inferring the presence or absence of sperm from variations in the calculated attenuation information involves selecting tubules that exhibit the highest mean attenuation values. In some embodiments, of the tubules that have not been excluded from further analysis due to low likelihood of containing sperm, a given number of tubules with the highest attenuation may be selected for further analysis. The given number of tubules with the highest attenuation may be selected for further analysis may vary as desired, and may include 1 or more tubules, 2 or more tubules, 3 or more tubules, 4 or more 5 or more tubules and 6 or more tubules and including 7 or more tubules. In some embodiments, the presence or absence of sperm is inferred based on attenuation information calculated from a thin depth range. In embodiments, a "thin" depth range may average OCT attenuation data from within a depth range of 20 μm to 40 μm. In some instances, the mean attenuation values used for inferring the likelihood of the presence of sperm are calculated from attenuation information observed from the thin depth range. In some instances, inferring the likelihood of the presence of sperm includes generating a second mask based on the tubule skeleton in which the skeleton is "expanded" so that the volume of the expanded skeleton encompasses the volume of the tubule. Attenuation information encompassed within the second mask based on the tubule skeleton may then be averaged.

Figure 5:
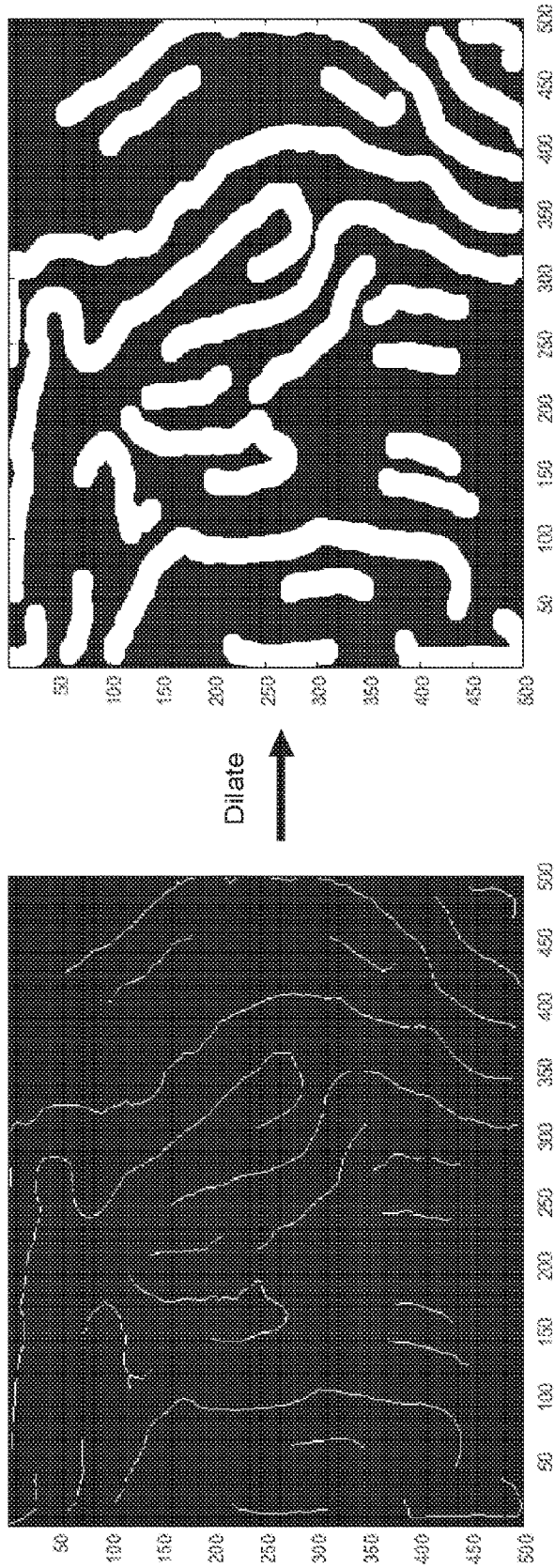
FIG. 5 depicts the application of a second mask for averaging attenuation according to certain embodiments.
Figure 6:
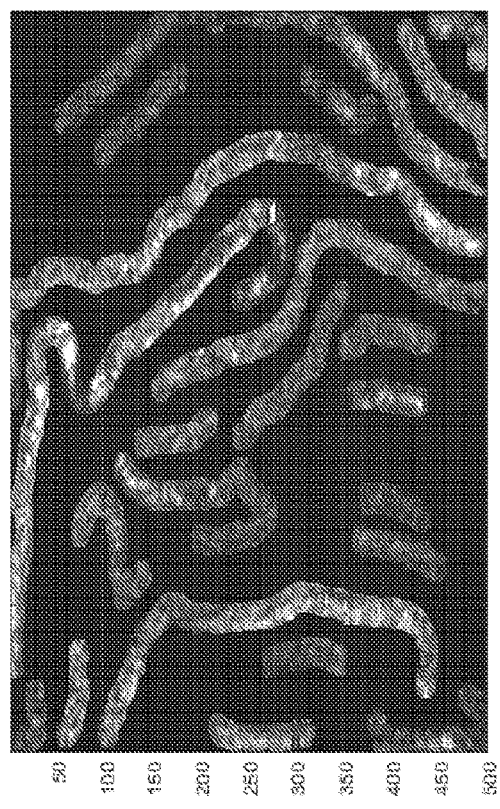
FIG. 6 depicts the selection of tubules with largest mean attenuation values.
Figure 6:
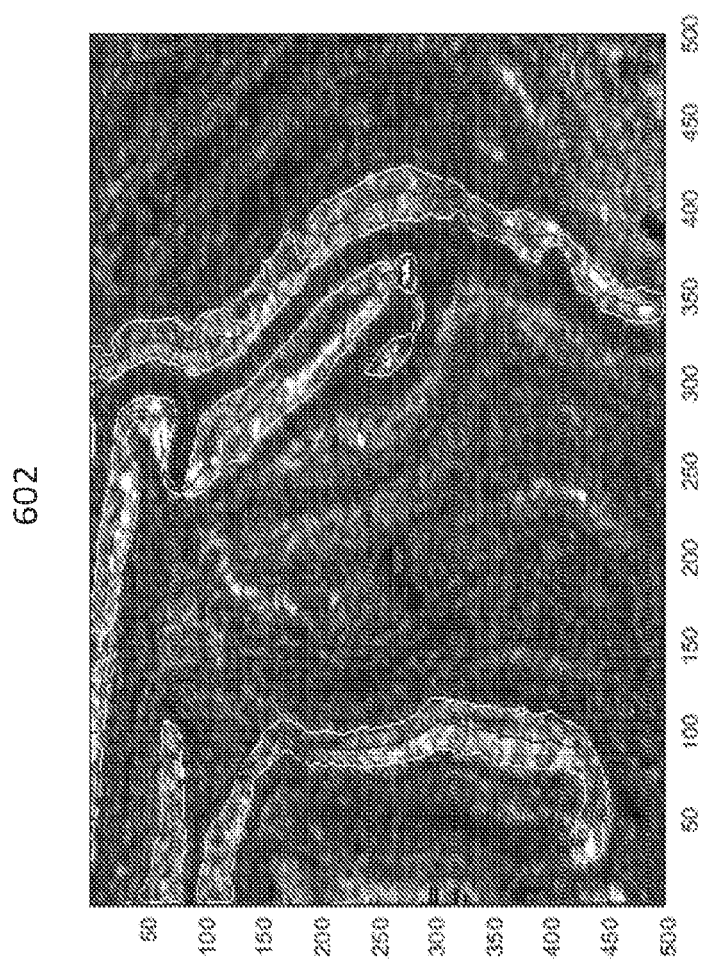

For example, FIG. 2B depicts an image 203 demonstrating the layer of the testicular tissue used for the thin en face view, and a resulting en face view 204 based on that thin averaging depth. FIG. 5 depicts the generation of the second mask 501 by expanding the skeleton 401. The second mask 501 is subsequently overlaid on en face representation 204 calculated based on the thin depth range in image 502. The mean attenuation values for each tubule (i.e., as defined by the second mask) are computed. FIG. 6 depicts the process of excluding tubules that likely do not contain sperm from further analysis and selecting a number of tubules exhibiting the highest mean attenuation. Of the tubules shown in the second mask 501, tubules exhibiting the highest mean attenuation values are selected and shown in image 601 and highlighted in en face representation 602.

In additional embodiments, the method further comprises calculating a color overlay that identifies one or more tubule locations that are likely to contain sperm. As described herein, a "color overlay" is imposed onto an en face representation and indicates the likelihood that sperm is present in a particular location by color-coding that location. In certain embodiments, calculating a color overlay includes evaluating mean attenuation values relative to threshold values. In such embodiments, mean attenuation values associated with a particular range of threshold values are assigned a certain color in the color overlay. Any convenient threshold values and colors may be used to calculate the color overlay described herein. In some embodiments, the colors selected for the color overlay are red and yellow. In certain instances, for example, attenuation values from 3.0 mm$^{-1}$ to 3.5 mm$^{-1}$ may be assigned yellow, while attenuation values higher than 3.5 mm$^{-1}$ may be assigned red. In embodiments, the color overlay is calculated with respect to the tubule skeleton and subsequently extrapolated to the remainder of the tubule from the tubule skeleton. In other words, the attenuation values along the tubule skeleton are calculated and color coded. Next, the skeleton is expanded such that it encompasses the volume of the tubule, thereby color coding the entire tubule with the likelihood that sperm is contained therein. The color coding of the color overlay may then be analyzed by a surgeon to determine areas of particular interest for harvesting sperm cells.

Figure 7:
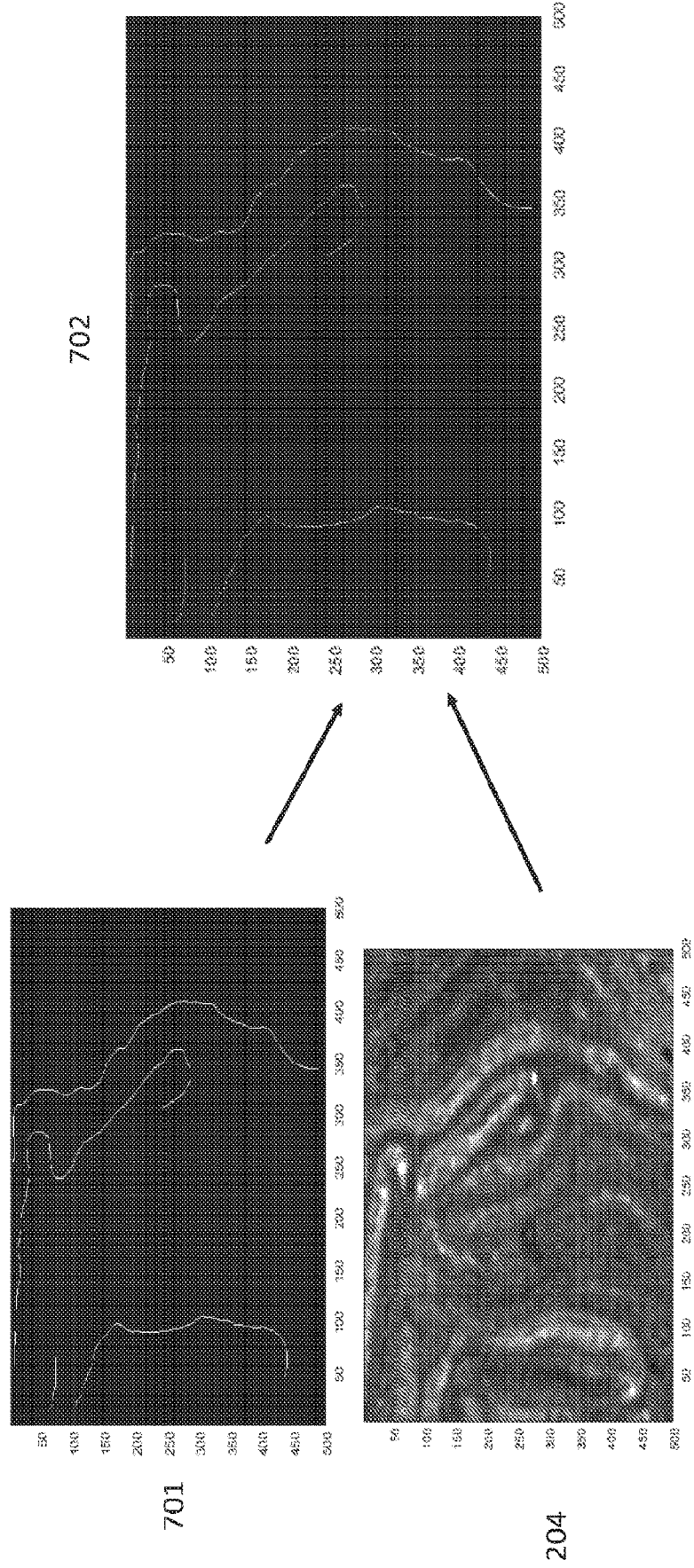
FIG. 7 depicts color thresholding within tubules based on mean attenuation values.
Figure 7:
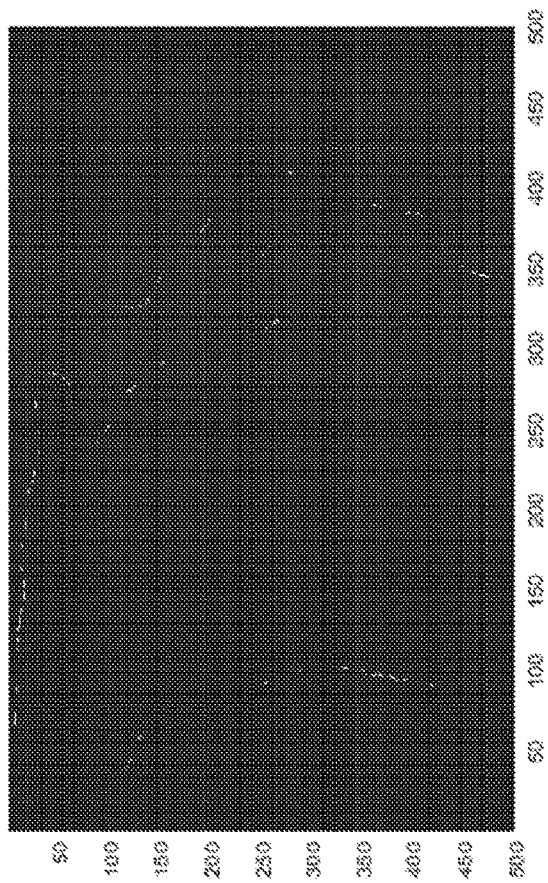
Figure 8:
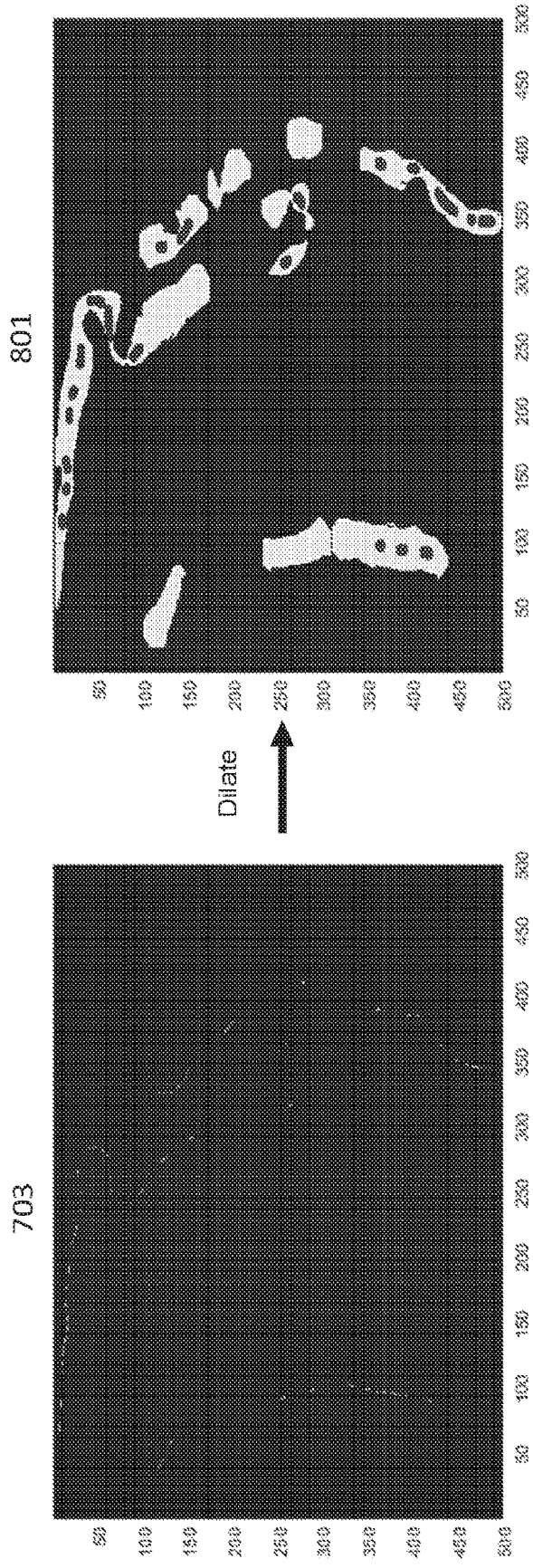
FIG. 8 depicts the creation of a color overlay based on the color thresholding according to certain embodiments.
Figure 8:
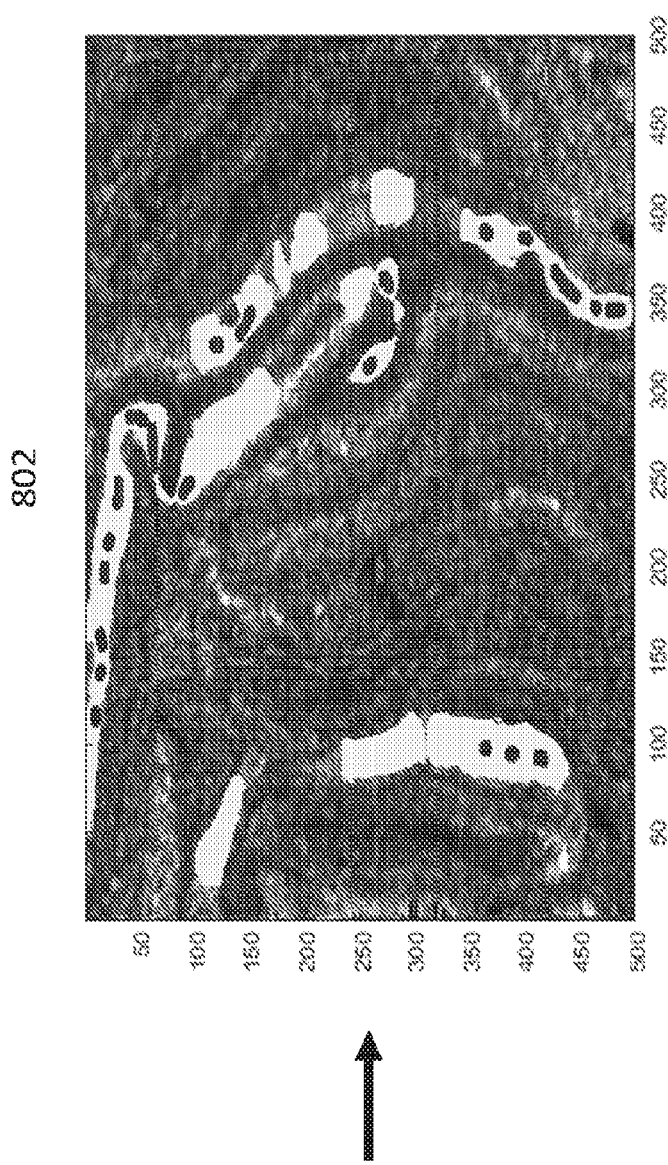

For example, FIG. 7 depicts the process of thresholding within the tubules. Image 701 presents the skeletons of the tubules exhibiting the highest average attenuation values (i.e., determined as shown in FIG. 6), and image 202 is the en face representation generated based on the thin averaging depth. Image 702 shows the skeletons from image 701 imposed on the en face representation 202. Image 703 depicts skeletons that are color coded based on the attenuation information from en face representation 202. Color overlay 801 presented in FIG. 8 demonstrates how the color-coded skeletons shown in image 703 may be expanded (i.e., dilated) such so that the color code pattern from the skeletons is extrapolated to the entire relevant volume of the tubule. The color overlay shown in image 801 is then imposed onto the en face representation in image 802.

After one or more regions, e.g., tubules, of particular interest for harvesting sperm cells are identified (e.g., as described above), aspects of the invention further include M-mode scanning the identified testicular location by OCT to determine whether motile sperm are at least likely to be present at the tubule location. By "M-mode scanning" it is meant detecting whether or not motile sperm is present at a specified lateral location. In other words, while volumetric imaging involves scanning an area of testicular tissue, M-mode scanning provides a one-dimensional indication of whether motile sperm are present in a lateral location of interest that has been identified following the volumetric imaging. By determining whether motile sperm are at least likely to be present at the tissue, e.g., tubule, location, it is meant that an assessment, e.g., in the form of a prediction, inference, etc., is made that motile sperm are at least likely to be present at the tissue, e.g., tubule, location.

In some embodiments, M-mode scanning the identified testicular location using OCT includes identifying variations in optical phase at the tubule location(s). In other words, OCT is used to detect phase variance at the testicular location of interest. As discussed above, OCT obtains data by generating an interference comparison between reference light and light that is reflected by the sample. Because healthy sperm are motile, a tubule location containing such healthy sperm will exhibit movement (e.g., in the form of flagellar beating and other slight motions). Advantageously, this movement will create phase variance when the tubular location is observed via OCT because no movement will be "expected" from the interference pattern, but the movement is nonetheless observed in the sample. Embodiments of the method therefore include identifying tubule locations where the actual phase variance exceeds the expected phase variance as tubule locations where motile sperm are at least likely to be present. As such, when these variations in optical phase are observed, it can be deduced that there is a reasonably high likelihood that motile sperm are present at the lateral location being investigated by M-mode scanning. In some embodiments, variations in optical phase from within the depth range determined to be the interior of the tubule can be compared to the phase variance to be expected purely from the signal-to-noise ratio (SNR) in the same region. The actual phase variance is higher than that expected from the SNR in the region due to slight motions from motile sperm, which are not necessarily causing bulk flow within the tubule but exhibit small amounts of motion within a confined space. In embodiments, the expected phase variance noise is obtained by Equation 2:

$$\sigma^2_{SNR}(z) = (2/SNR(z))^{-\frac{1}{2}}$$

As shown in Equation 2, z is axial depth of the lateral scanned spot and SNR is the signal to noise ratio.

For example, FIG. 9A-B demonstrates the detection of phase variance at a testicular location of interest. FIG. 9A depicts phase variance caused by the presence of motile sperm in a tubule location. The phase variance is evidenced by the separation 901 of the expected (red) and measured (blue) lines. On the other hand, a tubule location that does not contain motile sperm (analyzed in FIG. 9B) does not exhibit phase variance between the expected and measured lines.

In some embodiments, M-mode scanning the identified testicular location additionally includes irradiating the testicular tissue with a visible light beam. Exposure to visible and some near-IR wavelengths has been discovered to temporarily increase sperm motility without affecting its viability. As such, in embodiments where M-mode scanning is applied to identify motile sperm, visible light irradiation may increase the motility of the sperm being examined and consequently enhance differentiation of motile sperm from non-motile sperm. In embodiments of the invention in which the testicular tissue sample is irradiated by a supercontinuum light source in the course of OCT, visible light from the light source that irradiates the sample will have the effect of increasing motility in the sperm. In other embodiments in which OCT includes irradiating the testicular tissue with a near-infrared light beam, the testicular tissue sample may be irradiated by a separate functional assay light source that emits a light beam in the visible spectrum. In such embodiments, the visible light beam emitted by the separate functional assay light source may be co-aligned with the near-infrared beam such that the two light beams at least partially share the same optical path. In some embodiments, the sample may be irradiated by the visible light beam before the near-infrared beam, i.e., so that sperm motility is enhanced prior to observation via OCT. In other embodiments, the sample may be irradiated by the visible beam while it is being irradiated by the near infrared beam, i.e., to observe enhanced motility in real-time.

In some embodiments, the wavelength for M-mode OCT imaging can be in a wavelength range that, by itself, does not affect the motility of sperm. A baseline measurement of phase-resolved and/or intensity/attenuation-based OCT measures can be taken. A second beam, coupled into the beam path of the OCT beam as described in the previous paragraph, can then be introduced and a second measurement of phase-resolved and/or intensity/attenuation-based OCT measures can be taken and compared to the baseline measurement for a more robust functional assessment of the presence or absence of sperm. This can have the potential advantage of allowing for improved discrimination between sperm and other portions of a sample that might contain elevated phase variance, such as in blood vessels.

Aspects of the invention may further include axial motion tracking of the testicular tissue. In such embodiments, the axial motion tracking may be performed by a rapid scanning optical delay (RSOD) line. RSOD is described in, for example, Kolakoltsev, et al. (2018). Rapid scanning optical delay line based on a diffraction grating pair for a low-coherence reflectometer. *Applied optics*, 57(16), 4542-4550; herein incorporated by reference. The RSOD line described herein may be incorporated into the reference arm of the OCT optical system described above to counter the periodic axial displacement of the testes caused by e.g., the subject's breathing. The RSOD line accomplishes this by periodically scanning through a range of delays, thereby compensating for some amount of axial motion.

Systems for Optical Coherence Tomography Based Detection of Sperm

As discussed above, aspects of the invention further include systems for OCT-based detection of sperm. In embodiments, the system includes an optical system configured to perform OCT. As discussed above, OCT provides non-invasive cross-sectional imaging of biological tissues by measuring optical reflections and is based on low-coherence interferometry (i.e., extracting information from interfering waves). As such, in embodiments, systems for OCT-based detection of sperm include a light source, a beam coupler, a reference arm, a sample arm and a detector. Additional embodiments of the system include a processor configured to identify motile sperm in testicular tissue based on information received from the optical system.

As discussed above, systems of interest include a light source. In some embodiments, the light source is a broadband light source, i.e., a light source that produces a broad, continuous range of light frequencies and wavelengths. As such, broadband light sources may exhibit a large optical bandwidth and emit light in the visible, ultraviolet and infrared ranges. In addition to broadband, sources more typically used in OCT, such as Ti:Saph femtosecond lasers, broadband SLEDs, or wavelength swept sources in the near-IR or IR ranges may be employed. In some embodiments, the instant light source is a supercontinuum light source, e.g., a supercontinuum laser. For example, the supercontinuum light source may be a Fianium supercontinuum laser, the output of which may be optionally restricted to a range between 600 and 700 nm using dichroic filters. In embodiments, the supercontinuum light source possesses bandwidth of 120 nm centered at 1298 nm. In further embodiments, the instant light source may be configured to emit a narrower spectral range. For example, the light source described herein may be configured to emit near-infrared light, i.e., light within and surrounding the infrared range on the electromagnetic spectrum. In some embodiments, the light source emits a near-infrared light beam with a wavelength centering around 800 nm. The light emitted by the light source may be modulated by any number of light beam shaping optical components. In embodiments, light beam shaping optical components include but are not limited to, lenses, mirrors, filters, fiber optics, wavelength separators, pinholes, slits, collimating protocols and combinations thereof that can be arranged as desired. In some embodiments, the light source is aligned with a polarizing beam splitter and an electro-optic polarization modulator such that transmitted light can be toggled between polarization states that are perpendicular in a Poincaré sphere representation.

In further embodiments, systems include a beam coupler configured to split incident light at a designated ratio into two separate beams. In additional embodiments, the instant beam coupler may also be configured to combine two different beams into one. The instant coupler may transmit incident light at any convenient coupling ratio, i.e., the ratio of the optical power from each output port of the beam coupler to the sum of the total power of both output ports as a function of wavelength. In some instances, the beam coupler possesses a 75/25 coupling ratio. In other embodiments, the beam coupler possesses an 80/20 coupling ratio. In still other embodiments, the beam coupler possesses a 90/10 coupling ratio.

Systems of interest further include a reference arm. In embodiments, the reference arm includes a reference mirror that back-reflects light and returns it to the beam coupler. In other words, the back-reflected light propagates along the same path it originated from but in the opposite direction. The reference arm may additionally include lenses and filters that may be arranged as desired to control specific beam parameters such as shape, depth of focus and the intensity distribution of the light. In additional embodiments, the reference arm also includes one or more components associated with a rapid scanning optical delay (RSOD) line. In such embodiments, the instant reference arm may include a scanning mirror that is configured to alter its position over time, thereby producing a delay. In some instances, the scanning mirror is included in addition to a reference mirror, while in other instances the scanning mirror is included in place of the reference mirror. In further embodiments, the reference arm also includes one or more diffraction gratings or lenses.

Embodiments of the invention further include a sample arm configured to irradiate the testicular tissue sample. In embodiments, the sample arm includes the testicular tissue sample under analysis and one or more lenses, filters and mirrors that may be arranged as desired to control specific beam parameters such as shape, depth of focus the intensity distribution of the light, and to focus the beam on the sample. The sample arm is configured such that light is outputted from one end of the beam coupler, passes through one or more light beam shaping optical components, contacts the sample, and is back-reflected along the same path it originated from but in the opposite direction. In some embodiments, the sample arm may additionally include a functional assay light source configured to emit light in the visible spectrum. As discussed above, the visible light emitted by the functional assay light source may enhance motility of the sperm in the testicular tissue sample. In embodiments, the sample arm is configured such that visible light beam produced by the functional assay light source follows an optical path that is at least partially colinear with the optical path defined by light emitted from the first light source described above.

Systems of interest further include one or more detectors configured to collect light that has been back-reflected from the reference arm and the sample arm. Prior to detection, systems of interest may include one or more light beam shaping optical components configured to control specific beam parameters such as any number of collimators, diffraction gratings and lenses. Any convenient means for detecting light may be used for the detector described herein. In some embodiments, the detector is a Goodrich line scan camera (SU1024LDH, 1024 pixel InGaAs 14-bit Camera-Link output at 45 kHz). In other embodiments, the detector is a 4096 point line scan camera (Basler Sprint 4096 km). In other embodiments, the detector can be comprised of a balanced detector with photodiodes with a wavelength-swept light source.

In certain embodiments, the subject systems additionally include a processor having memory operably coupled to the processor wherein the memory includes instructions stored thereon, which when executed by the processor, cause the processor to identify motile sperm. In embodiments, the processor is operably connected to the detector such that OCT information regarding properties of the testicular tissue collected therefrom is relayed to the processor.

The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

In embodiments, the processor is configured to identify one or more tubule locations that are likely to contain sperm. In embodiments, identifying one or more tubule locations includes distinguishing tubules (e.g., seminiferous tubules) from surrounding structures such as, e.g., supporting cells, blood supply structures and lymphatic structures that do not contain sperm. Of the one or more tubule locations within the testicular tissue, certain tubule locations that are more likely to contain sperm may be identified. In embodiments, tubule locations that are likely to contain sperm may be identified via volumetric imaging. In such embodiments, volumetric imaging includes the production of data that reflects the magnitude of the volume contained within a region under analysis (i.e., the one or more tubule locations).

In embodiments, the processor is configured to generate cross-sectional images based on information received from the system detector(s). The cross-sectional images may be intensity images or attenuation images. In embodiments, images generated by the processor may be shown on one or more displays or monitors that may be arranged as desired. While an intensity image depicts the intensity of light collected from the testicular tissue during OCT, an attenuation image depicts the reduction of the intensity of the light as the light traverses the testicular tissue. The attenuation image can be described in terms of the attenuation coefficient ($\mu$). The attenuation coefficient may be calculated using Equation 1:

$$\mu = \ln\left(\frac{I_0}{I_x}\right)/x$$

As shown in Equation 1, $\mu$ is the attenuation coefficient, $I_0$ is the original light intensity, and $I_x$ is the light intensity at depth x. The attenuation can also be calculated in a depth-resolved manner with greater axial resolution based on the method described by Vermeer et al, id.

In certain embodiments, volumetrically imaging testicular tissue by OCT includes outlining a first layer of tubules in the testicular tissue. In such embodiments, the first layer may include tubules closest to the surface of the testicular tissue under analysis. In some embodiments, the first layer ranges from 0-2 mm of sub-surface depth. In further embodiments, the first layer is approximately 200 µm in depth. In other words, after OCT data containing information regarding spatial (e.g., volumetric) dimensions of testicular tissue is received by the processor, the processor may be configured record contours of testicular tissue structures that are indicative of a tubular location of interest. In this process, an en face view reconstruction of attenuation is created so that the hollow interior can be exposed. In embodiments, outlining a first layer of tubules includes performing an image gradient analysis that identifies tubule contours by characterizing directional change in the intensity of the image produced (e.g., via OCT) for the first layer of the testicular tissue sample. In some embodiments, the image gradient analysis is performed by fibermetric software, i.e., a program configured to enhance tubular structures in 2-D grayscale images using Hessian-based multi-scale filtering. The fibermetric program is described at, for example, https://www(dot)mathworks(dot)com/help/images/ref/fibermetric(dot)html.

After the image gradient analysis is performed, the processor may be further configured to binarize the image. In such embodiments, binarizing the image produced by image gradient analysis involves creating a raw mask, i.e., an image that primarily contains data regarding what is and is not considered a tubule and in which unrelated information is filtered out. In some instances, different regions of the en face reconstruction may be assigned one of two different categories. In such embodiments, a region of the en face reconstruction may be assigned one category if it corresponds to a tubule, and a second category if it corresponds to non-tubule tissue. In some embodiments, regions of the en face reconstruction that correspond to a tubule may be represented in a binarized image (i.e., a raw mask) by a white color, while regions en face reconstruction that correspond to non-tubule tissue may be represented in the binarized image by a black color.

Embodiments of the invention further include producing a tubule skeleton and tubule contours based on the image gradient analysis and binarized image (i.e., raw mask), In embodiments, a tubule skeleton is represented by a line that runs along the middle of the tubule in the en face view reconstruction and denotes the general shape and positioning of the tubules. Tubule contours, on the other hand, define the boundaries of the tubules. In embodiments, en face tubular structure may be detected at a thick depth range. A depth range may be thin or thick depending on the range of attenuation data included in the tubular structure analysis. For example, in embodiments, a "thick" depth range may average OCT attenuation data from within a depth range of 0 μm to 100 μm.

After determining en face tubular structure and producing an en face reconstruction of the attenuation within the interior of the first layer of tubules, the processor may be further configured to infer the presence or absence of sperm from variations in the calculated attenuation information in the en face reconstruction. In some embodiments, inferring the presence or absence of sperm from variations in the calculated attenuation information involves excluding from further analysis tubules that likely do not contain sperm. In such embodiments, tubules in which the middle line (i.e., skeleton; generated as discussed above) does not cross an area of high attenuation exhibit a low likelihood of containing motile sperm and may subsequently be discarded. In certain instances, inferring the presence or absence of sperm from variations in the calculated attenuation information involves selecting tubules that exhibit the highest mean attenuation values. In some embodiments, of the tubules that have not been excluded from further analysis due to low likelihood of containing sperm, a given number of tubules with the highest attenuation may be selected for further analysis. The given number of tubules with the highest attenuation may be selected for further analysis may vary as desired, and may include 1 or more tubules, 2 or more tubules, 3 or more tubules, 4 or more 5 or more tubules and 6 or more tubules and including 7 or more tubules. In some embodiments, the presence or absence of sperm is inferred based on attenuation information calculated from a thin depth range. In embodiments, a "thin" depth range may average OCT attenuation data from within a depth range of 20 μm to 40 μm. In some instances, the mean attenuation values used for inferring the likelihood of the presence of sperm are calculated from attenuation information observed from the thin depth range. In some instances, inferring the likelihood of the presence of sperm includes generating a second mask based on the tubule skeleton in which the skeleton is "expanded" so that the volume of the expanded skeleton encompasses the volume of the tubule. Attenuation information encompassed within the second mask based on the tubule skeleton may then be averaged.

In additional embodiments, the processor is further configured to calculate a color overlay that identifies one or more tubule locations that are likely to contain sperm. As described herein, a "color overlay" is imposed onto an en face representation and indicates the likelihood that sperm is present in a particular location by color-coding that location. In certain embodiments, calculating a color overlay includes evaluating mean attenuation values relative to threshold values. In such embodiments, mean attenuation values associated with a particular range of threshold values are assigned a certain color in the color overlay. Any convenient threshold values and colors may be used to calculate the color overlay described herein. In some embodiments, the colors selected for the color overlay are red and yellow. In certain instances, for example, attenuation values from 3.0 $mm^{-1}$ to 3.5 $mm^{-1}$ may be assigned yellow, while attenuation values higher than 3.5 $mm^{-1}$ may be assigned red. In embodiments, the color overlay is calculated with respect to the tubule skeleton and subsequently extrapolated to the remainder of the tubule from the tubule skeleton. In other words, the attenuation values along the tubule skeleton are calculated and color coded. Next, the skeleton is expanded such that it encompasses the volume of the tubule, thereby color coding the entire tubule with the likelihood that sperm is contained therein. The color coding of the color overlay may then be analyzed by a surgeon to determine areas of particular interest for harvesting sperm cells.

After one or more tubules of particular interest for harvesting sperm cells are identified (e.g., as described above), the processor may be further configured to receive M-mode scanning data from the system detector to determine whether motile sperm are at least likely to be present at the tubule location. By "M-mode scanning" it is meant detecting whether motile sperm is at least likely to be present, if not present, at a specified location. In other words, while volumetric imaging involves scanning an area of testicular tissue, M-mode scanning provides a one-dimensional indication of whether motile sperm are present in a lateral location of interest that has been identified following the volumetric imaging.

Because healthy sperm are motile, a tubule location containing such healthy sperm will exhibit movement (e.g., in the form of flagellar beating and other slight motions). Advantageously, this movement will create phase variance when the tubular location is observed via OCT because no movement will be "expected" based on the interference pattern, but the movement is nonetheless observed in the sample. The processor may therefore be configured to identify tubule locations where the actual phase variance exceeds the expected phase variance as tubule locations where motile sperm are at least likely to be present. As such, when these variations in optical phase are observed, it can be deduced that there is a reasonably high likelihood that motile sperm are present at the lateral location being investigated by M-mode scanning. In some embodiments, variations in optical phase from within the depth range determined to be the interior of the tubule can be compared to the phase variance to be expected purely from the signal-to-noise ratio (SNR) in the same region. The actual phase variance is higher than that expected from the SNR in the region due to slight motions from motile sperm, which are not necessarily causing bulk flow within the tubule but exhibit small amounts of motion within a confined space. In embodiments, the processor obtains expected phase variance noise by Equation 2:

$$\sigma^2_{SNR}(z) = (2/SNR(z))^{-\frac{1}{2}}$$

As shown in Equation 2, z is axial depth of the lateral scanned spot and SNR is the signal to noise ratio.

Figure 10:
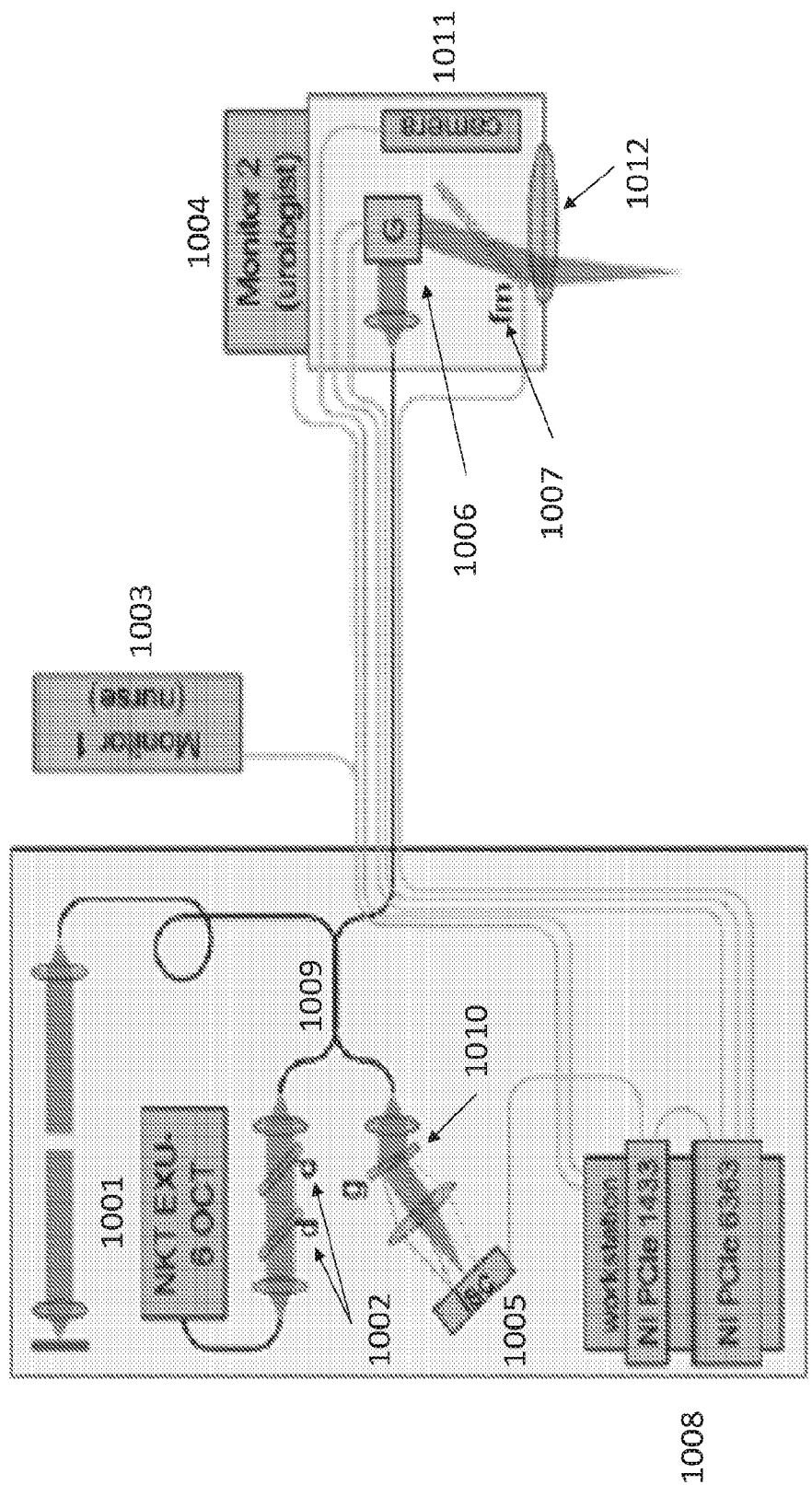
FIG. 10 depicts an OCT system including a processor according to certain embodiments.

FIG. 10 depicts a system according to one embodiment of the invention. Light from a supercontinuum source (NKT EXU-6 OCT) is sent through long- and short-pass dichroics 1002 to limit the optical bandwidth to a range detectable on the custom spectrometer, i.e., a Basler Sprint 4096 km line scan camera 1005, after passing through a diffraction grating 1010. A 90/10 beam coupler 1009 is used to split light from the course to the reference and sample arms, respectively. The sample arm (right) is connected to the main system engine (left) via optical fiber (black lines) and electronic connections (light green lines), and is composed of a large aperture 2D galvo scanner 1006, flip mirror 1007, visible light camera 1011, and lenses 1012. A small monitor 1004 is placed on the outside of the sample arm box, which can be either held with an articulated arm or placed onto the camera port of an existing microscope at a distance between 2-5 m from the system engine. The small monitor 1004 will allow the urologist to position the sample arm over an area of interest using the visible light camera (with the picture being displayed on the monitor while the flip mirror is in place), then switch to OCT imaging (flip mirror moved out of the beam path). The same view will also be visible to assistants on a separate monitor 1003. A workstation processor 1008 is used to control the system, with a multifunction data acquisition card (NI PCIe 6363) used to send control signals to synchronize line triggers to the line scan camera with the position of the galvos 1006. It will also be used to control the position of the flip mirror 1007. A Camera Link frame grabber (NI PCIe 1433) within the processor 1008 is used to acquire raw interference data from the line scan camera in the spectrometer.

Figure 11:
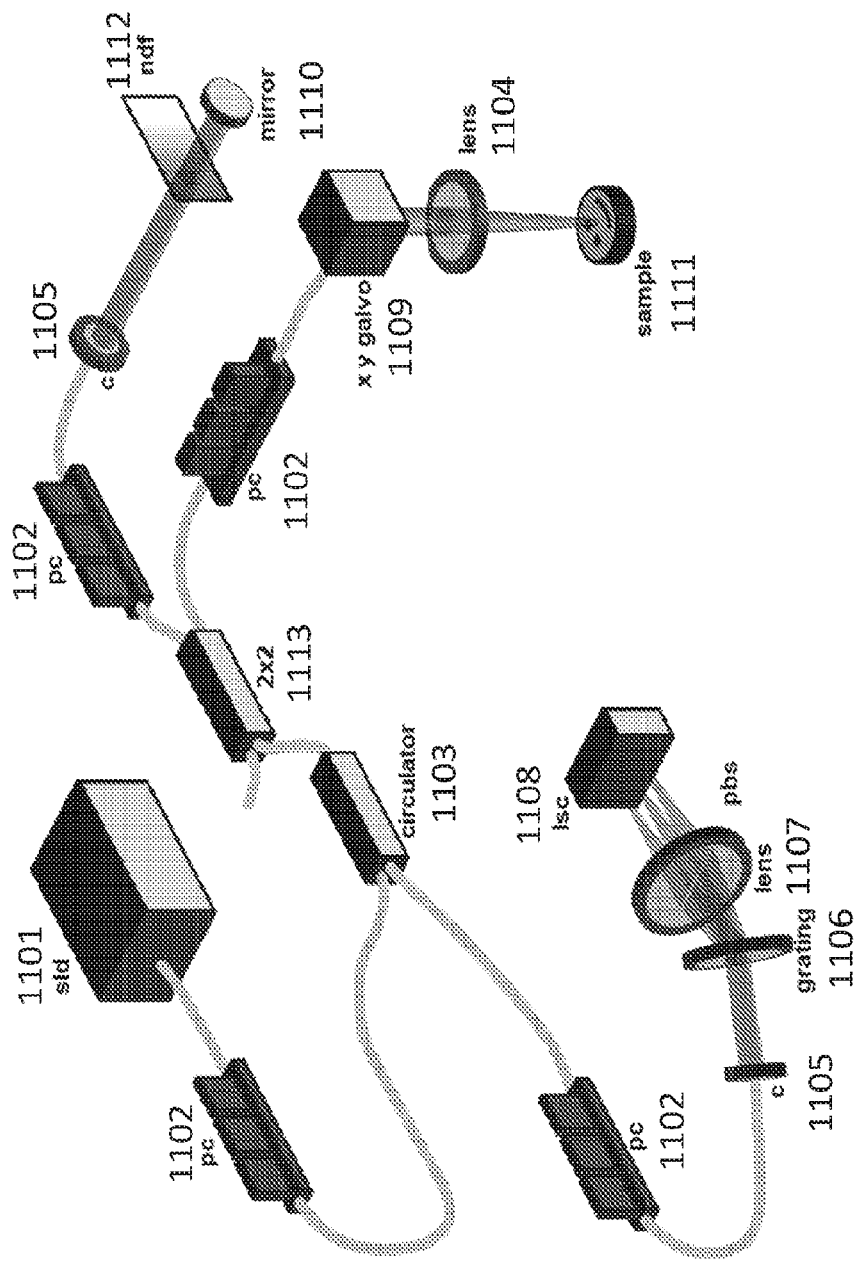
FIG. 11 depicts an OCT system according to certain embodiments.

FIG. 11 depicts a system according to another embodiment of the invention. FIG. 11 depicts a spectral-domain OCT system with GPU-accelerated real-time visualization. Light from a broadband 1300 nm SLD source 1101 is sent into an interferometer composed of a fiber circulator 1103 and an 80/20 fiber splitter 1113 for efficient sample arm illumination and collection. In the custom spectrometer used for detection of the OCT signal, the optical spectrum is dispersed by a transmission grating 1106, focused with a planoconvex lens 1107, and split with a polarizing beam splitter cube onto two Goodrich line scan cameras 1108. The system has an axial imaging range of approximately 2 mm in biological tissue, and axial and lateral resolution of 8 µm and 20 µm. A 30 mm lens 1104 was used to scan the beam across samples, leaving nearly 3 cm of working distance. The system further includes polarization controllers 1102, collimators 1105, an x-y galvo 1109, the sample 1111, a reference mirror 1110, and a neutral density filter 1112.

Figure 12:
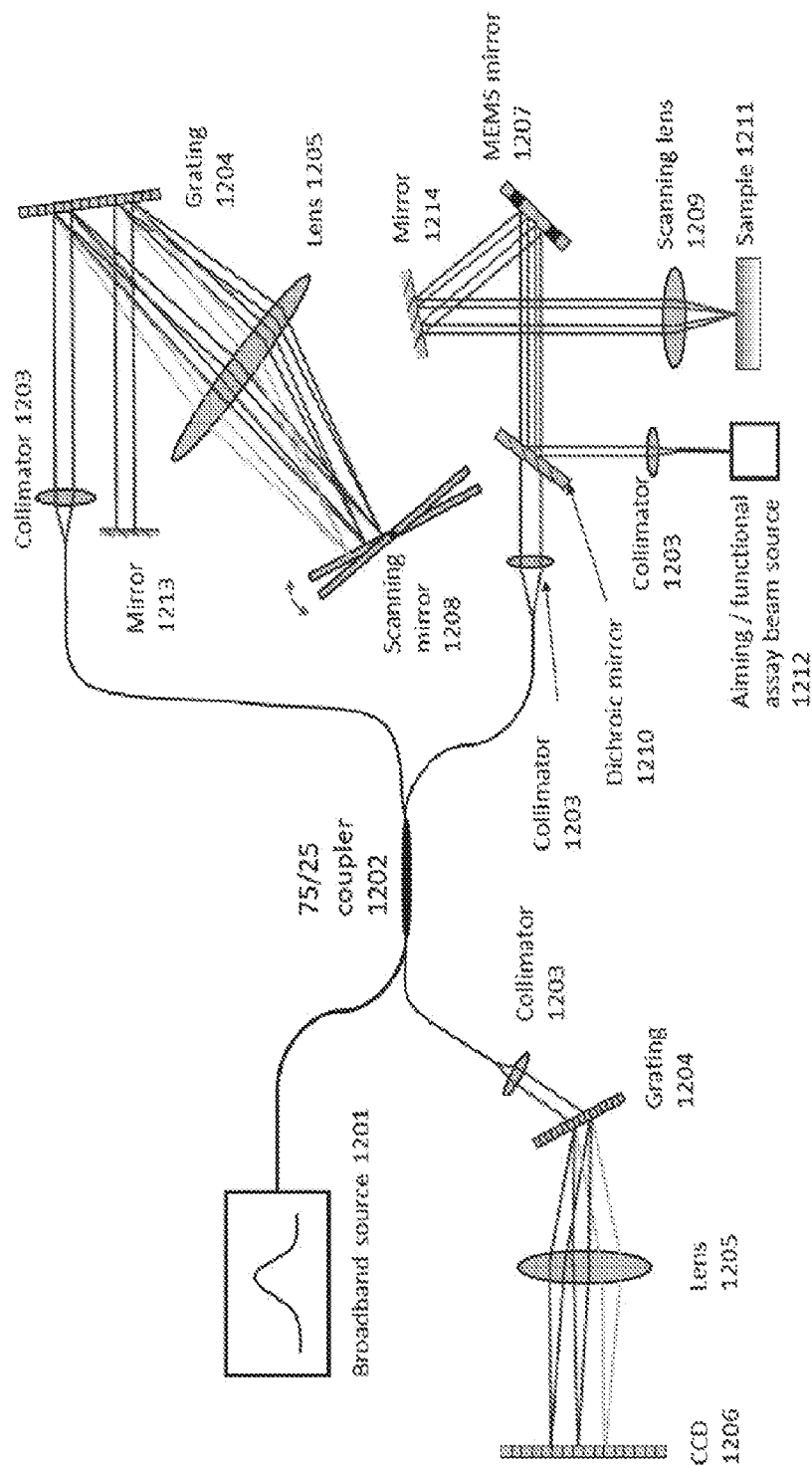
FIG. 12 depicts an OCT system including a rapid scanning optical delay line and functional assay beam source according to certain embodiments.

FIG. 12 depicts an additional embodiment of the system that includes a rapid scanning optical delay (RSOD) line and functional assay beam source. As shown in FIG. 12, light is emitted by broadband source 1201 and passes through 75/25 coupler 1202. The reference arm includes a collimator 1203, a grating 1204, a reference mirror 1213, a lens 1205 and a RSOD scanning mirror 1208. The sample arm includes the sample 1211 which is irradiated by light outputted by the beam coupler 1202 after it encounters a collimator 1203, a dichroic mirror 1210, a MEMS mirror 1207 (i.e., to control the engagement of the light beam with the sample), an additional mirror 1214, and scanning lens 1209. The sample arm further includes an aiming/functional assay beam source 1212 that produces light in the visible spectrum for enhancing motility of the sperm as desired. The beam produced by the aiming/functional assay beam source 1212 is reflected by the dichroic mirror such that it shares the same optical path as the light emitted by the broadband source 1201. Light that has encountered the sample and light from the reference arm is back propagated to the beam coupler 1202, and passed to a detector arm that includes a collimator 1203, a grating 1204, a lens 1205 and a CCD detector 1206.

Figure 13:
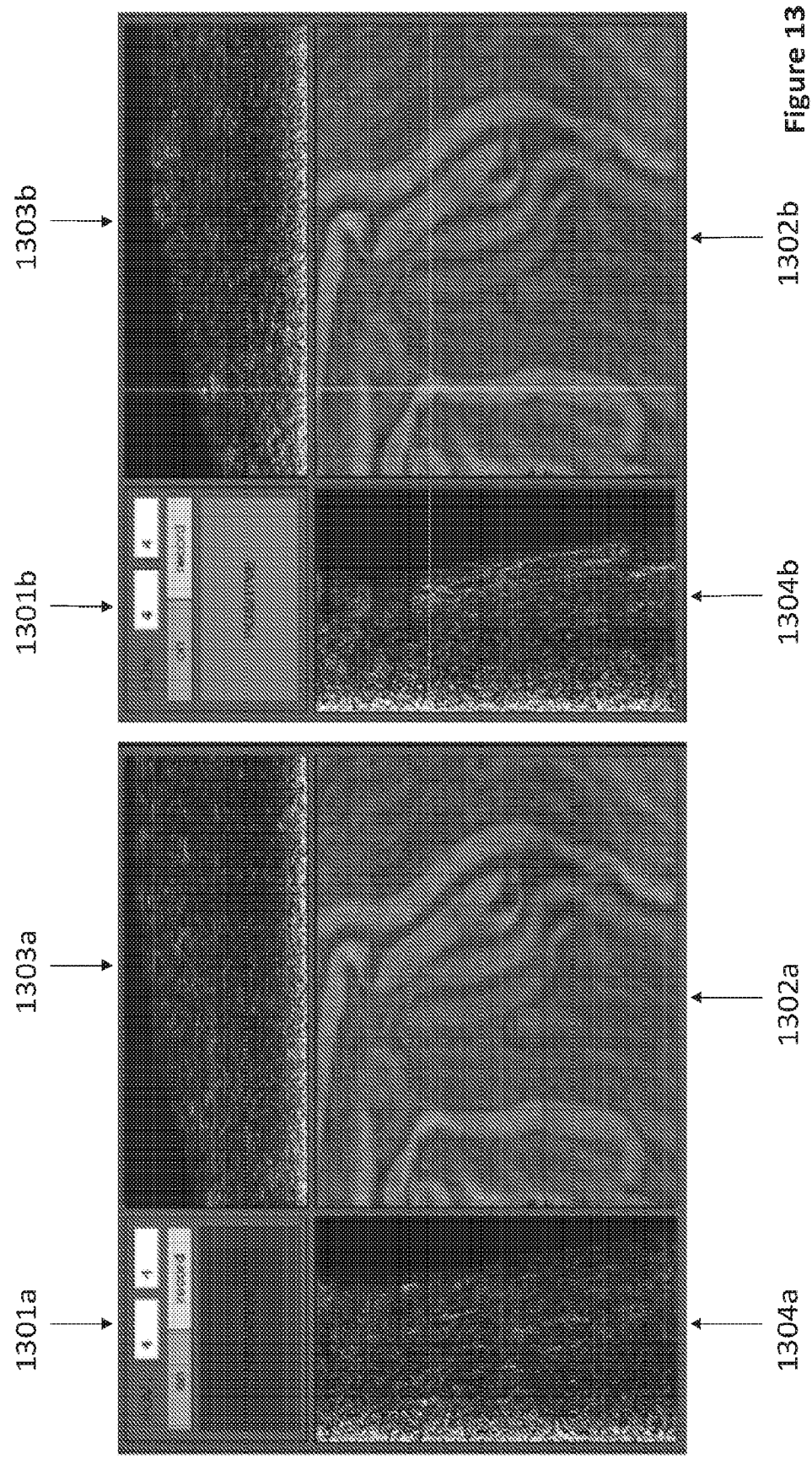
FIG. 13 depicts a graphical user interface according to embodiments.

FIG. 13 depicts two representations (left and right) of a graphical user interface generated by the processor according to one embodiment of the invention. As shown in FIG. 13, There are four sections of the user interface: an upper left corner (1301a and 1301b) with a few text lines and buttons, the large image in the lower right (1302a and 1302b), and then smaller images in the upper right (1303a and 1303b) and lower left (1304a and 1304b). The upper left section has two boxes to indicate the lateral field of view in mm. There are also two buttons: one to turn the system on and off, and another to save data to disk. The largest section is for the previously mentioned color-coded en face display. Once a user turns the system on, the lower right image will start to update (but the upper right and lower left will not). This is an en face view of the tissue surface generated from OCT data, and assuming a line rate of 70 kHz with 256×256 pixels, will update at a rate of 1 tubule volume per second. The displayed image is of the average attenuation through the middle 50% (in depth) of the first layer of tubules. If a user (e.g., an assistant at Monitor 1003 shown in FIG. 10) clicks on a location in the window at the verbal direction of the urologist (e.g., at Monitor 1004 shown in FIG. 10), then the upper right and lower left images will be updated, and show cross sectional views at that location (one is a vertical cross section and the other is a horizontal one). If a user then clicks on a location in either of the two new images, then the system will acquire phase information from that location, perform the phase-based calculation previously described (but only in the background), then either indicate 'positive' or 'negative' in the upper left corner of the display. The minimum length of time required for robust phase measurement at a location of interest is 0.15 seconds (as it requires 10,000 depth profile acquisitions).

Computer Controlled Systems

Aspects of the present disclosure further include computer-controlled systems, where the systems further include one or more computers for complete automation or partial automation. In some embodiments, systems include a computer having a non-transitory computer readable storage medium with a computer program stored thereon, where the computer program when loaded on the computer includes instructions for identifying motile sperm in testicular tissue after receiving data from volumetric imaging of testicular tissue by optical coherence tomography, computing depth-resolved attenuation of the volume from the OCT volume, forming an en face reconstruction of the attenuation within the interior of the first layer of tubules, inferring the presence or absence of sperm can be inferred from variations in the calculated attenuation information in the en face reconstruction, and comparing variations in optical phase from within the depth range determined to be the interior of the tubule can be to the phase variance to be expected purely from the signal-to-noise ratio (SNR) in the same region.

The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction therewith, in managing the treatment of a health condition, such as HIV, AIDS or anemia.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Kits

Also provided are kits and systems for practicing the subject methods. Kits and systems may include devices (e.g., an OCT optical system and a processor), including those as described above. In embodiments, the subject kits may include individually packaged components (e.g., light source, sample arm, reference arm, detector, processor, monitor) of the subject systems that are assembled by the user.

The subject kits may also include instructions for how to practice the subject methods using the components of the kit. The instructions may be recorded on a suitable recording medium or substrate. For example, the instructions may be printed on a substrate, such as paper or plastic, etc. As such, the instructions may be present in the kits as a package insert, in the labeling of the container of the kit or components thereof (i.e., associated with the packaging or sub-packaging) etc. In other embodiments, the instructions are present as an electronic storage data file present on a suitable computer readable storage medium, e.g. CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

Some or all components of the subject kits and systems may be packaged in suitable packaging to maintain sterility. In many embodiments of the subject kits and systems, the components of the kit are packaged in a kit containment element to make a single, easily handled unit, where the kit or system containment element, e.g., box or analogous structure, may or may not be an airtight container, e.g., to further preserve the sterility of some or all of the components of the kit or system.

Utility

The subject devices, methods and computer systems find use in a variety of applications where it is desirable to identify viable sperm. The devices, methods and computer systems particularly find use in identifying viable sperm in a male subject suffering from non-obstructive azoospermia (NOA) caused by congenital or acquired spermatogenetic defects. The fertility of a male subject may be determined or measured by any convenient means including e.g., the ability of the subject to conceive upon regular attempts (i.e., normally productive intercourse). The devices, methods and computer systems may further facilitate the extraction of the viable sperm such so that it can be employed in a fertility treatment such as, e.g., in vitro fertilization. In some instances, use of the subject devices, methods and computer systems may result in the subject successfully conceiving a child. In some embodiments, the subject methods and systems provide fully automated protocols so that adjustments to data require little, if any, human input.

A variety of subjects are treatable according to the herein described methods. In certain embodiments, such hosts are "mammals" or "mammalian," where these terms are used broadly to describe organisms which are within the class Mammalia, including the orders carnivore (e.g., dogs and cats), Rodentia (e.g., mice, guinea pigs, and rats), and non-human primates (e.g., humans, chimpanzees, and monkeys). In many embodiments, the subject may be human.

The following examples are offered by way of illustration and not by way of limitation.

EXPERIMENTAL

I. Identification of Motile Sperm in Testes Tissue

Figure 14:
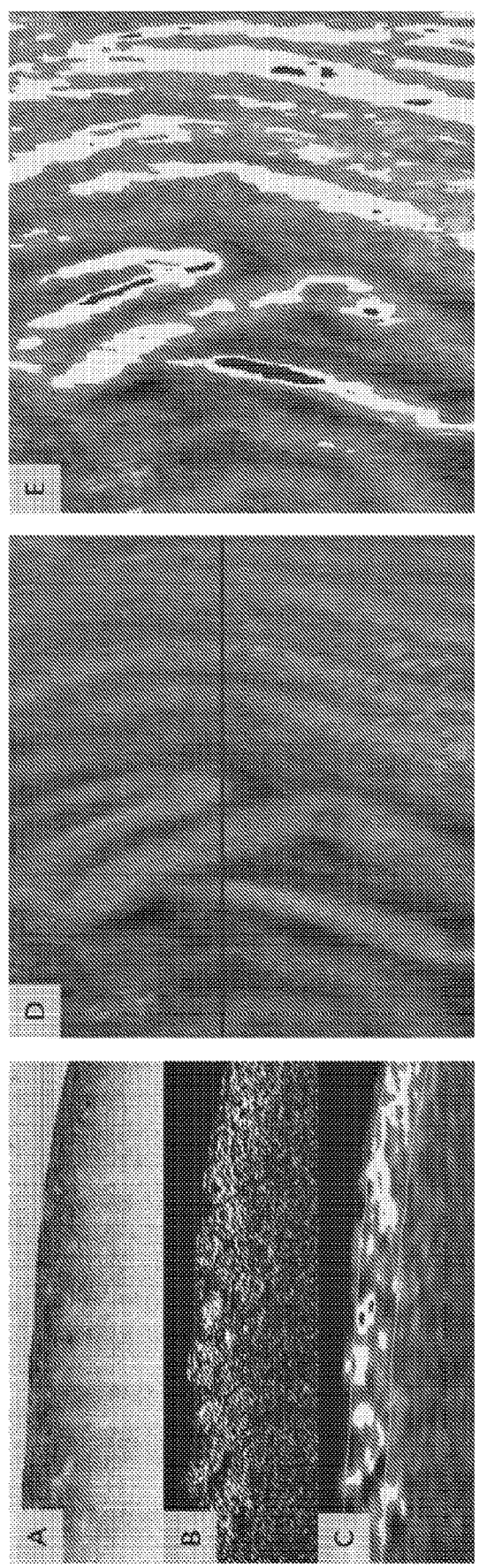
FIG. 14 depicts experimental results obtained for en face visualization of seminiferous tubules.

Stage 1:

First layer of tubules identification based on the attenuation of the volume OCT volumetric imaging of a field of view of 4 mm by 4 mm was performed and 200 or 400 frames of cross-sectional data were saved depending on the demand of resolution. Intensity and attenuation images (FIG. 14A-B) were computed across all frames of the volume. A spatial average filter was applied to the attenuation image to reduce the speckle noise. The filtered cross-sectionals attenuation image was then preliminarily color-coded by setting thresholds of 5.0 mm$^{-1}$ (yellow) and 6.5 mm-1 (red), indicating the likelihood of sperm existence (FIG. 14C).

The attenuation images showed clearer boundary between testis tissue and air than intensity images, which were utilized to locate the surface of tissue. Based on the surface determination, the very top layer of tubules of approximately 200 µm in depth was selected for the reconstruction of en face visualization of attenuation image. This en face map view (FIG. 14D) was generated by averaging the attenuation information in between the two cyan lines on FIG. 14C across all frames. Similarly, a color-overlay based on the maximum-intensity of attenuation projection was applied on the en face visualization of the imaged volume, providing an intuitive way to identify the sperm-bearing tubules (FIG. 14E).

Figure 15:
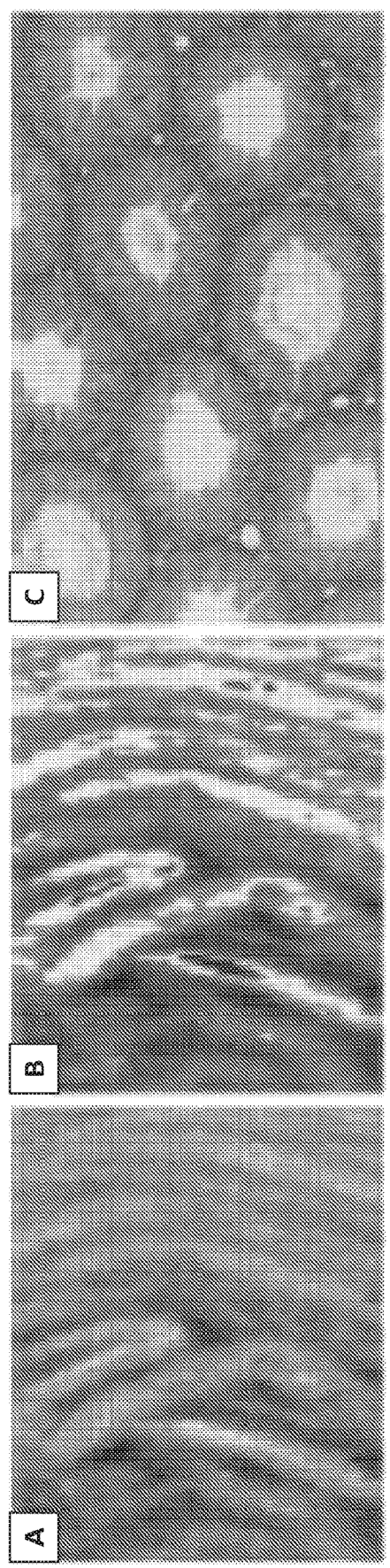
FIG. 15 depicts a comparison of volumetric images of testis of control and busulfan-treated rats.
Figure 15:
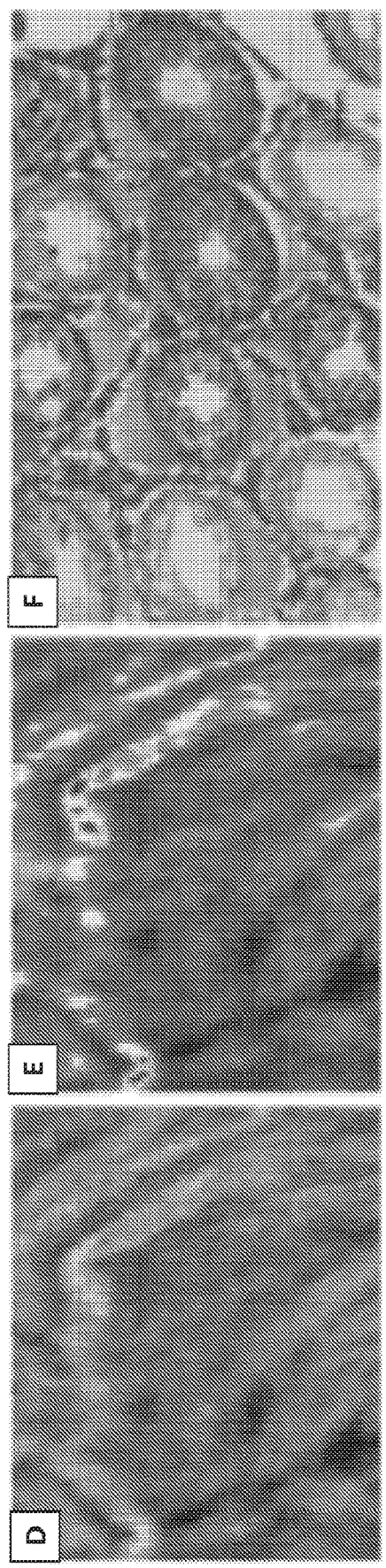

This processing method was applied to the volumetric images of testis of control and busulfan-treated rats as shown in FIG. 15, depicting a comparison of OCT and histological images between seminiferous tubules in control (upper) and NOA (lower) rats. En face reconstruction of a 5 mm×5 mm lateral region 100 to 500 µm beneath the tissue surface for control (FIG. 15A) and NOA tubules (FIG. 15D) was completed. Color overlay of en face image of tubules with sperm is shown in FIG. 15B and FIG. 15E. Histological image at 200× magnification showing tubules in control (FIG. 15C) were compared to pockets of tubules with sperm among empty tubules in NOA rats (FIG. 15F). Compared with the control group, the yellow and red color-coded sperm tubules were evidently less, which was consistent with the hypothesis that less sperm exists in the treated group.

Figure 16:
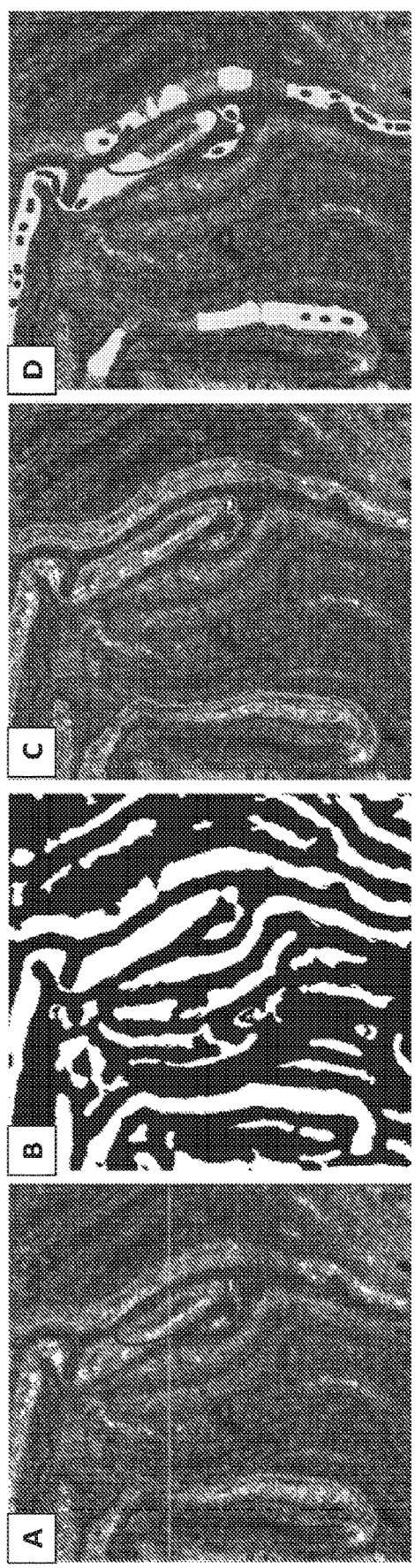
FIG. 16 depicts the production of a color-coded en face attenuation tubule map.

It was also noticed that the wall of tubules also contributed to high attenuation on the image. This increased the chance of false positive detection of sperm tubules. An approach to reduce this error was to employ additional image processing method that only the tubules with high attenuation and sperm pockets in the middle of tubule are color-labeled. In this process, a smaller depth range for en face view reconstruction of attenuation was used so that the hollow interior can be exposed on the map as shown in FIG. 16A, depicting an en face attenuation reconstruction from a thinner depth range (30 µm). A tube-like structure was obtained from image gradient analysis and then binarized as image mask for morphological operations (FIG. 16B-C). These morphological operations on the binary mask provided information of the middle line (skeleton) and contour of the tubules. Instead of global thresholds for color-coding on the entire en face image, local thresholds were customized along the middle line of selected tubules with high attenuation. The empty sperm pockets with high-attenuated tubule walls were then excluded because the interior where the middle line crosses does not come with high attenuation. The resulting color-coded en face attenuation tubule map is shown as FIG. 16D.

Figure 17:
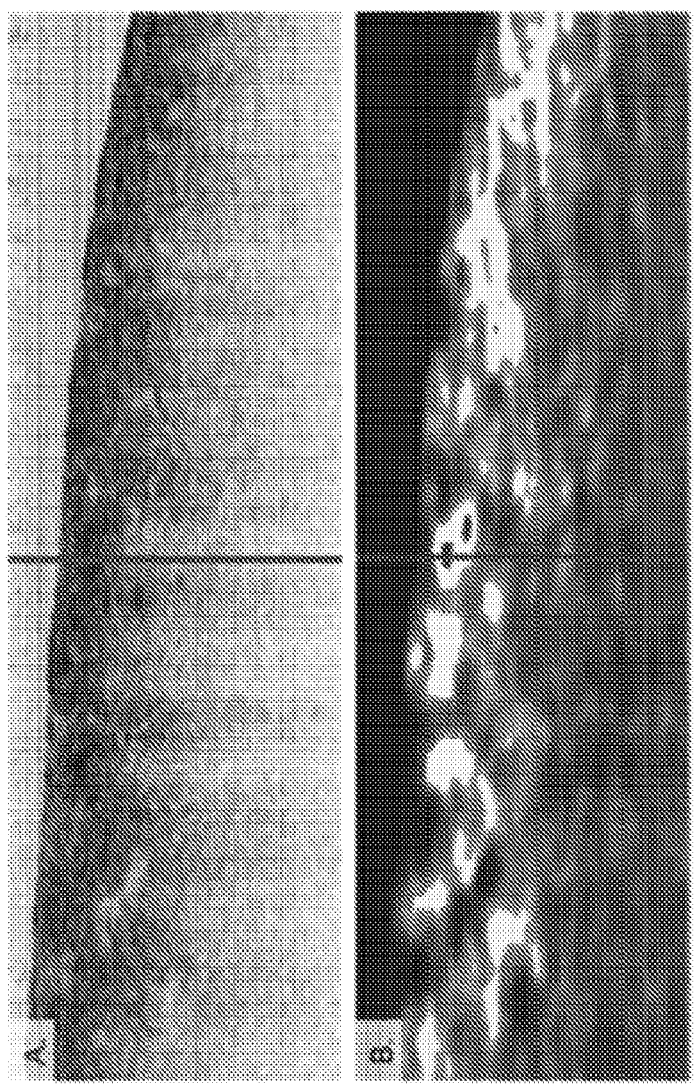
FIG. 17 depicts a phase variance increase due to the motion of motile sperm tails determined by comparing an experimentally measured result to the expected phase variance noise floor converted based on the signal-to-noise (SNR).
Figure 17:
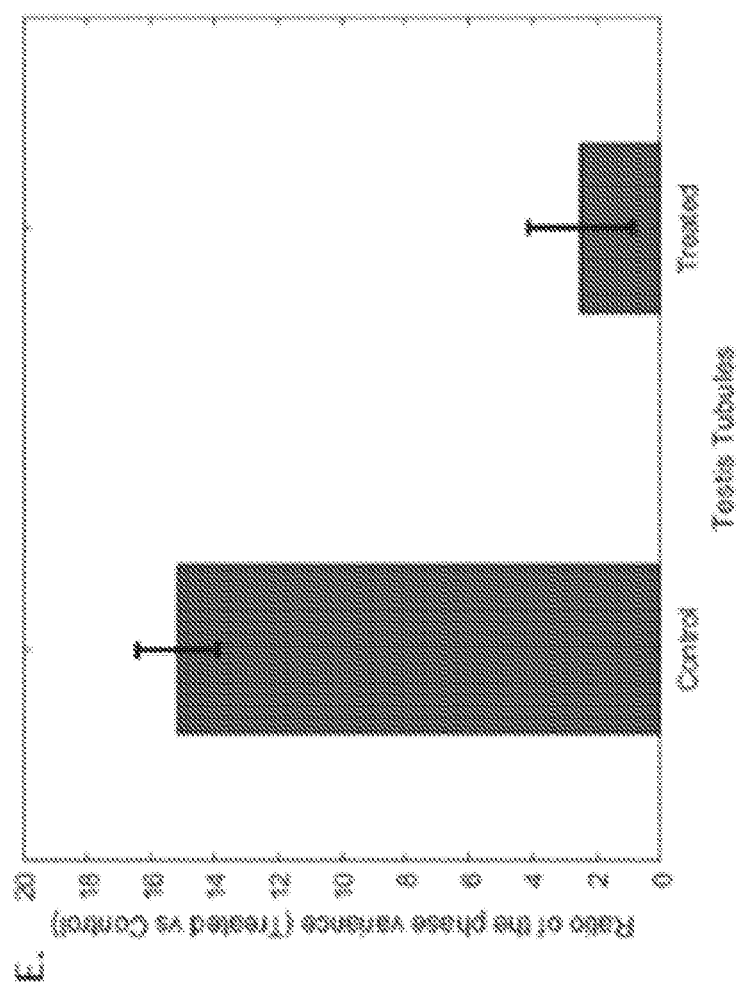

Stage 2: Comparison of Measured Variance of Optical Phase and Expected Phase from SNR For the further validation of sperm existence in testis tubules, OCT M-scan of phase variance measurement was applied. The site of interest to perform M-scan was identified based on a lateral location which has high chance of sperm determined by the intensity and attenuation analysis in the previous stage (FIGS. 17A and B). In this case, only continuous sequence of depth profiles of a single spot (no lateral information) in the center of a pocket of sperm was measured over a few seconds. The phase variance increase due to the motion of motile sperm tails was determined by comparing this measured result to the expected phase variance noise floor converted based on the signal-to-noise (SNR) at the same location.

As shown in FIGS. 17C and D, the expected phase variance noise floor (blue, 'Expected') is obtained by $$\sigma^2_{SNR}(z) = (2/SNR(z))^{-\frac{1}{2}}$$

where z is axial depth of the lateral scanned spot. The actual measured phase variance versus depth (red, 'Measured') is calculated and bulk phase artifact is removed by aligning a portion of measured phase curve (beyond 800 µm in depth) to the corresponding portion of expected phase curve. FIG. 17C-D depicts the difference in phase variances between measured and expected. The measured phase variance of control group (FIG. 17C) was higher than expected and the difference between the two curves was more significant than that of treated group (FIG. 17D). The highlighted bold segments of the curves indicate the depth range of the interior of the tubules, where the measured phase variance is significantly higher than expected if sperm tails motion presents (FIG. 17C). The distinction between measured and expected phase variance was quantified by calculating the ratio of the measured over the expected. FIG. 17E depicts bar graph comparison of the ratio between the actual phase variance from the interior of the seminiferous tubules compared to the level expected for stable tissue acquired from control versus treated rats. As shown in FIG. 17E, the control group, with sperm motion existence, had a higher ratio than the busulfan-treated group.

II. Identification of Motile Sperm in Testes Tissue

An advanced spectral and swept-source OCT platform (supercontinuum laser) with low coherence interferometry was used to obtain depth-resolved cross-sectional imaging, and visualize tissue microstructure at near cellular resolution at nearly 2 mm of sub-surface depth. Obtained data showed that by applying OCT attenuation and phase-resolved capability, one can recognize and distinguish sperm (due to sperm tail wiggling and swinging) from the static state of the rest of cells in the seminiferous tubules (FIG. 9). As shown in FIG. 9 (also discussed above), the phase-based test indicated that by applying OCT attenuation and phase-resolved capability, one is able to recognize and distinguish sperm with tail wiggling and swing (red, arrow) from the static state of the rest of cells (blue) in near normal (FIG. 9A) and empty (FIG. 9B) rat seminiferous tubules.

This finding allowed the quantification of the signals generated from sperm. Thus, an innovative approach applying advanced OCT technology to solve the clinical challenge encountered by surgeons during micro-TESE in treating patients with non-obstructive azoospermia (NOA) is provided. It is particularly novel to use spectral and swept source OCT with phase-resolved capability to recognize the seminiferous tubules harboring hidden sperm in NOA testes.

III. System

Figure 18:
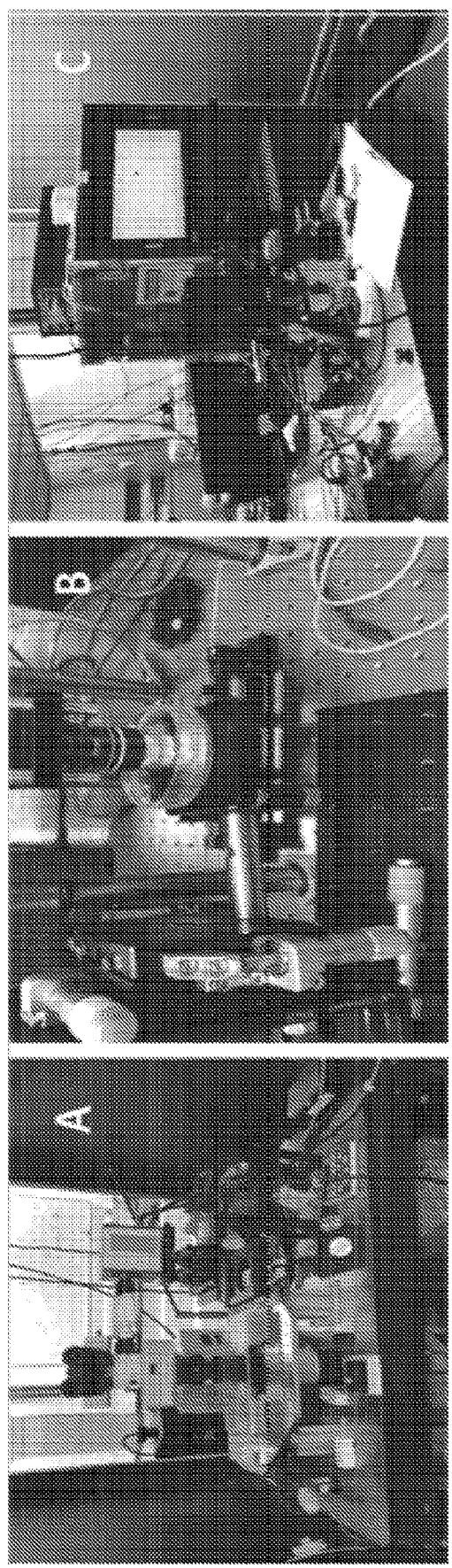
FIG. 18 presents a representation of one embodiment of the system used for obtaining experimental data.

FIG. 18 depicts an experimental system for collecting OCT data. FIG. 18A illustrates a microscope incorporated with OCT to scan testes under the observation through lens (FIG. 18B). The OCT images and spectrum were visualized simultaneously on the screen and processed by software (FIG. 18BC). The segments of seminiferous tubules harboring sperm recognized by OCT were cut and used for retrieving sperm in Petri dish. The system was bench-top size and operable in operating room.

IV. Additional Data

Studies investigating phase variation detected by OCT in "full" (i.e., containing sperm) and "empty" (i.e., not containing sperm) seminiferous tubules were carried out. FIG.

Figure 19:
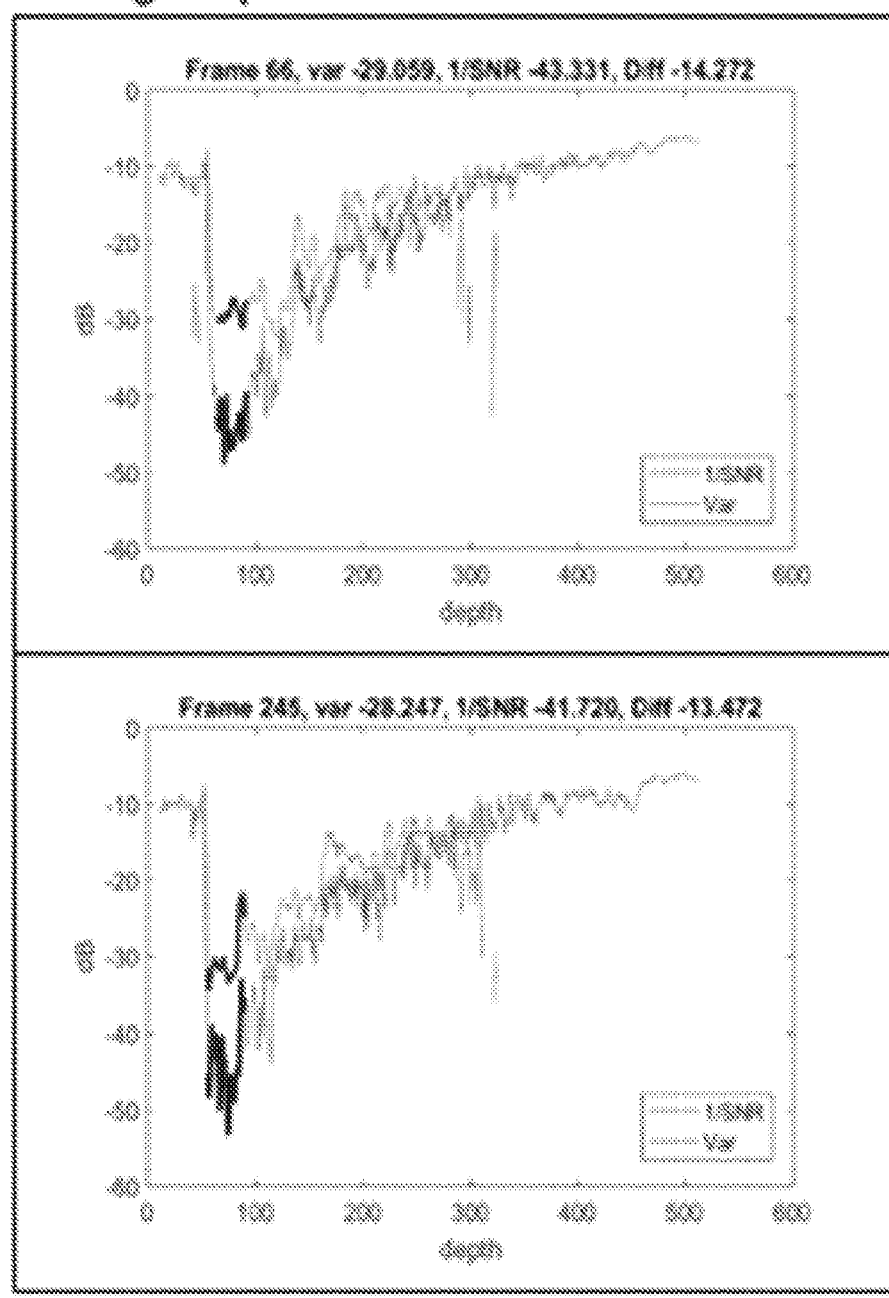
Figure 19:
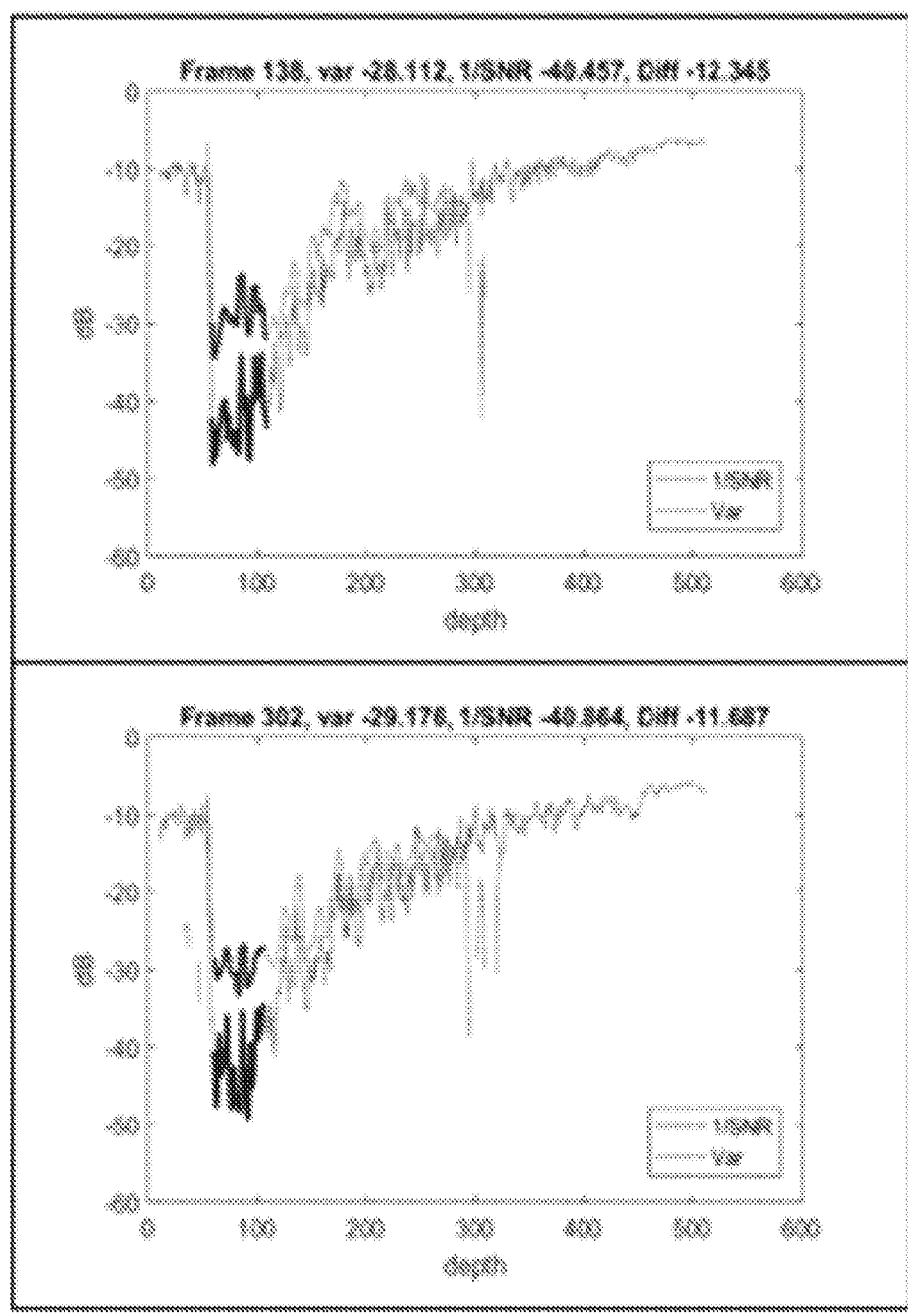
Figure 19:
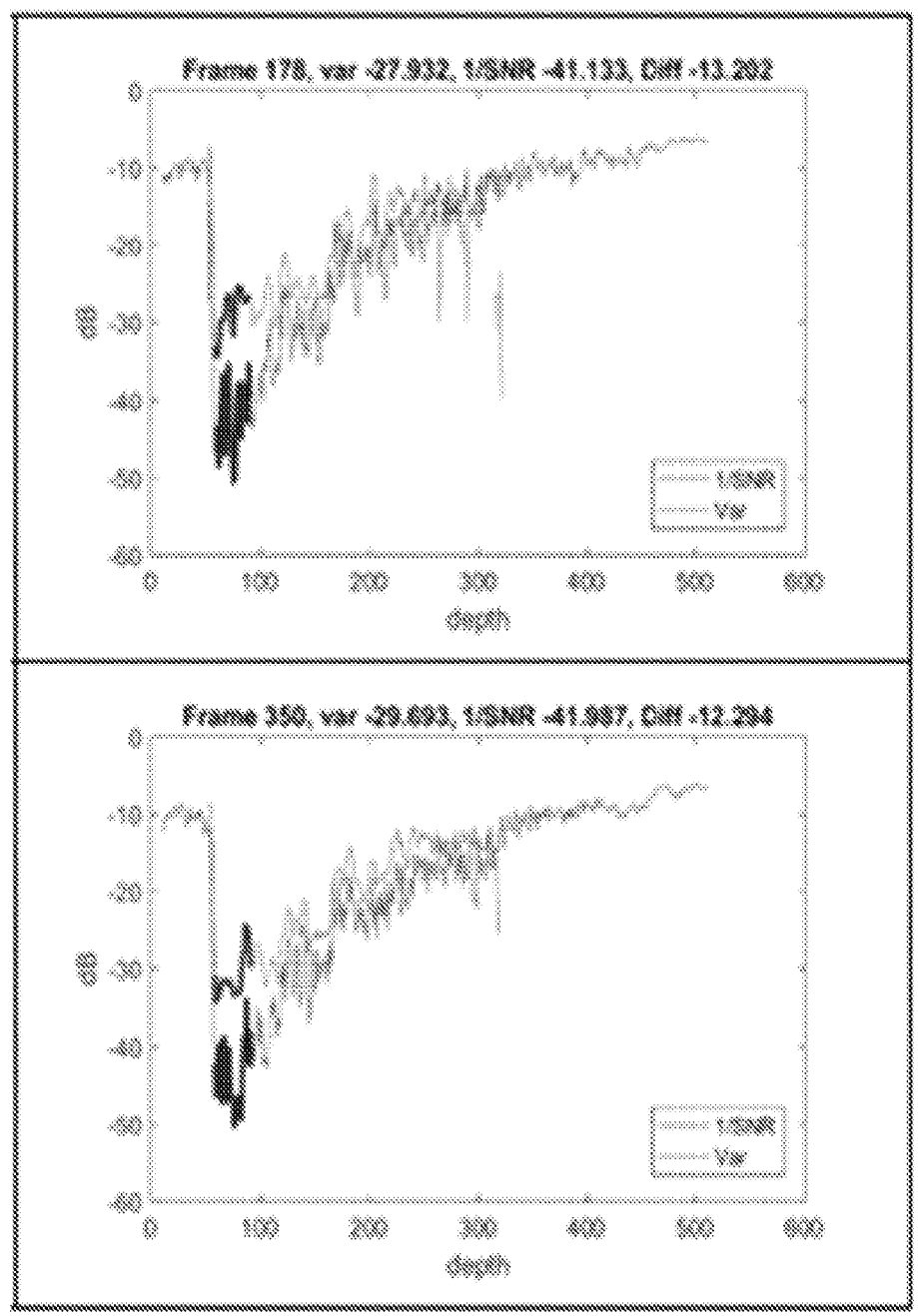
Figure 20:
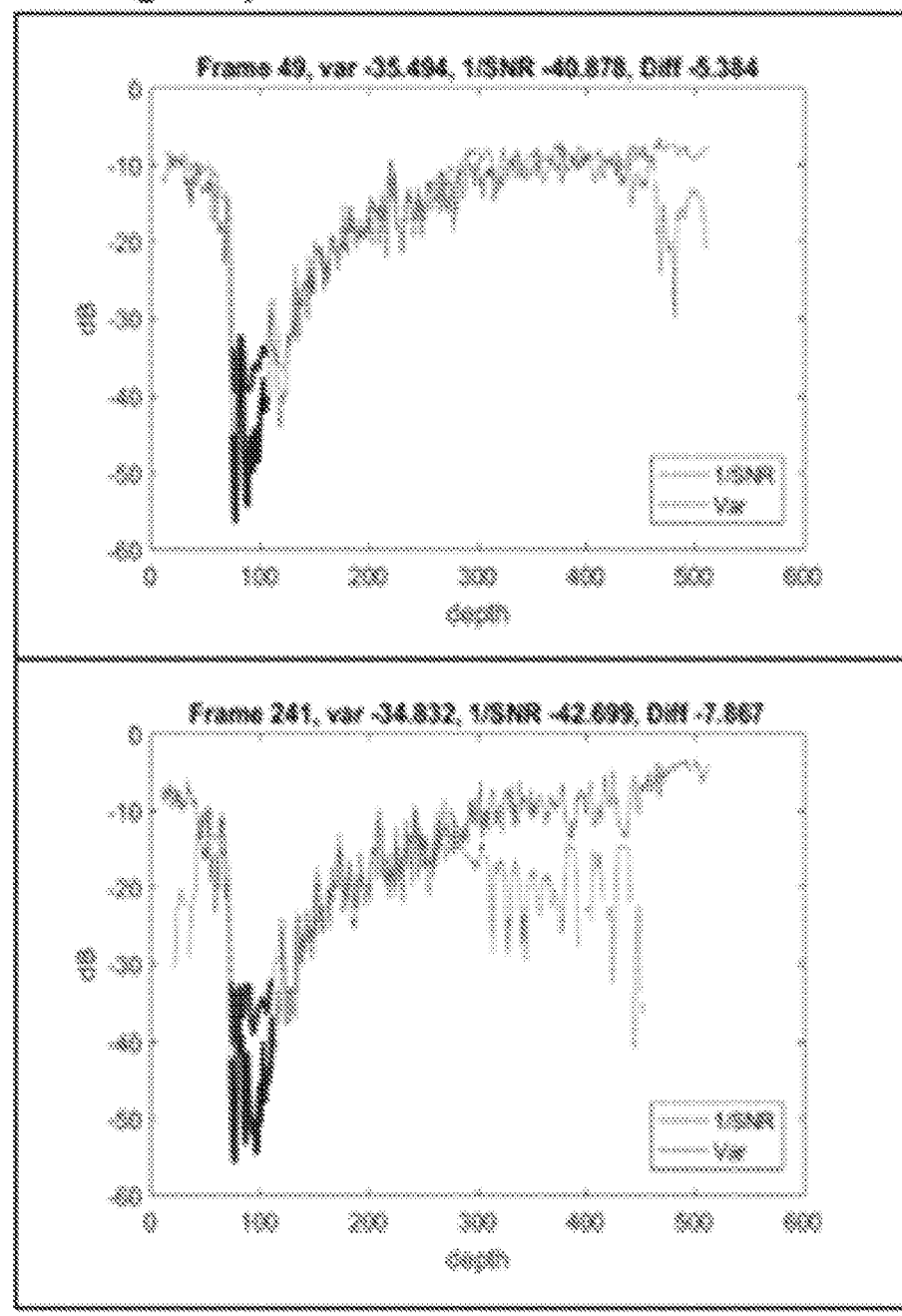
Figure 20:
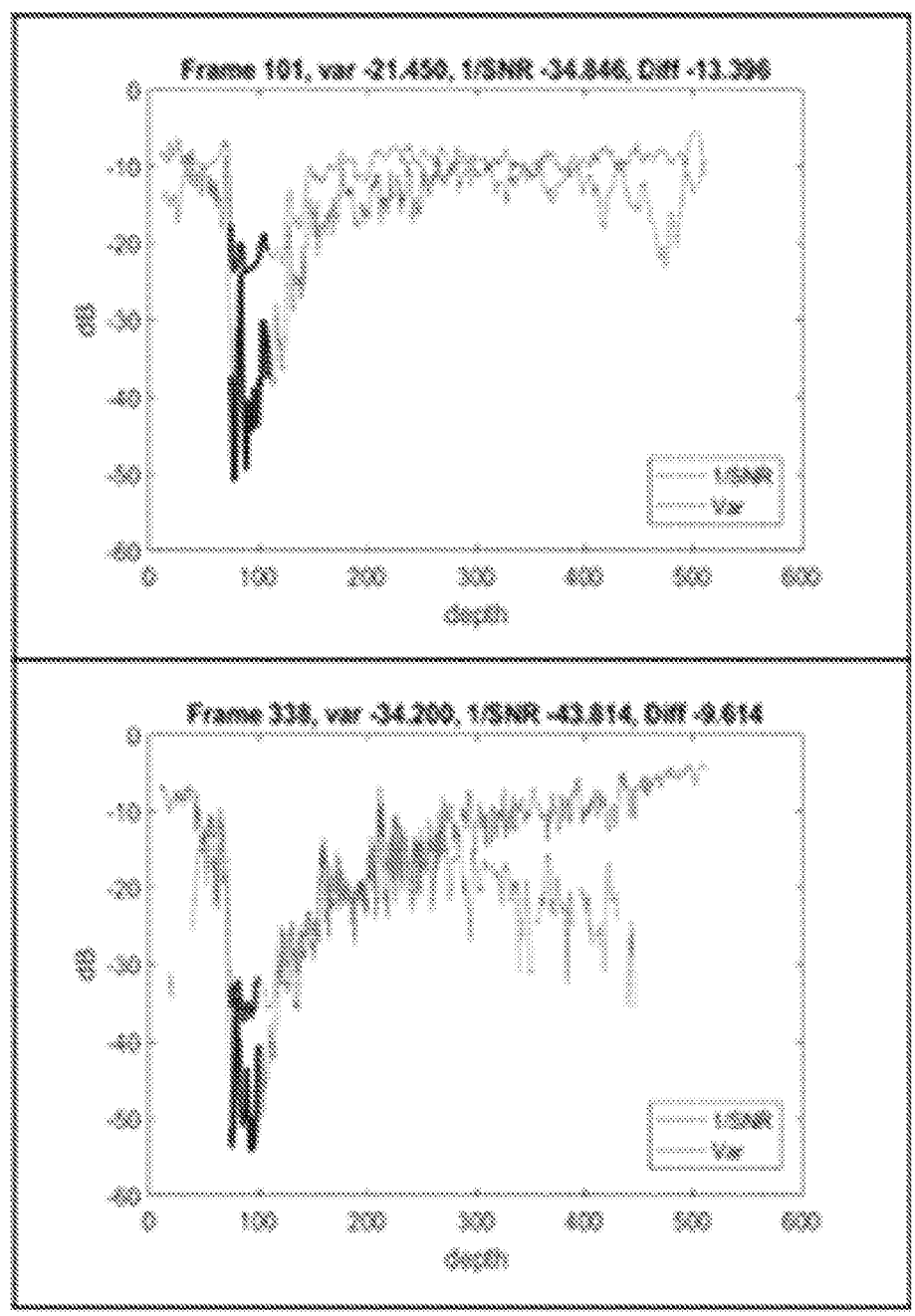
Figure 20:
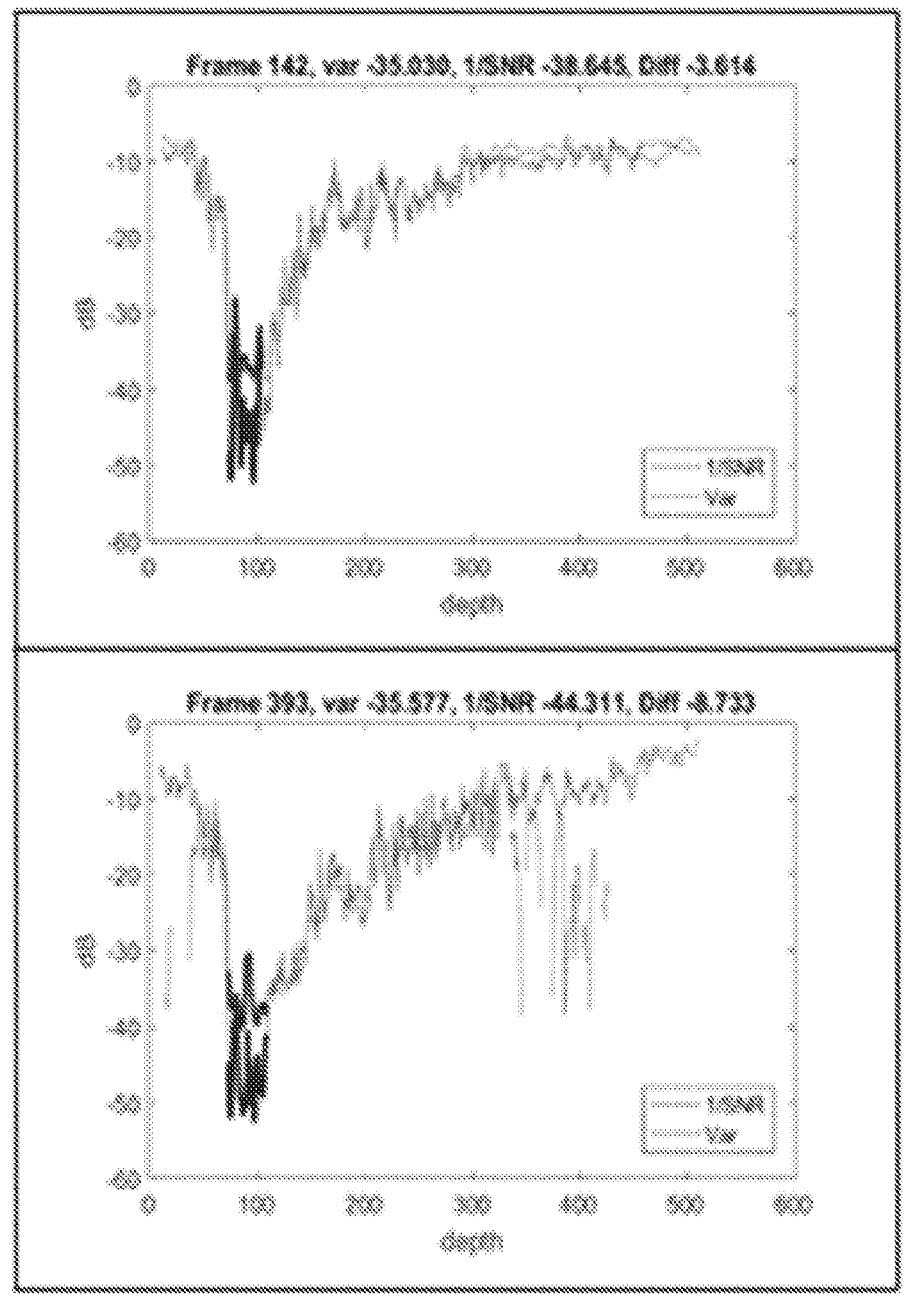
Figure 21:
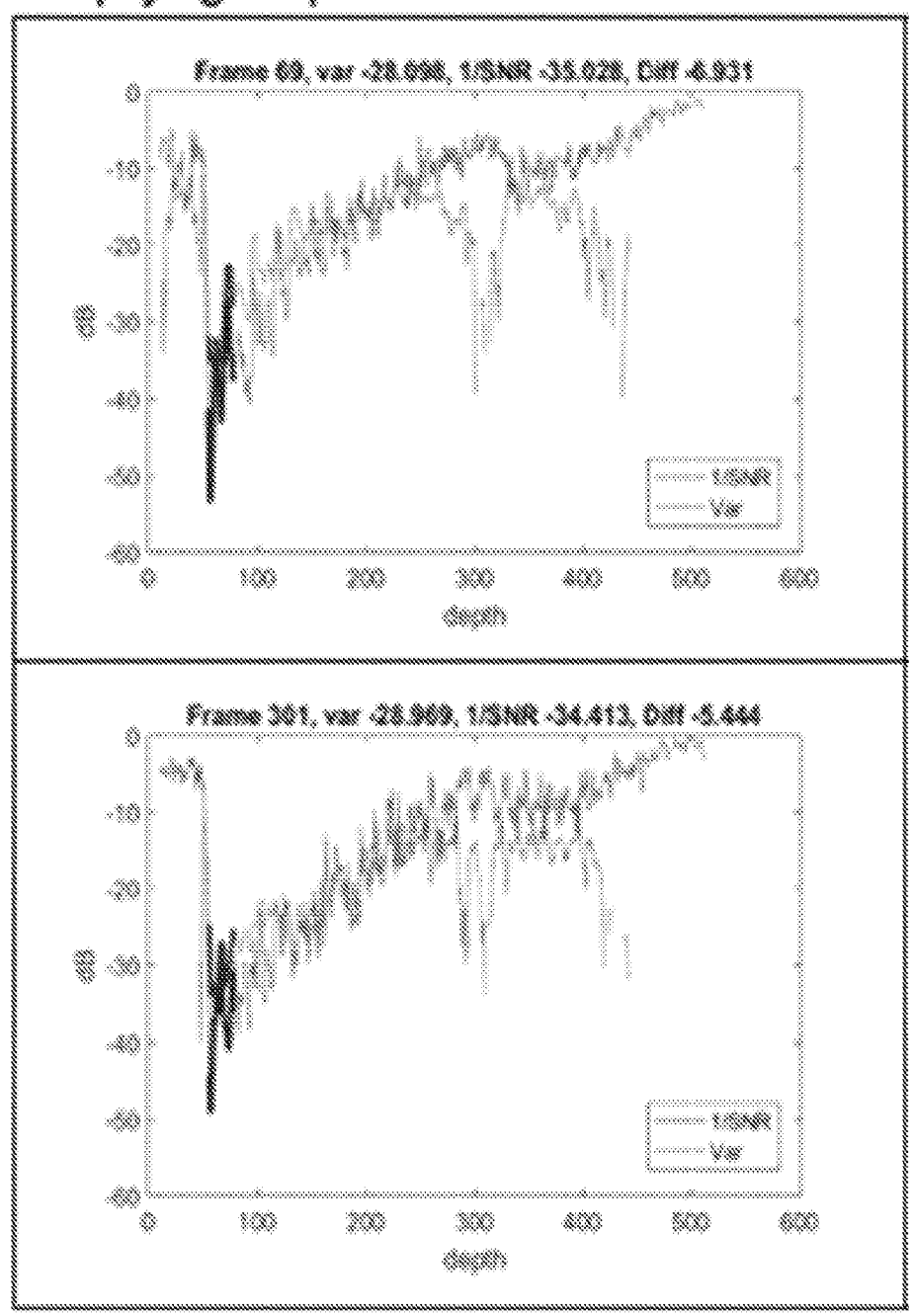
Figure 21:
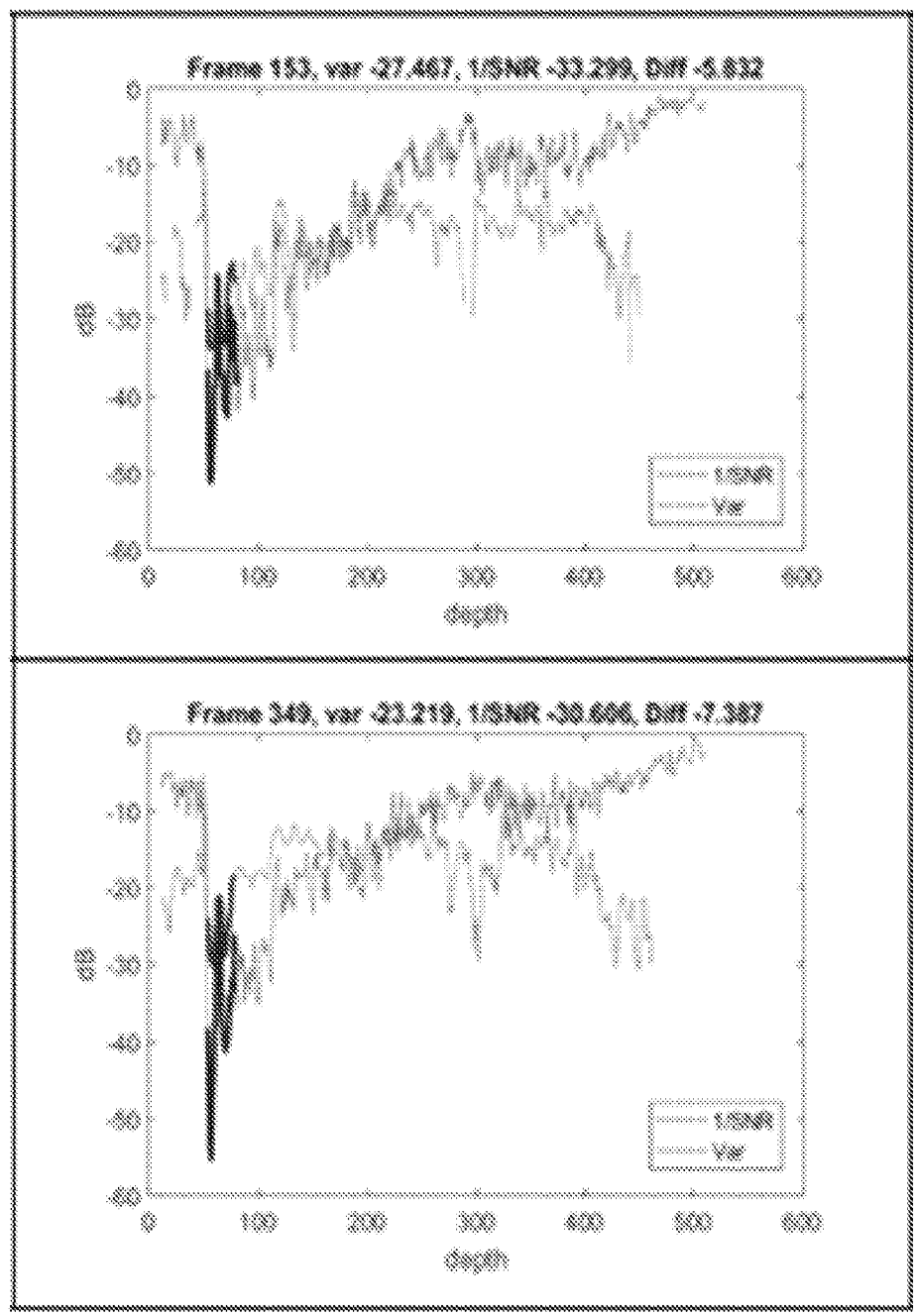
Figure 21:
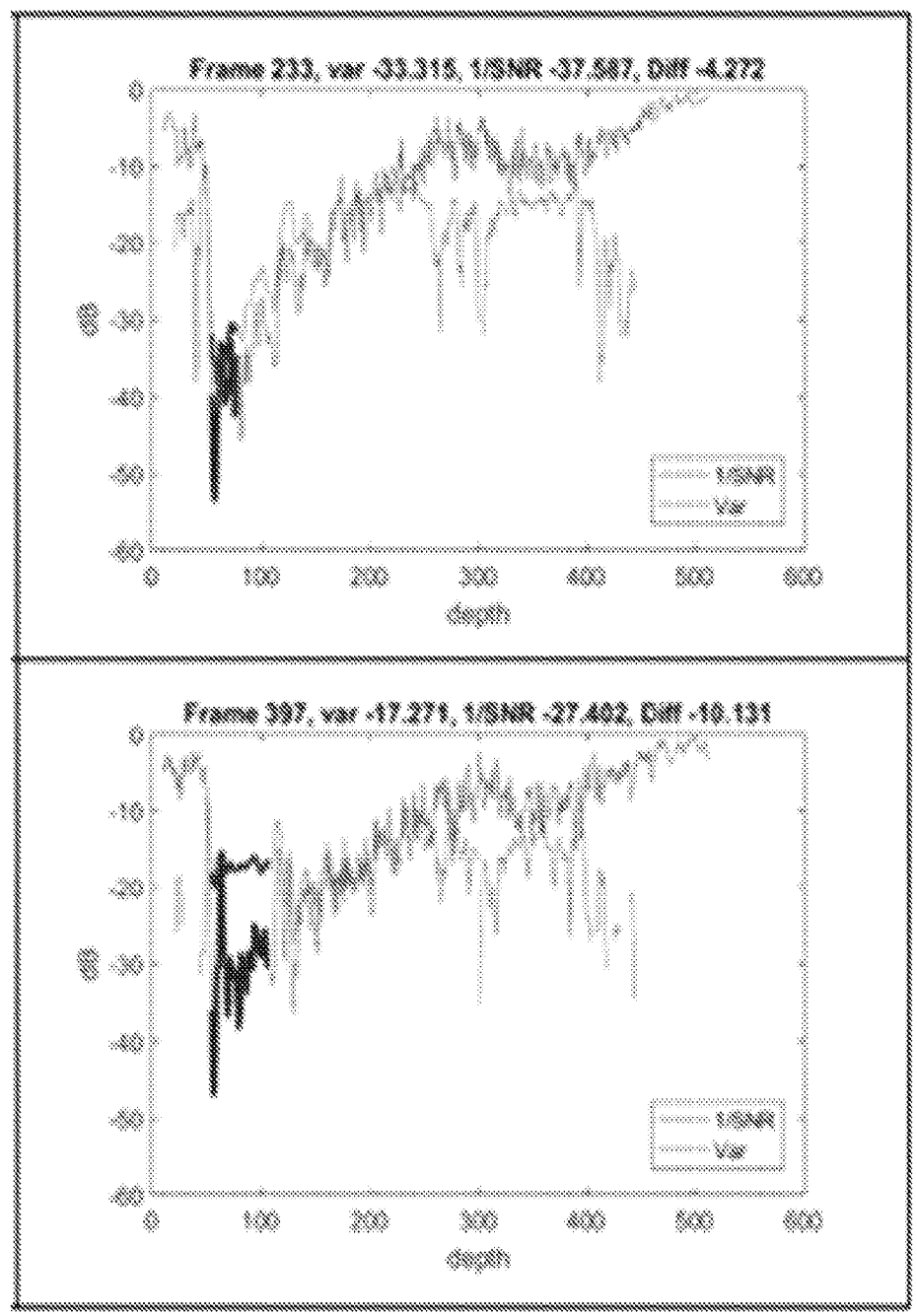
Figure 22:
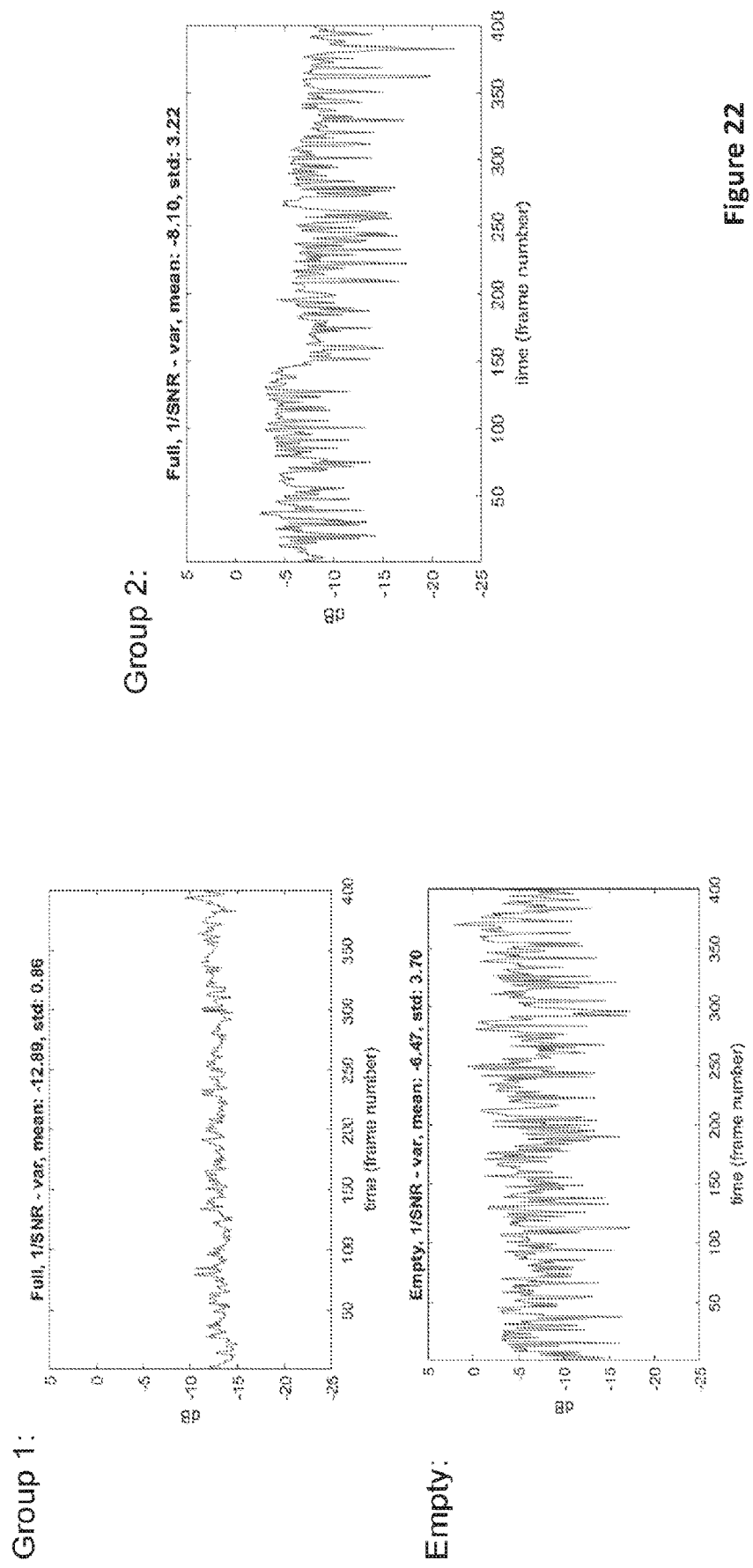
Figure 23:
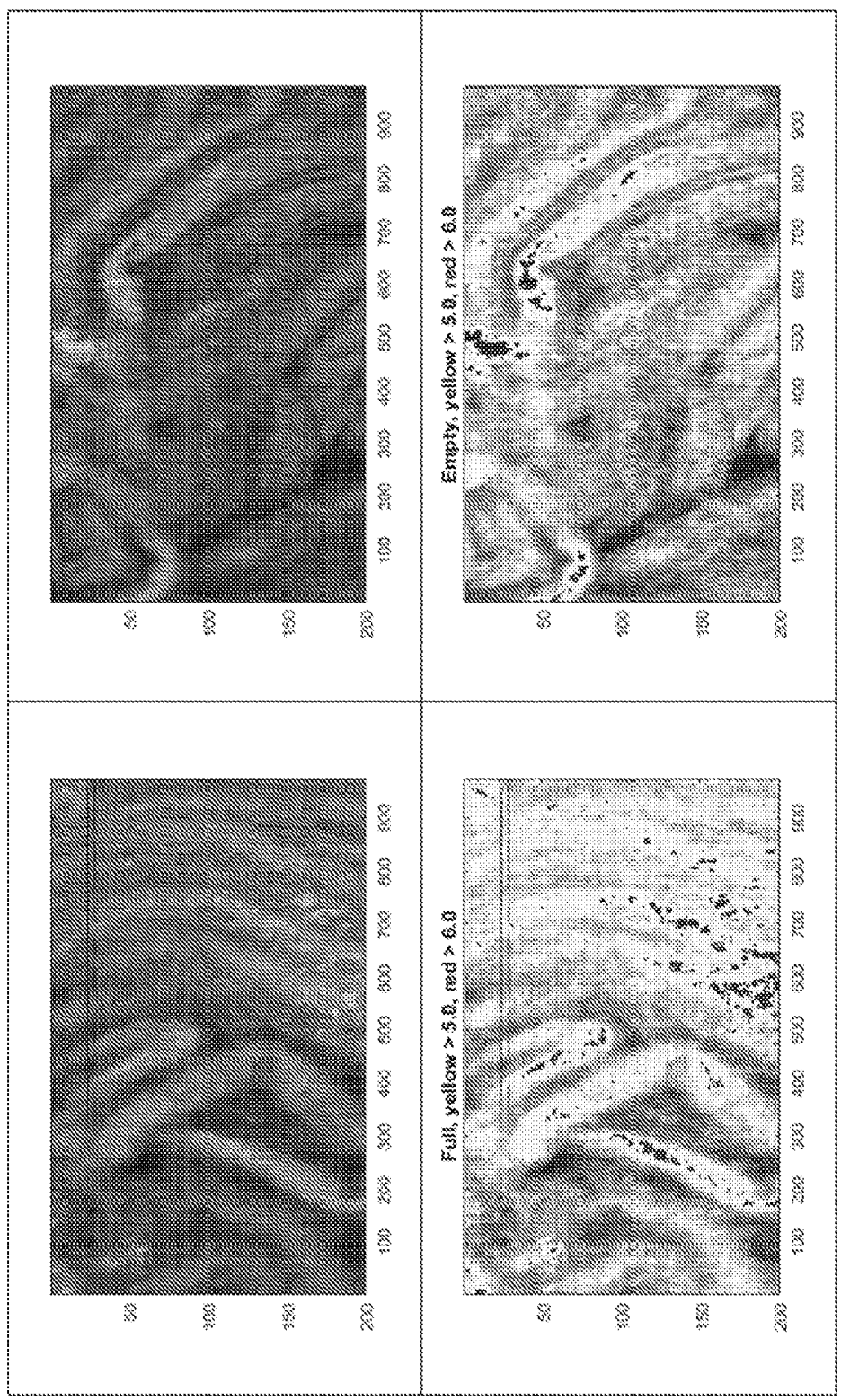
Figure 24:
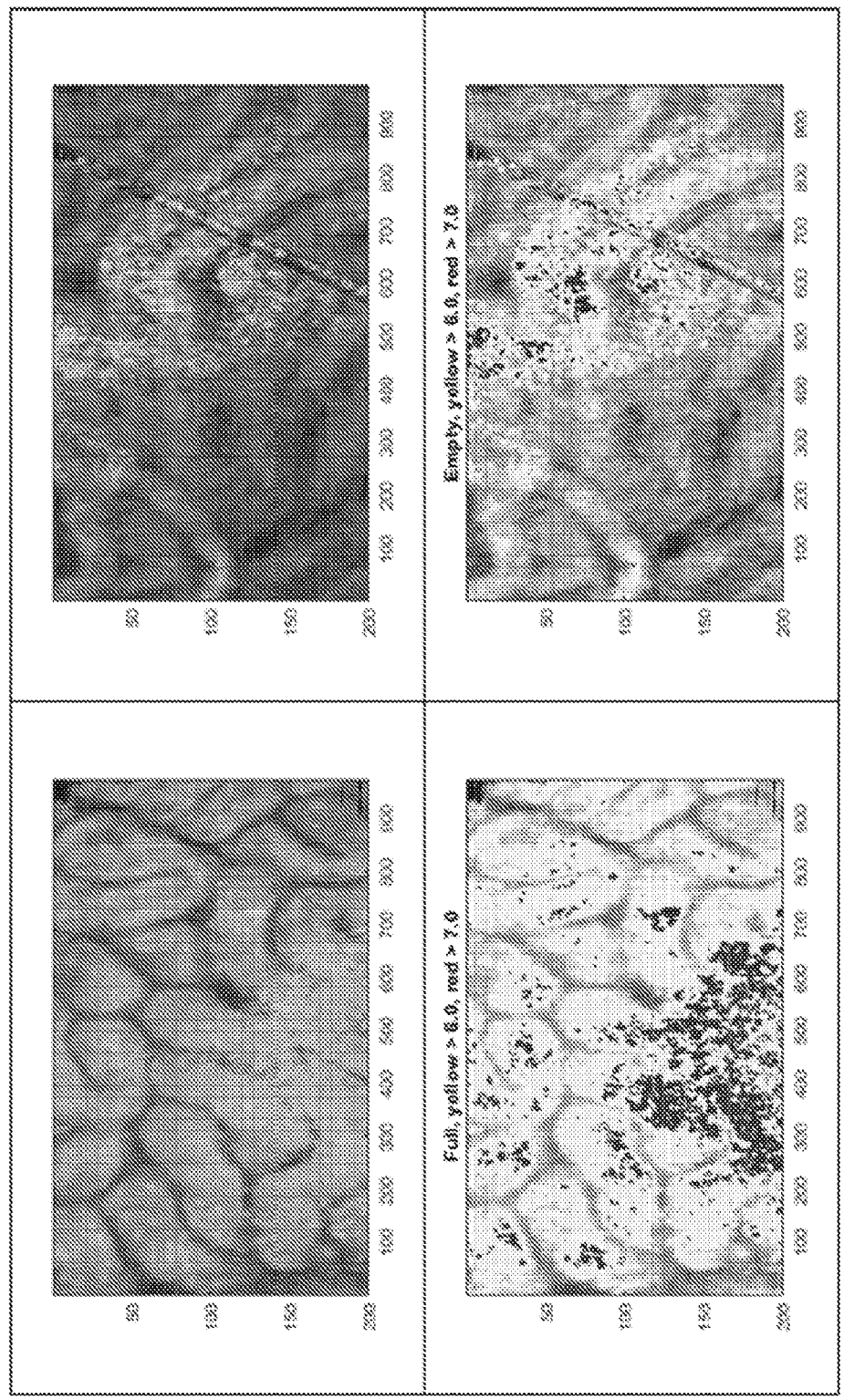
Figure 25:
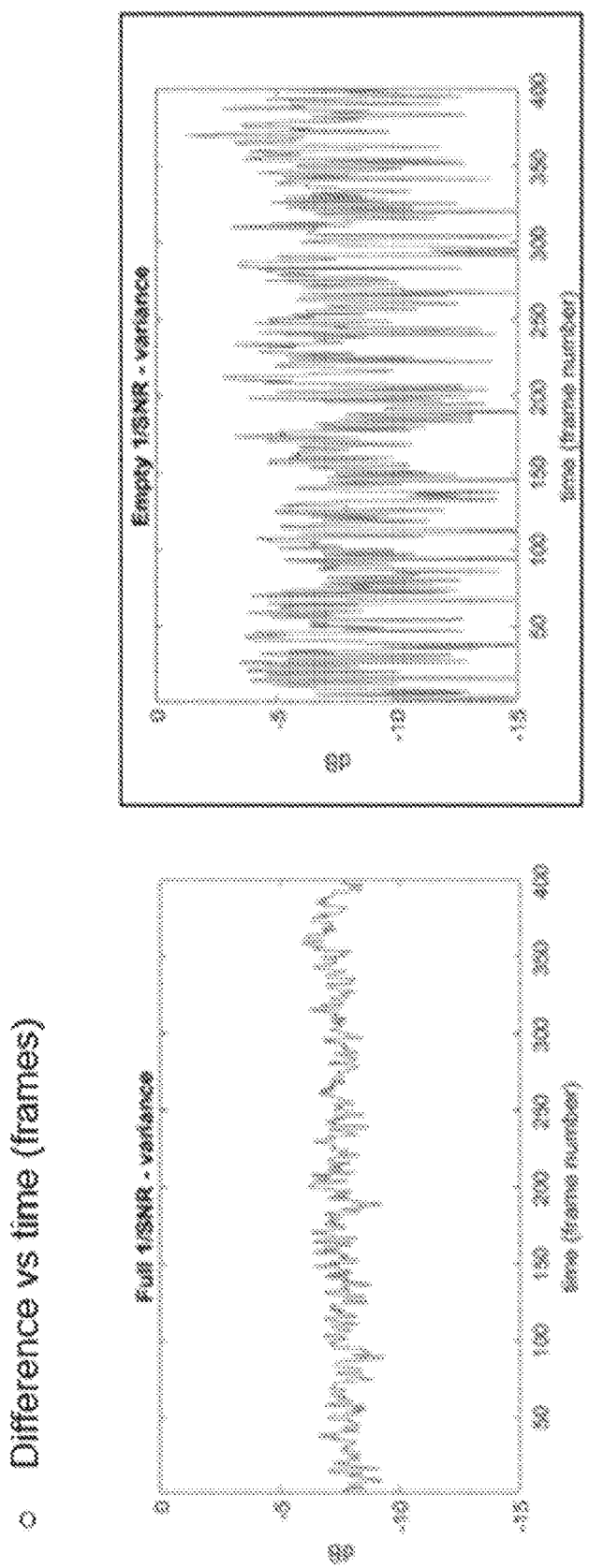
Figure 27:
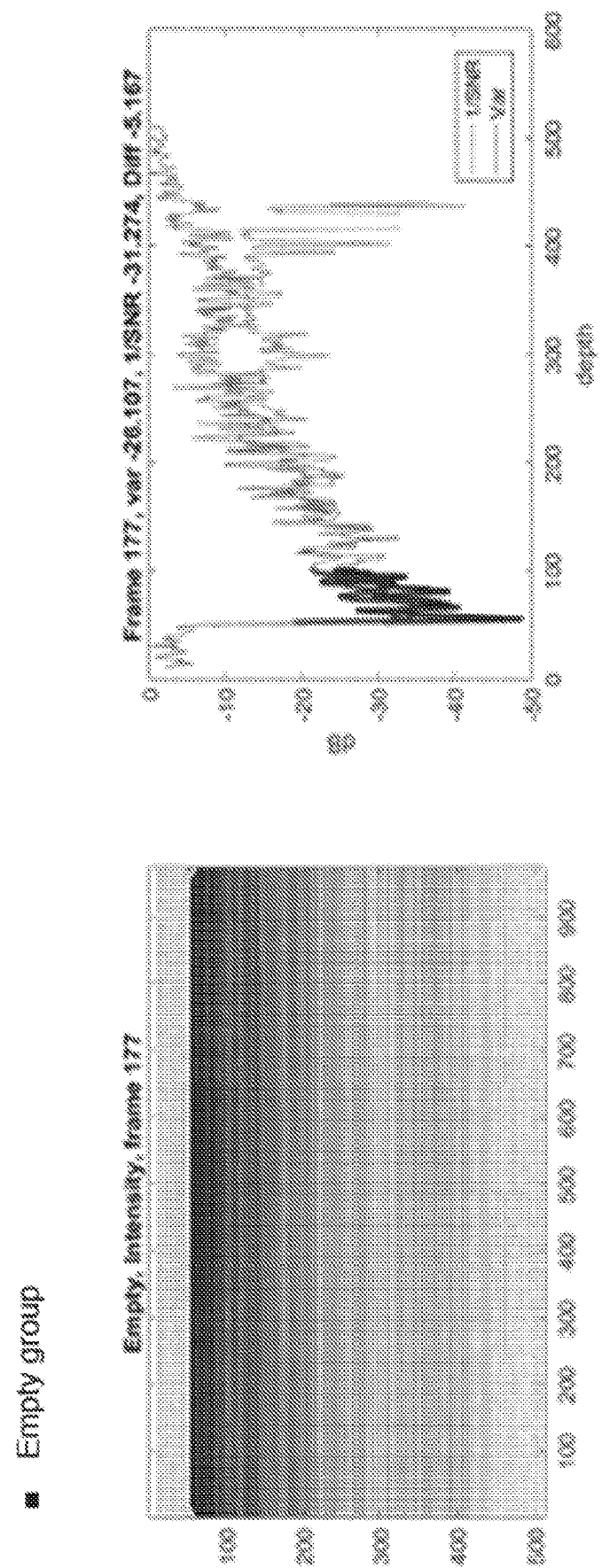

19 and FIG. 20 depict measured and expected phase curves collected for two groups of full samples. FIG. 21 depict measured and expected phase curves collected for a group of empty samples. FIG. 22 depicts phase statistics collected for the groups presented in FIGS. 19-21. FIG. 23 and FIG. 24 depict color overlays produced for full and empty samples. FIG. 25 presents phase data and phase statistics collected for an additional set of full and empty samples. FIG. 26 depicts an intensity image and phase variation curves for two full samples, and FIG. 27 depicts the same for two empty samples. FIG. 28 depicts a color overlay image produced for a full sample and empty sample.

Figure 29:
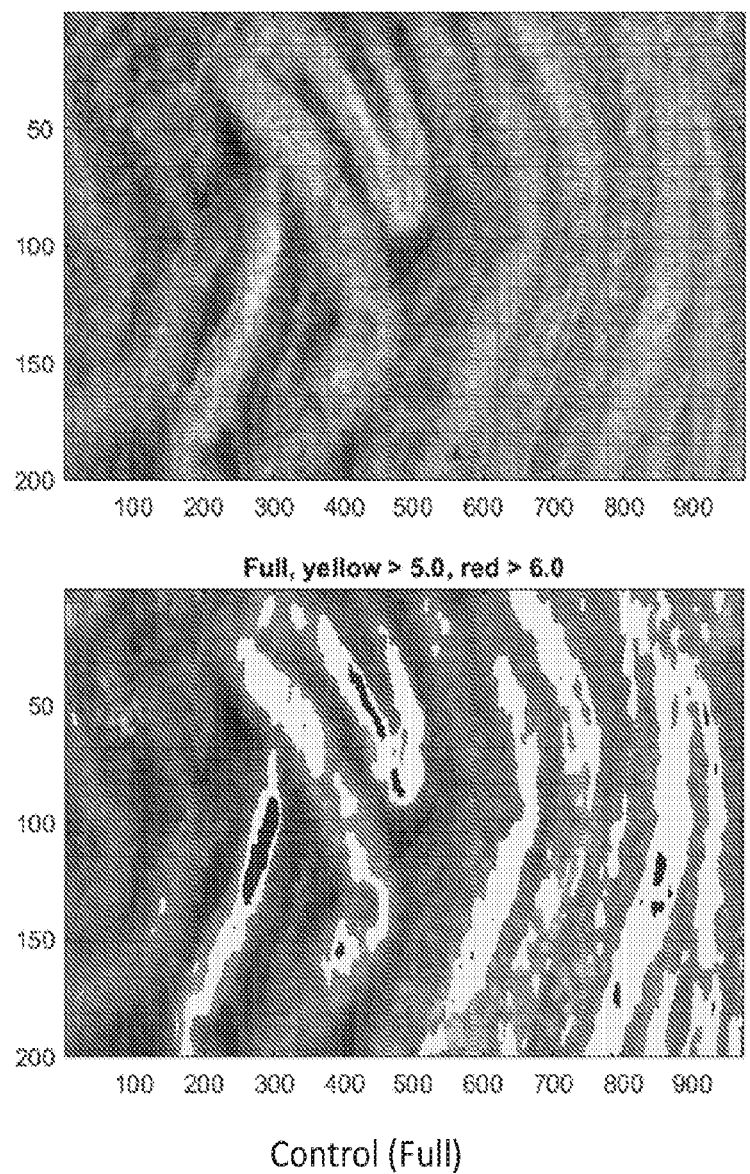
FIGS. 29-31 depict experimental data collected according to the instant method from different types of testicular tissue samples.
Figure 29:
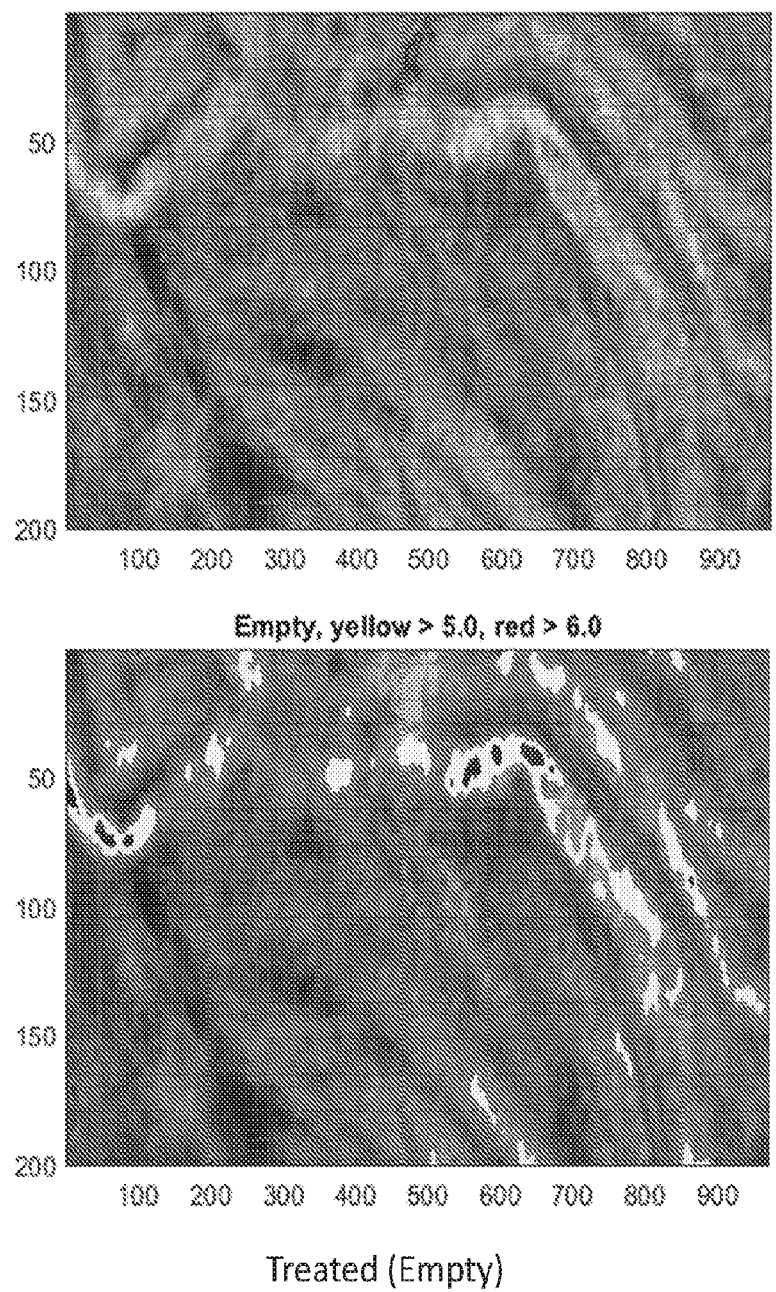
Figure 30:
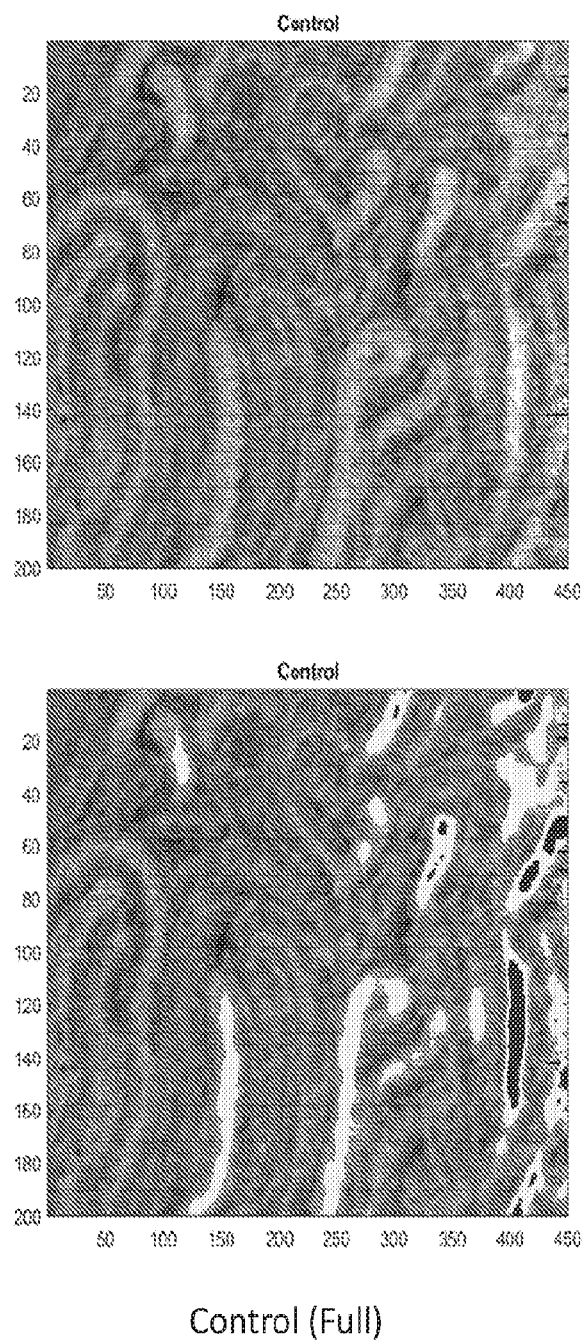
Figure 30:
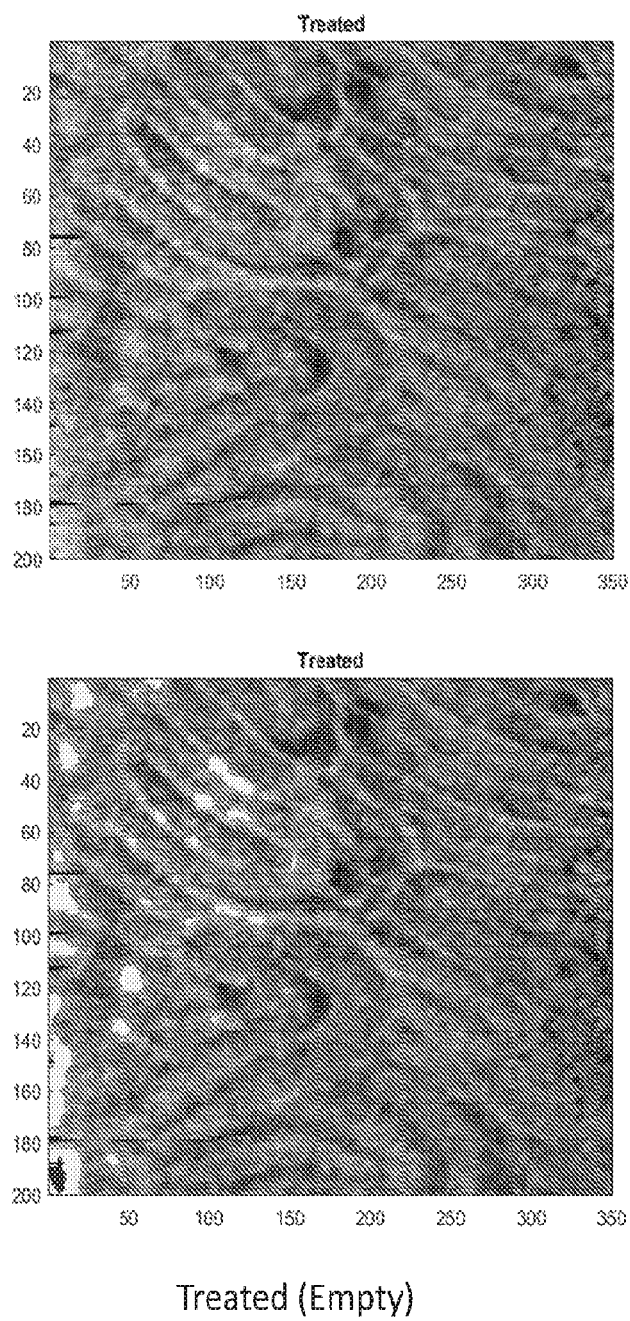
Figure 31:
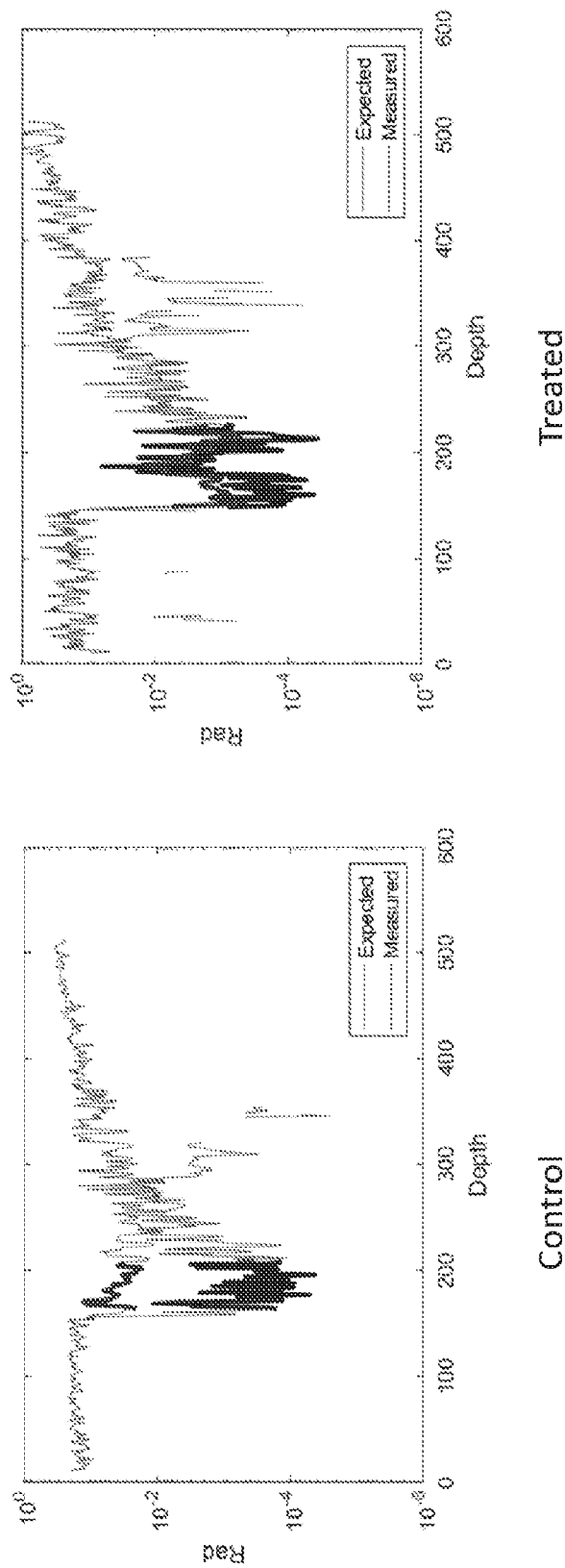
Figure 31:
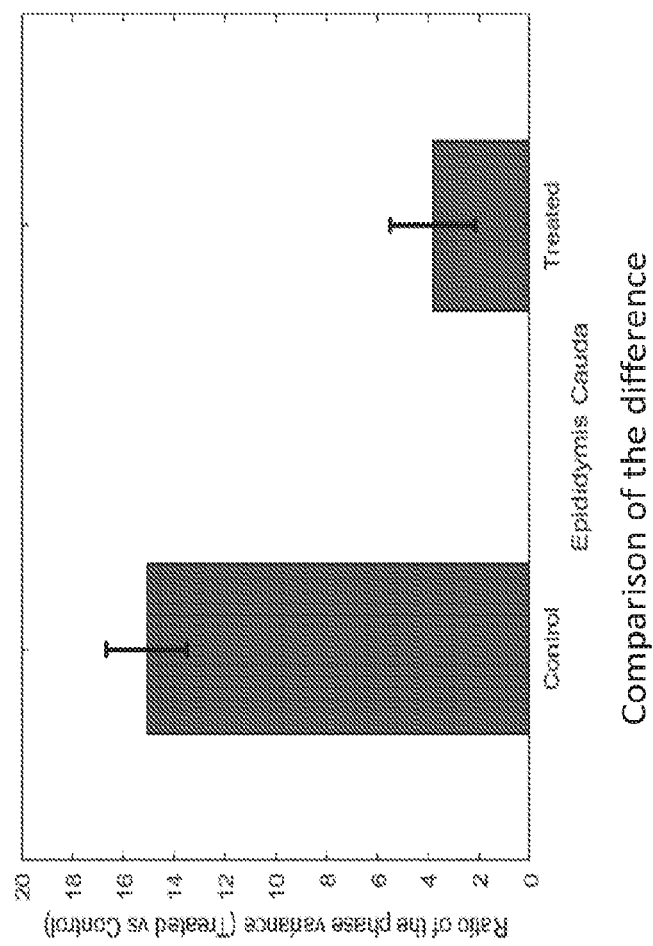

FIGS. 29-31 depict data collected according to the instant method from different types of testicular tissue samples. FIG. 29 presents color overlays imposed on en face representations collected for full and empty seminiferous tubule samples without an intact tunica albuginea, while FIG. 30 presents color overlays imposed on en face representations collected for full and empty seminiferous tubule samples possessing an intact tunica albuginea. FIG. 31 presents phase variance data collected from full (control) and empty (treated) samples within the epididymis cauda.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method of identifying sperm in testicular tissue, the method comprising:
    volumetrically imaging testicular tissue by optical coherence tomography to identify one or more tubule locations that are likely to contain sperm; and
    M-mode scanning the identified testicular location using optical coherence tomography to determine whether sperm are at least likely to be present at the tubule location,
    wherein the M-mode scanning is employed to identify phase variance at the tubule locations that are likely to contain sperm.

2. The method according to claim 1, wherein the volumetric imaging comprises outlining a first layer of tubules in the testicular tissue.

3. The method according to claim 2, wherein the volumetric imaging further comprises computing depth-resolved attenuation.

4. The method according to claim 3, wherein the volumetric imaging further comprises producing an en face reconstruction of the attenuation within the interior of the first layer of tubules.

5. The method according to claim 4, wherein the method comprises inferring the presence or absence of sperm from variations in the calculated attenuation information in the en face reconstruction.

6. The method according to claim 5, wherein the method comprises calculating a color overlay that identifies one or more tubule locations that are likely to contain sperm.

7. The method according to claim 1, wherein the method comprises comparing the identified phase variance to a phase variance expected purely from the signal-to-noise ratio (SNR) in the tubule location.

8. The method according to claim 7, wherein the method comprises identifying tubule locations where the actual phase variance exceeds the expected phase variance as tubule locations where sperm are at least likely to be present.

9. The method according to claim 1, wherein the testicular tissue is human testicular tissue.

10. An optical coherence tomography system configured for performing the method according to claim 1.

11. The method according to claim 1, wherein the method comprises identifying spatial or temporal patterns of phase variance.

12. A method of identifying sperm in testicular tissue, the method comprising:
    volumetrically imaging testicular tissue by optical coherence tomography to identify one or more tubule locations that are likely to contain sperm; and
    M-mode scanning the identified testicular location using optical coherence tomography to determine whether sperm are at least likely to be present at the tubule location,
    wherein the method further comprises motion tracking of and within the testicular tissue.

13. A method of identifying sperm in testicular tissue, the method comprising:
    volumetrically imaging testicular tissue by optical coherence tomography to identify one or more tubule locations that are likely to contain sperm;
    M-mode scanning the identified testicular location using optical coherence tomography to determine whether sperm are at least likely to be present at the tubule location; and
    harvesting sperm from the identified tubule locations determined to be at least likely to contain sperm.

14. The method according to claim 13, wherein the method further comprises employing the harvested sperm in an in vitro fertilization procedure.

15. A method of identifying sperm in testicular tissue, the method comprising:
    volumetrically imaging testicular tissue by optical coherence tomography to identify one or more tubule locations that are likely to contain sperm; and
    M-mode scanning the identified testicular location using optical coherence tomography to determine whether sperm are at least likely to be present at the tubule location,
    wherein the optical coherence tomography comprises irradiating the testicular tissue with an imaging light beam and a visible light beam.

16. The method according to claim 15, wherein the visible light beam is generated by a source different from the imaging light beam.

17. The method according to claim 15, wherein the visible light beam is used to induce a change in sperm motility.

18. The method according to claim 15, further comprising determining whether sperm are at least likely to be present at the tubule location after the tubule location has been irradiated with the visible light beam.

* * * * *